United States Patent [19]

Grudowski et al.

[11] 4,319,338
[45] Mar. 9, 1982

[54] INDUSTRIAL COMMUNICATIONS NETWORK WITH MASTERSHIP DETERMINED BY NEED

[75] Inventors: Raymond A. Grudowski, South Euclid; Jonathan R. Engdahl, Maple Heights, both of Ohio

[73] Assignee: Allen-Bradley Company, Milwaukee, Wis.

[21] Appl. No.: 102,970

[22] Filed: Dec. 12, 1979

[51] Int. Cl.³ .............................................. G06F 3/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,445,822 | 5/1969 | Driscoll | 364/200 |
| 4,001,790 | 1/1977 | Barlow | 364/200 |
| 4,016,541 | 4/1977 | Delagi et al. | 364/200 |
| 4,149,144 | 4/1979 | Diefenderfer | 340/147 R |
| 4,149,241 | 4/1979 | Patterson | 364/200 |
| 4,170,038 | 10/1979 | Bouvier et al. | 364/200 |
| 4,172,280 | 10/1979 | Spiesman | 364/107 |

OTHER PUBLICATIONS

Kahne et al., "Automatic Control by Distributed Intelligence", *Scientific American*, Jun. 1979, pp. 78–90.
Ford Motor Co. Research Lab., "Concepts, Strategies for Local Data Network Architectures", *Data Communications*, Jul. 1978, pp. 39–49.
Stutzman, "Data Communication Control Procedures", *Computing Surveys*, vol. 4, No. 4, Dec. 1972, pp. 198–220.
Pluhar, "Communications and Data Highways: PC's Lead the Way", *Control Engineering*, Sep. 1979, pp. 65–68.

*Primary Examiner*—Raulfe B. Zache
*Attorney, Agent, or Firm*—Quarles & Brady

[57] ABSTRACT

An industrial communications network includes microprocessor-based interface circuits which each connect a controller such as a programmable controller to a high speed serial data link. Each interface circuit connects to the data link and its associated controller, and each is operable to receive messages on the data link directed to its associated controller. In addition, each interface circuit can assume mastership of the communications network when the existing master generates a poll command indicating it is ready to relinquish mastership. As a result, the communications network will continue to function even though one or more controller or their associated interface circuits become inoperable.

16 Claims, 17 Drawing Figures

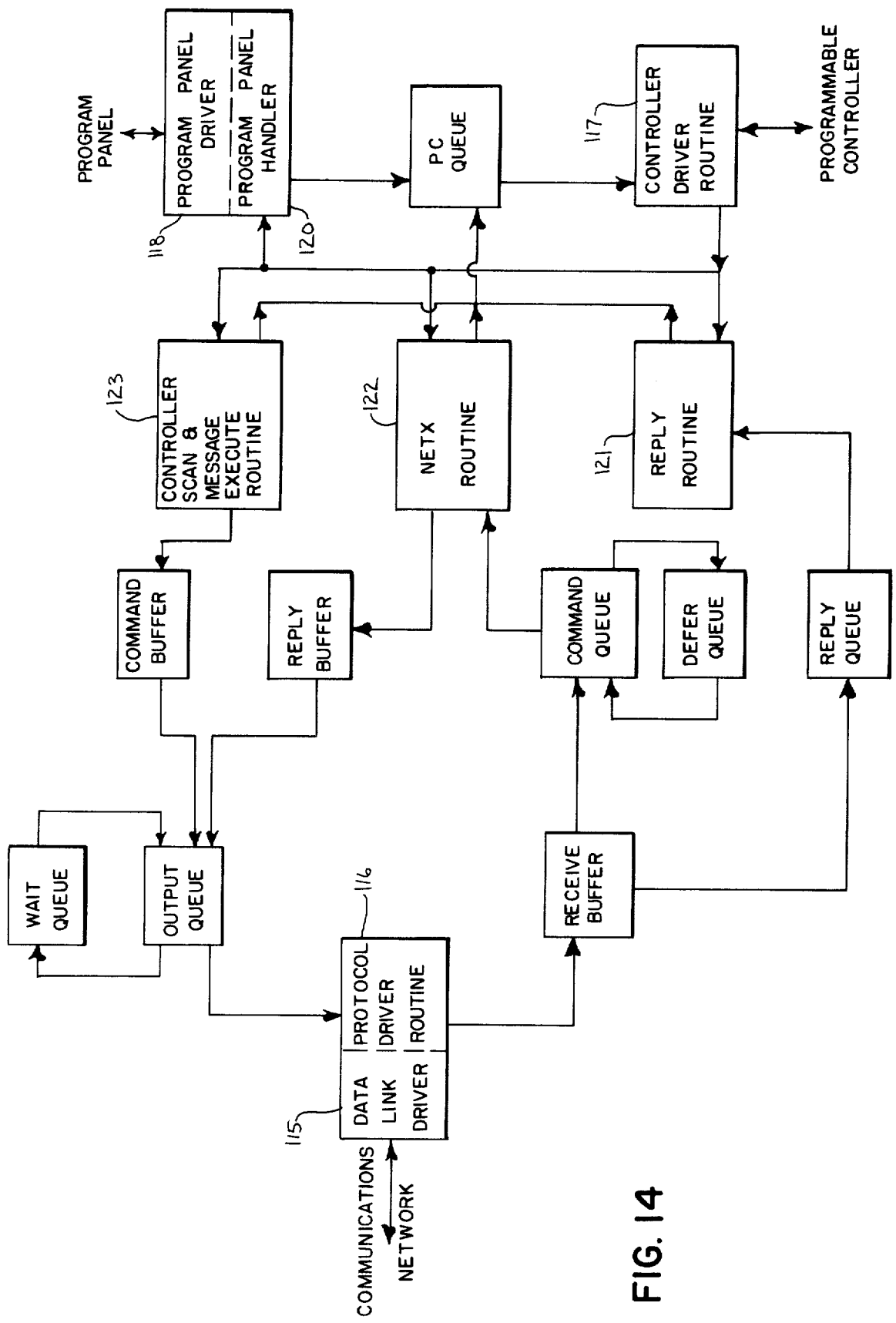

INDUSTRIAL COMMUNICATIONS NETWORK WITH MASTERSHIP DETERMINED BY NEED

BACKGROUND OF THE INVENTION

The field of the invention is industrial control systems such as process controllers and programmable controllers, and particularly, communication systems for connecting such controllers together in a network.

Historically, industrial control communications networks have been organized into star, multidrop, or ring configurations. In a star configuration, one controller forms the center and acts as the network master. Separate lines extend from this master controller to all the other "slave" controllers. A multidrop network such as that disclosed in U.S. Pat. No. 4,149,144 also includes a single master controller which connects to a single data trunk. The slave controllers are connected to the data trunk by lines which are "dropped" from the trunk and communications is established between the master controller and a selected slave controller by a "polling" process. In such a multidrop network communications between slave controllers is possible only through the master controller. With a ring configuration each controller is linked to two other controllers in a loop arrangement. Messages are relayed along from controller to controller and a network master acts to delete any messages that have travelled full circle and have not been acknowledged by a controller in the ring.

A problem with any of these prior communications networks is that the entire system fails if a malfunction occurs in the master controller. In the star configuration the slave controllers become isolated from one another when the master controller fails in the multidrop system all communications stop because the polling process cannot occur. In the ring network any controller failure inhibits communications. As a result, it is common practice to employ redundancy as a means of preventing complete network failure in these prior systems and such a solution is expensive.

Another solution is to employ a contention scheme on a multidrop network. In such a system there is no master controller, but instead, each controller "contends" for access to the data link. When access is obtained, a message may be sent directly to any other controller in the network. Numerous contention techniques are known to the art and although they do eliminate the dependence on a master controller for maintaining communications, no single contention technique is universally applicable to all traffic patterns. Also, special hardware must be added to detect the "collision" of messages on the data link when such techniques are used and this adds to the cost and complexity of the network.

SUMMARY OF THE INVENTION

The present invention is a communication network comprised of a plurality of controller interface modules connected to a common data line, characterized by the ability of each interface module to both act as the master for the purpose of controlling the carrying out of a communication function on the network and then to relinquish control of the network to another interface module in accordance with a preselected priority scheme. More particularly, each interface module includes means responsive to a poll command message to obtain mastership of the network, means for sending messages on the network, means for relinquishing mastership of the network by sending a poll command message to another interface module on the network, and means for receiving messages from the network when another interface module is master.

A general object of the invention is to provide a communications network which is not dependent for its operation on a single processor. If an interface module, or the controller with which it is associated breaks down, the network according to the present invention continues to operate. Each of the other interface modules continues to send and receive messages.

Another object of the invention is to avoid the need for expensive collision detection circuitry. The process of relinquishing and obtaining mastership of the network is accomplished in an orderly manner. The master polls the other interface modules to determine which want mastership, and of these, which has the highest priority. A poll command message is then sent to the proper interface module and it assumes mastership of the network until it has sent all of its messages.

A more specific object of the invention is to provide an interface module for coupling a programmable controller to a communications network. The interface module includes means for determining if the programmable controller has a message ready to send, meas for reading the message out of the programmable controller and means for enabling the interface module to obtain mastership of the network and send the message.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 14 is a block diagram of the message data flowing in the interface module of FIG. 3.

DESCRIPTION OF THE PREFERRED EMBODIMENT

Figure 1:
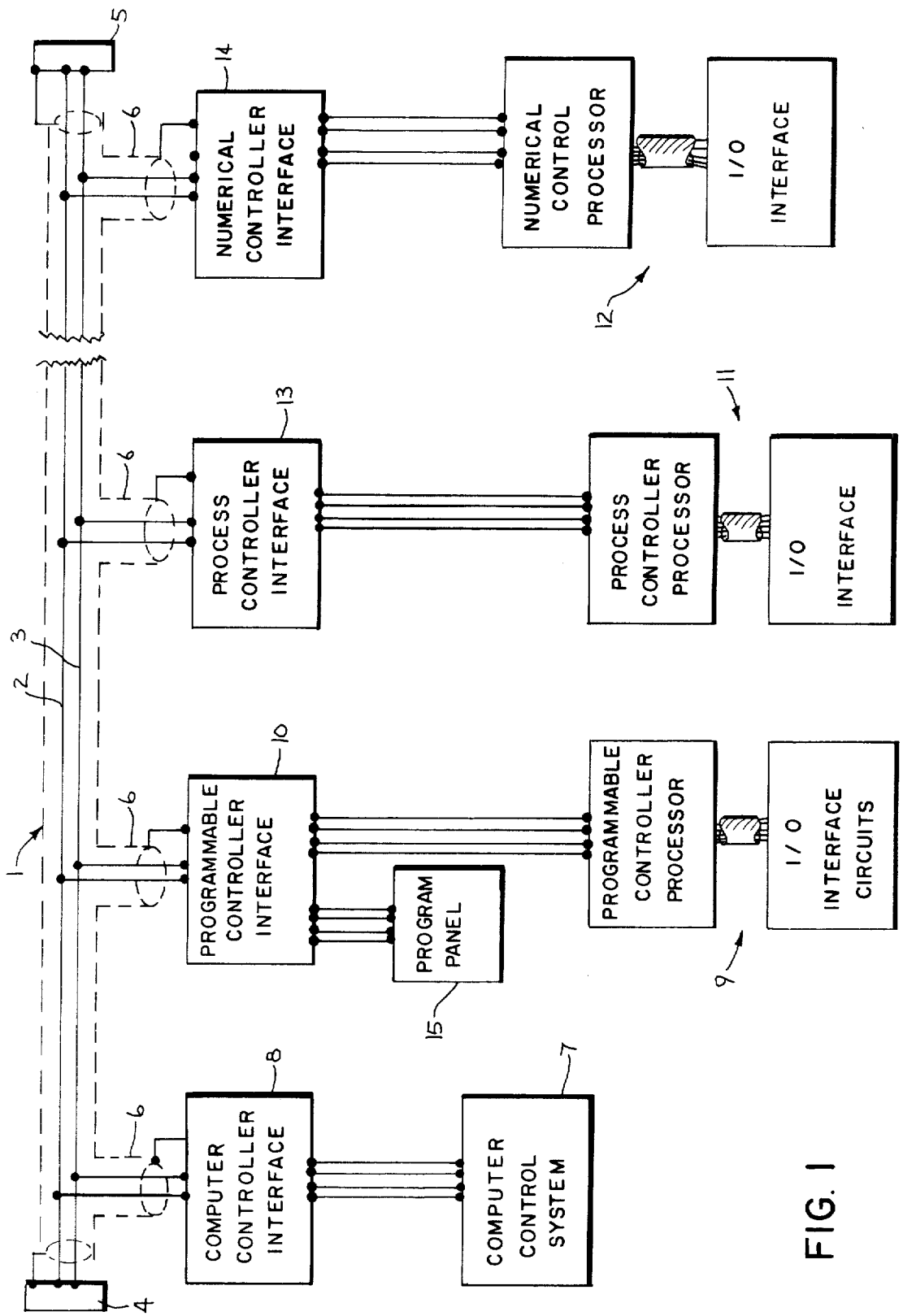
FIG. 1 is a block diagram of a communications network according to the present invention.

Referring to FIG. 1, the communications network of the present invention includes a data link comprised of a shielded cable 1 containing a pair of twisted wires 2 and 3. A cable such as number 9463 manufactured by Belden Corporation is employed and it will support data rates of up to 57.6 kilobaud at up to 10,000 feet distances. The cable 1 is terminated with resistors 4 and 5 at each of its ends and a plurality of branches, or drops 6, are made along its length. A controller interface module connects to each of the drops 6 and up to sixty-four separate controllers can thus be connected to the cable 1.

Various types of controllers may be coupled to the cable 1 through an associated controller interface. These may include general purpose computers 7 coupled to the cable 1 by a computer controller interface 8 or these may include programmable controllers 9 coupled to the cable 1 by a programmable controller interface 10. Similarly, process controllers 11 and numerical control systems 12 may be coupled to the cable 1 by process control interface modules 13 and numerical controller interface modules 14. The types and numbers of controllers will vary with the particular installation, and it is one of the objectives of the present invention to insure flexibility in this respect while maintaining the reliability of the network.

The controller interface modules 8, 10, 13 and 14 are microprocessor-based circuits which are programmed to carry out the interface between the network communication protocol and the protocol of the particular controller to which they connect. Indeed, the circuitry for the controller interface modules 8, 13 and 14 is identical since most computer control systems 7, process controllers 11 and numerical control systems 12 have serial I/O ports which meet the RS232C industry standard.

The programmable controller interface module 10 differs from the others in that it mounts in the I/O rack of the programmable controller and it serves to interface a program panel 15 to the programmable controller 9. In this respect therefore, it is more special purpose in nature.

Figure 2:
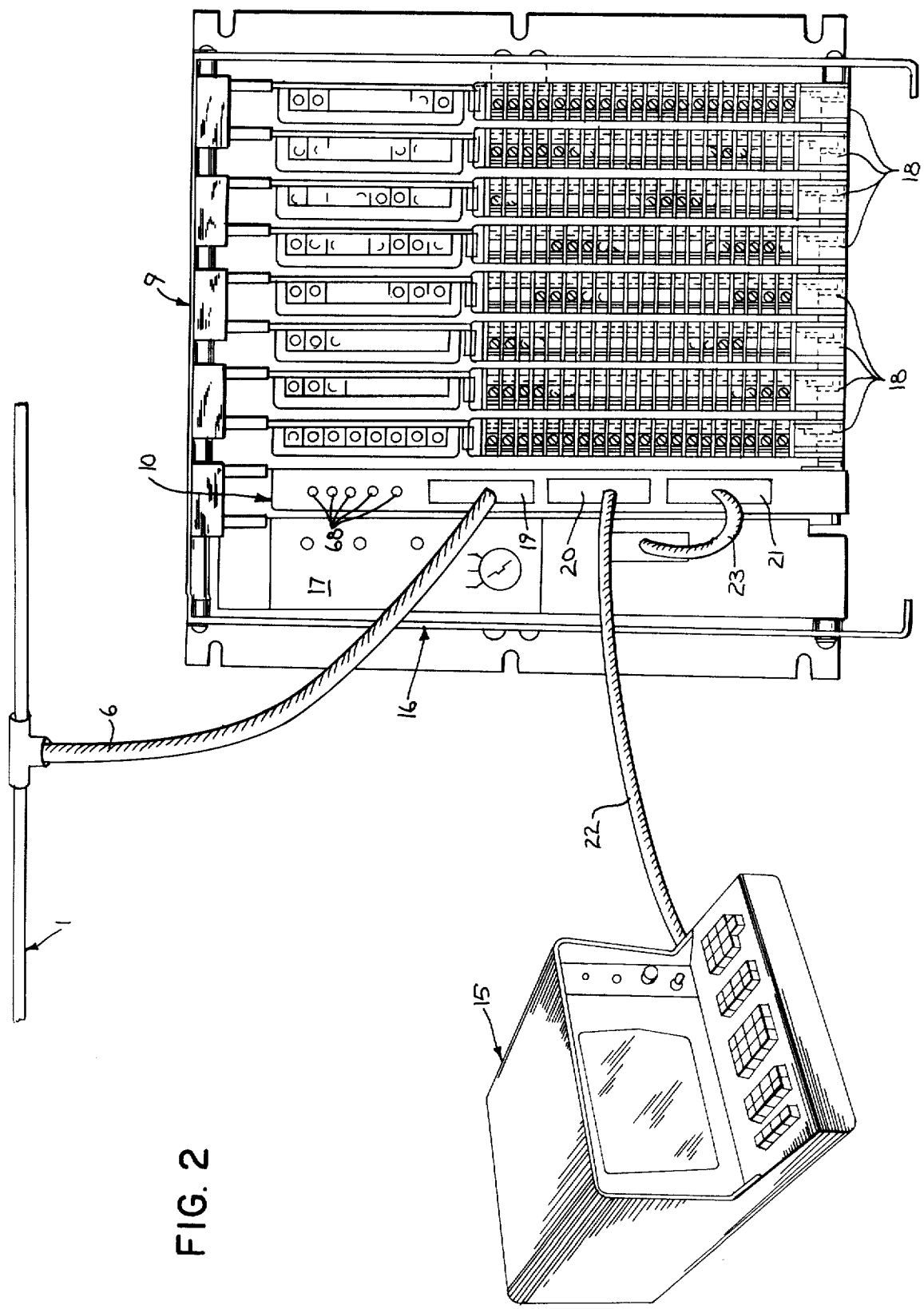
FIG. 2 is a pictoral view of a programmable controller station on the communications network of FIG. 1.

Referring particularly to FIGS. 1 and 2, the programmable controller interface module 10 is mounted in a rack 16 which supports the processor 17 and the I/O interface circuits 18 that comprise the programmable controller 9. The controller interface module 10 is structured to fit within one of the slots otherwise occupied by an I/O circuit module 18 and it includes three receptacles 19, 20, and 21 which connect the module 10 to the cable 1, the program panel 15 and the programmable controller processor 17 through respective lines 6, 22 and 23. The mechanical construction of the rack 16 is disclosed in U.S. Pat. No. 4,151,580 issued Apr. 24, 1979, and entitled "Circuit Board Assembly with Disconnect Arm", and the program panel 15 is described in U.S. Pat. No. 4,070,702 issued Jan. 24, 1979 and entitled "Contact Histogram for Programmable Controller".

Figure 3:
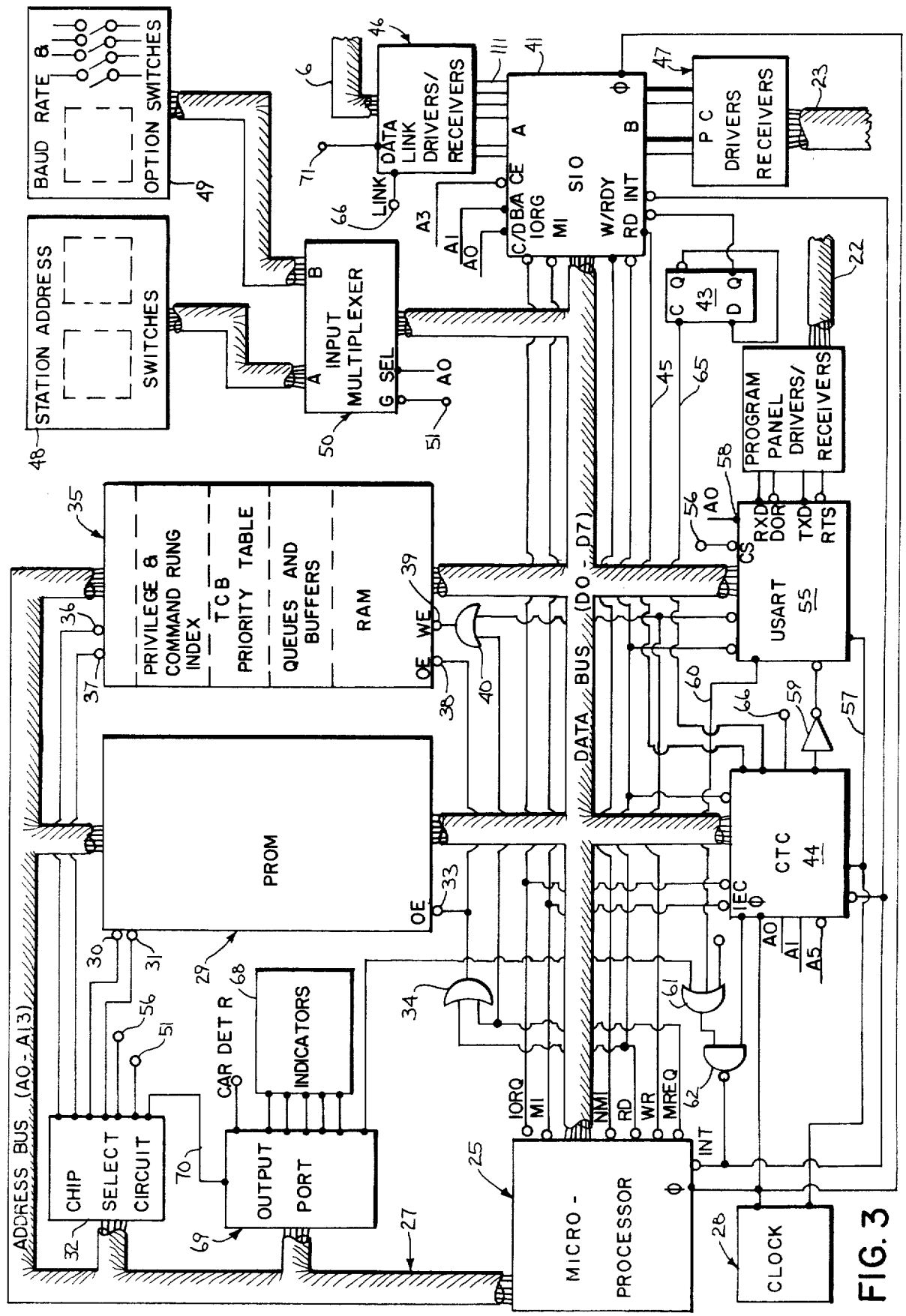
FIG. 3 is an electrical schematic diagram of an interface module which forms part of the communications network of FIG. 1.

The programmable controller interface circuit 10 is shown in FIG. 3. It includes an 8-bit microprocessor 25 which connects to an 8-bit data bus 26 and a 14-bit address bus 27. A model Z-80A microprocessor manufactured by Zilog, Inc. is employed and it is driven by a 3.6864 megahertz clock circuit 28. For a description of the structure, operation and instruction set of this microprocessor, reference is made to the "Z80-CPU Technical Manual" published in 1976 by Zilog, Inc.

The microprocessor 25 includes a number of control terminals (IORQ, M1, RD, WR and MREQ) which drive corresponding control lines that connect to various elements of the circuit. It also includes two interrupt terminals (NMI and INT) that are driven by various circuit elements through corresponding control lines.

The operation of the microprocessor 25, and hence the operation of the entire interface circuit, is under the control of programs stored in a read-only memory 29. The read-only memory is comprised of two 4k by 8 UV PROM circuits each of which is separately enabled through terminals 30 and 31 by a chip select circuit 32. An 8-bit byte of data is read from an addressed line in the read-only memory 29 when an OE terminal 33 is driven low by an OR gate 34. This data appears on the data bus 26 and is read into the microprocessor 25 which then executes the indicated operation.

Data, including messages which are received from the cable 1 and messages which are to be transmitted on the cable 1, is stored in a random access memory 35. The random access memory 35 is comprised of two 1k by 8 static RAM circuits, each of which is separately enabled through terminals 36 and 37 by the chip select circuit 32. An eight-bit byte of data is written into the random access memory 35 or read from it when control signals are applied to an OE terminal 38 and a WE terminal 39 by respective gates 34 and 40.

Information on the data bus 26 is coupled to and from the dropline 6 and the line 25 by a serial input/output (SIO) circuit 41. The SIO 41 is a commercially available dual-channel multi-function peripheral component which performs serial-to-parallel and parallel-to-serial conversions on eight-bit bytes of data. The SIO 41 is responsive to command data on the data bus 26 to perform a number of functions on each of its two channels, and through these commands which are generated under control of programs stored in the read-only memory 28, the operation of each serial input/output channel can be configured to the different communication protocols on the lines 6 and 23.

The SIO 41 is driven by the microprocessor control lines IORQ, M1, RD and the system clock line. The lead A3 in the address bus 27 enables the SIO 41 and leads A0 and A1 select channels A or B and indicate whether the information on the data bus 26 is a command or is data. A transmit and receive data clock terminal for channel B is driven by the Q output on a D-type flip-flop 43, which in turn is driven by a counter timer circuit (CTC) 44. The SIO 41 also connects to drive the microprocessor interrupt terminals INT and NMI and it connects through an interrupt enable output line (IEO) 45 to the interrupt enable input (IEI) on the CTC 44. The A channel and B channel terminals on the SIO 41 connect respectively to a data link drivers/receivers circuit 46 and a programmable controller (PC) drivers/receivers circuit 47.

The operation and structure of the SIO circuit 41 is fully described in the "Z-80 SIO Technical Manual"

published in 1977 by Zilog, Inc. It is used in the present circuit to provide full-duplex asynchronous serial communications with the programmable controller processor through channel B and half-duplex, synchronous serial communications with other interface modules on the network through channel A. Channel B has data rates of 9600 and 19,200 Baud and Channel A has a data rate of 57,600 Baud.

The selection of Baud rates, station address and optional features is provided by two sets of switches 48 and 49 which are coupled to the data bus 26 through an input multiplexer 50. The input multiplexer 50 is comprised of two four-bit multiplexer circuits having their select terminal (SEL) commonly connected to the A0 lead in the address bus 27 and their enable terminal (G) connected through a line 51 to the chip select circuit 32. The switches 48 include "DIP" switches which apply an 8-bit station address to the "A" inputs of the multiplexer 50. These switches 48 are set manually to a station address of from 0 to 254. The switches 49 connect to the "B" inputs on the multiplexer 50 and they include a DIP switch which is used to select baud rate and single-pole-single throw switches which are used to select optional features.

Communications with the program panel 15 through the line 22 is provided through a universal synchronous/asynchronous receiver/transmitter (USART) 55. The USART 55 is a commercially available integrated circuit which is enabled through a line 56 that connects to the chip select circuit 32. It is clocked through a line 57 which connects to the system clock 28 and which also drives the CTC 44. The selection of command data or I/O data is made by the A0 lead in the address bus 27 at a C/D terminal 58 and the USART 55 is operated by the microprocessor control lines WR and RD. A baud rate clock signal is received from the CTC 44 through an inverter gate 59 and the USART 55 generates an interrupt request to the microprocessor 25 through a RxRDY line 60, OR gate 61 and NAND gate 62 when data is received from the program panel 15.

The USART 55 provides full-duplex, asynchronous serial communications with the program panel 15 at a selectable baud rate of 9600 or 19,200 Baud. Its operation is under the control of programs stored in the read-only memory 29 which also operates the SIO 41 to couple data between the program panel 15 and the programmable controller processor 17.

The baud rate at which the SIO 41 and the USART 55 operate is controlled by the CTC 44. The CTC 44 is a commercially available integrated circuit which is connected to the data bus 26 to receive commands which establish the baud rates for the three serial I/O channels. The CTC 44 is enabled by address bus leads A0, A1 and A5 which connect to respective terminals CS0, CS1 and CE, and it is operated by microprocessor control lines IORQ, RD and M1. The CTC 44 receives the 3.6864 megahertz clock signal from the clock circuit 28 as well as a 1.8432 megahertz trigger signal through the line 57. The CTC 44 may generate an interrupt signal to the microprocessor INT terminal and it generates three clock signals, one through the inverter gate 59, a second through a line 65 to the D-type flip-flop 43 and a third through a line 66 to the data link drivers/receivers circuit 46. For a complete description of the structure and operation of the CTC 44 reference is made to "Z80-CTC Technical Manual" published by Zilog, Inc. in 1977.

Referring to FIGS. 2 and 3, five indicator lights 68 are connected to the data bus through an output port 69 and are mounted on the edge of the interface module 10 above the receptacle 19. The output port 69 is an octal addressable latch which is commercially available as an integrated circuit. It is enabled by the chip select circuit through a line 70 and it has four inputs which connect to leads A0, A1, A2 and A4 in the address bus 27. Five of its output terminals connect to respective indicator lights 68, one output connects to the OR gate 61 and a seventh output connects through a carrier detect reset line 71 to the data link drivers/receivers 46. The three-bit code on the address bus leads A0, A1 and A2 selects one of the eight outputs and the logic state of the address bus lead A4 is clocked into the output port 69 by the chip select circuit 32. In this manner any one of the indicator lights 68 can be turned on or off and a "software interrupt" can be generated through the OR gate 61.

Figure 4:
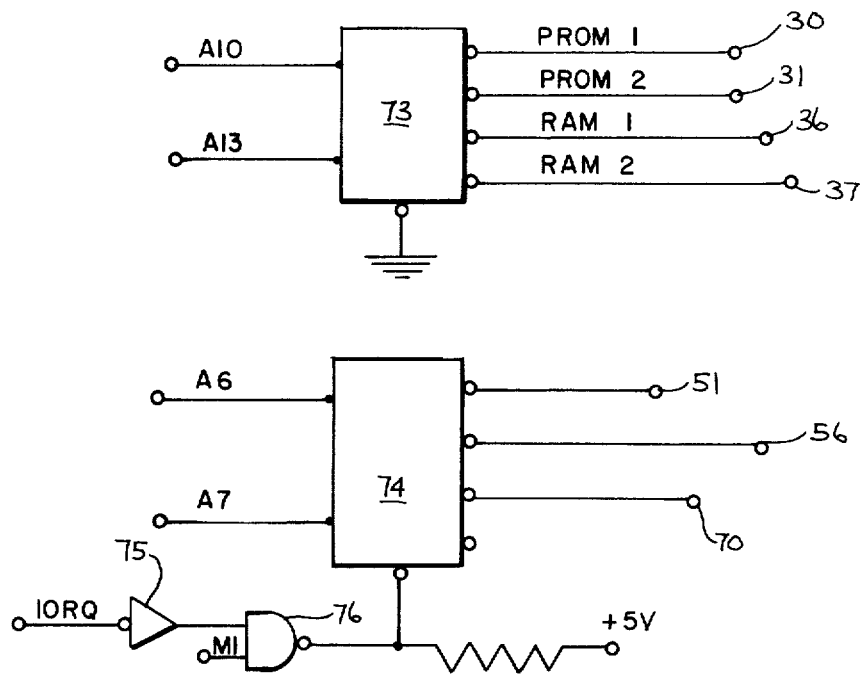
FIG. 4 is an electrical schematic diagram of a chip select circuit which forms part of the interface module of FIG. 3.

Referring to FIGS. 3 and 4, the chip select circuit 32 is comprised primarily of two 2-bit-to-4-bit decoder circuits 73 and 74. The two inputs on the decoder 73 connect to address bus leads A10 and A13 and its four outputs connect to the read-only memory chip select terminals 30 and 31 and the random access memory chip select terminals 36 and 37. The inputs on the second decoder circuit 74 connect to address bus leads A6 and A7 and its output enable (OE) terminal is driven by the IORQ and M1 control lines through gates 75 and .76. Three outputs on the second decoder circuit 74 connect to the respective lines 51, 56 and 70 which enable the input multiplexer 50, USART 55 and output port 69 according to the state of the address bus leads A6 and A7.

Figure 5:
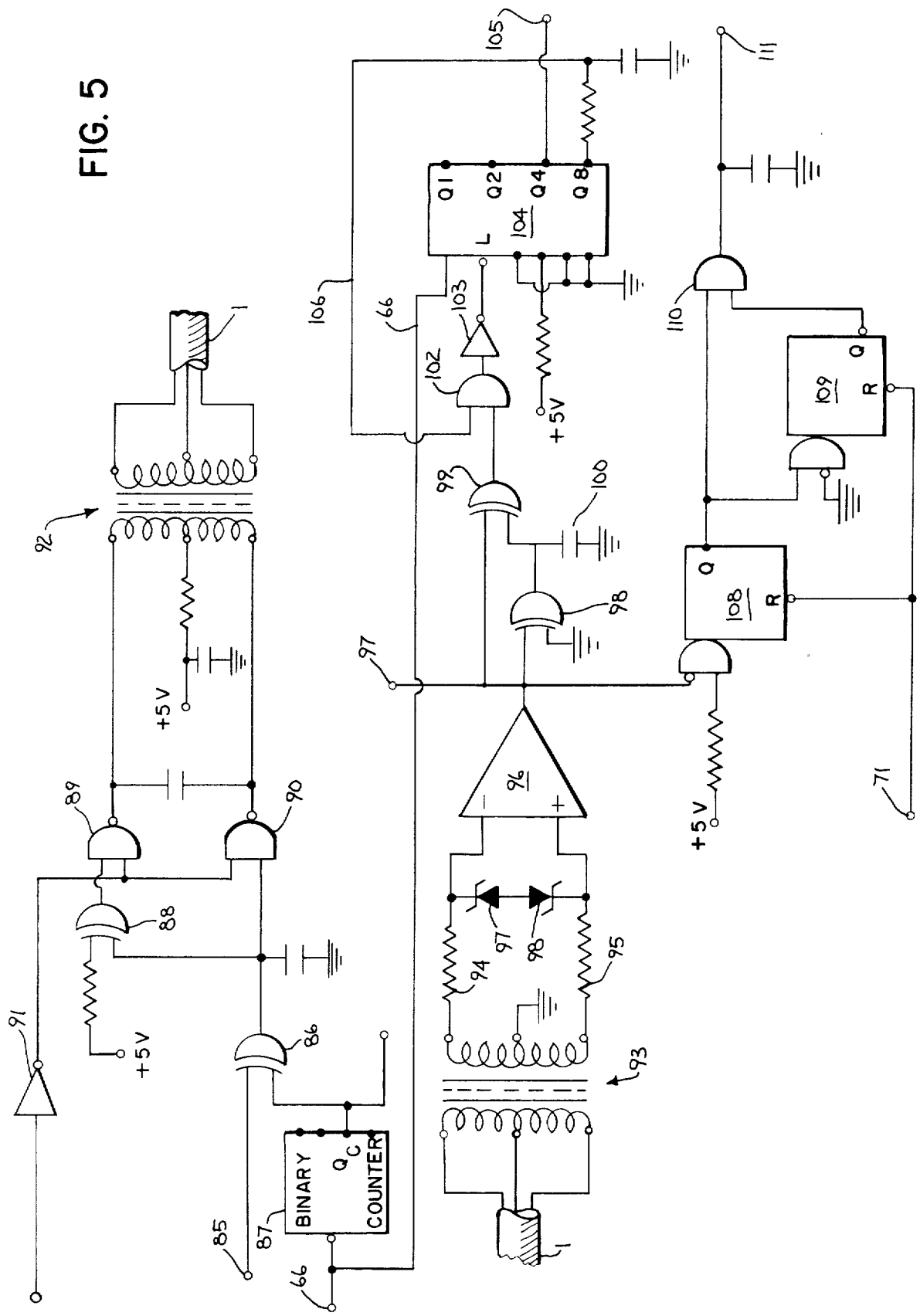
FIG. 5 is an electrical schematic diagram of the data link drivers and receivers circuit which forms part of the interface module of FIG. 3.

Referring particularly to FIGS. 3 and 5, the data link drivers/receivers circuit 46 connects the dropline 6 to the A channel of the SIO 41. Data is output from the SIO 41 through a line 85 which connects with one input on an exclusive OR gate 86. The other input of the exclusive OR gate 86 is driven by a transmit clock signal which is generated by a four-bit binary counter 87, and the output of the exclusive OR gate 86 is bi-phase encoded data, or "Manchester code". The binary counter 87 is driven by the line 66 which connects to the CTC 44, and thus the rate of data transmission is controlled by program instructions which are executed during system initialization.

The bi-phase encoded output data is inverted by a second exclusive OR gate 88 and both the inverted and noninverted data are applied to inputs on respective AND gates 89 and 90. A second input on each AND gate 89 and 90 is driven by an enabling AND gate 91 and one input of the AND gate 91 is driven by the request to send (RTSA) output of the SIO 41. The outputs on the AND gates 89 and 90 connect to the primary winding of an isolation transformer 92. The transformer 92 has a turns ratio of 1.2 to 4.0 to provide some voltage step-up before the bi-phase encoded signal is applied to the cable 1. Both its primary and secondary windings are center-tapped. When the AND gates 89 and 90 are enabled by the SIO 41, therefore, a 57.6 kilohertz carrier signal having a different voltage of about 6 volts is applied to the cable 1. When data is output through the line 85, this carrier is "modulated" to transmit bi-phase encoded messages to other stations connected to the cable 1.

Referring still to FIG. 5, messages are received by the programmable controller interface 10 through the cable 1 and applied to the primary winding of a second isolation transformer 93. The transformer 93 has a turns ratio of 6 to 15 and both windings are center-tapped. The secondary winding connects through resistors 94 and 95 to the inputs of a differential amplifier 96. A pair of zener diodes 97 and 98 provide protection from excessive input voltage and the amplifier 96 operates as a line receiver to transform the received signal into TTL voltage levels. The output of the amplifier 96 is applied to the data receive input (RXDA) on the SIO 41 through a line 97 and it is applied to a pair of exclusive OR gates 98 and 99. The exclusive OR gates 98 and 99 operate in combination with a capacitor 100 to generate a positive voltage pulse each time the received data signal changes logic state. These voltage pulses are applied through an AND gate 102 and inverter gate 103 to the latch input on a four-bit binary counter 104. The counter 104 and associated circuitry serves to decode the bi-phase encoded data. The counter 104 is clocked by the line 66 driven by the CTC 44. The counter 104 is preset (to the count of 2) and counted up to the count of four, at which point it generates on line 105 a pulse to the received clock (RXCA) on the SIO 41. After being counted up to eight, the Q8 output on the counter 104 goes high and the AND gate 102 is enabled through line 106 to receive the next positive voltage pulse. When this is received, the counter 104 is again preset to the count of 2 and the cycle repeats.

Referring to FIGS. 3 and 5, the output of the line receiver amplifier 96 also connects to the input of a first monostable multivibrator 108, the Q output of which drives a second monostable multivibrator 109 and an AND gate 110. The $\overline{Q}$ output on the multivibrator 109 connects to a second input on the AND gate 110 and the reset terminals on both multivibrators 108 and 109 connect to the carrier detect reset line 71 which is driven by the output port 69. The output of the AND gate 110 is connected to the data carrier detect (DCDA) terminal of the SIO 41 through a carrier detect line 111.

As will be described in detail hereinafter, an interrupt is generated by the SIO 41 both when the carrier appears on the cable 1 and when the carrier stops. These events are used to establish that other stations are connected to the cable 1 and are active. Also, by testing the state of the line 111 at the proper time, the system can determine if another station has responded to a "poll" command.

It should be apparent from the above description that the programmable controller interface circuit 10 must perform a number of different tasks. It must receive messages from the cable 1 and couple them to the programmable controller 9, it must receive messages from the programmable controller 9 and transmit them on the cable 1 to another station, and it must convey data between the programmable controller 9 and its program loader 15. All of these tasks are carried out by the microprocessor 25 under the direction of instructions contained in a number of programs. These programs are stored in the read-only memory 29 and they are read out and executed in sequence by the microprocessor 25.

Figure 6:
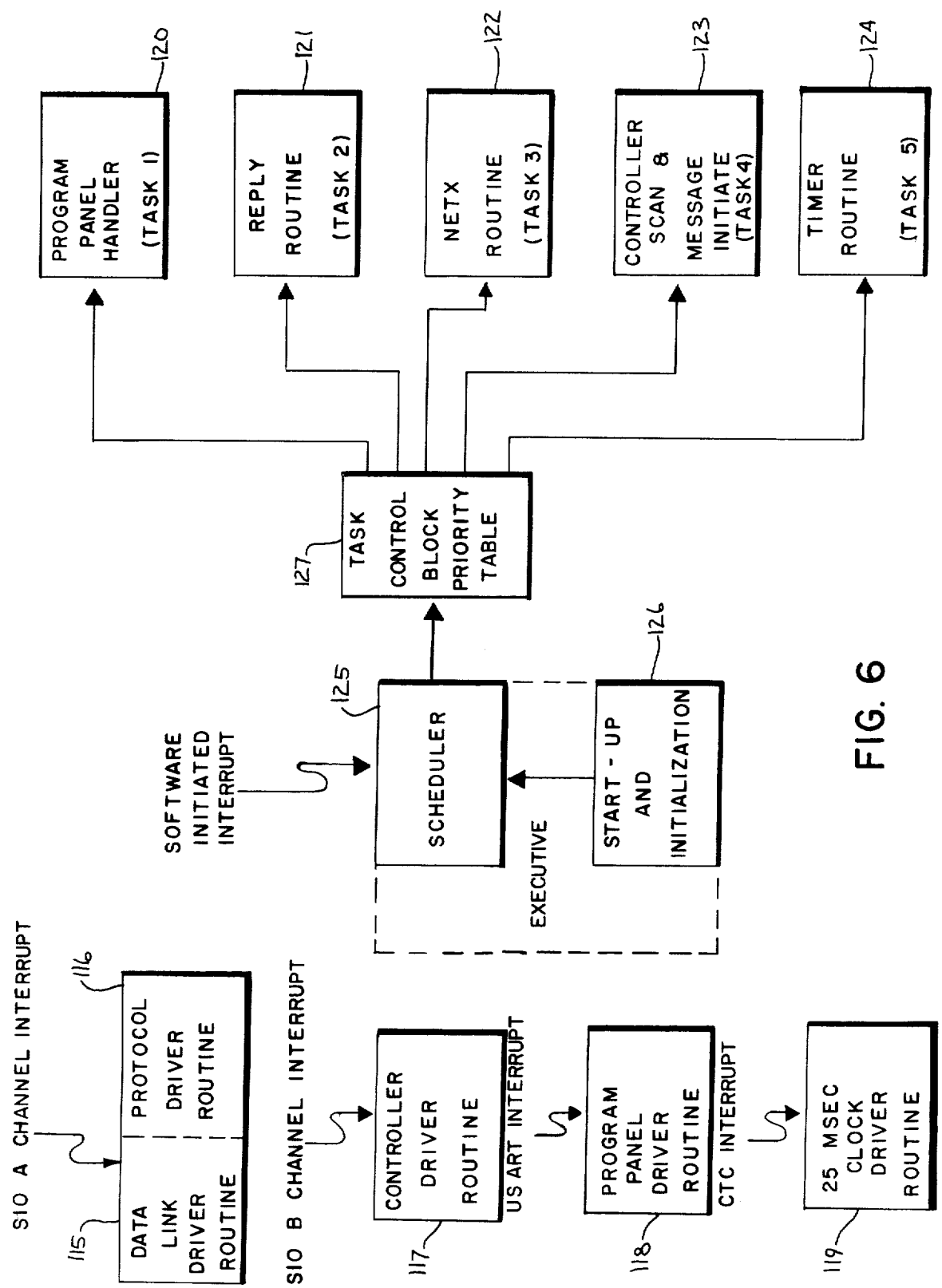
FIG. 6 is a block diagram of the interface module software system.

Referring particularly to FIG. 6, the programs which direct the microprocessor 25 through the tasks it must perform are arranged in modules, each of which is comprised of one or more routines or subroutines. There are two types of routines, those which are executed in response to events that generate interrupts and those which are executed in response to events which occur as a result of the execution of programs.

The first type of routine is referred to herein as a driver and the system includes the following: a data link driver routine 115 and protocol drive routine 116 which are executed in response to interrupts generated by the A channel of the SIO 41; a controller driver routine 117 which is executed in response to an interrupt generated by the B channel of the SIO 41; a program panel driver routine 118 which is executed in response to an interrupt generated by the USART 55; and a 25 msec. clock driver routine 119 which is executed in response to an interrupt generated by the CTC 44.

The second type of routine in the system is referred to herein as a "task". These include a program panel handler 120, a reply routine 121, a network command executor routine 122, a controller scan and message initiate routine 123, and a timer routine 124. These tasks are initiated at power-up and do not terminate. Instead, a task may suspend itself and wait for an event to occur before continuing or it may be interrupted and reentered after the interrupt is serviced.

Because more than one interrupt may occur at the same time and more than one task may be in condition for execution, a hardware and softwave priority system is employed to optimally allocate microprocessor execution time. Referring particularly to FIG. 3, the INT terminal on the microprocessor 25 is connected to the CTC 44, USART 55 and SIO 41 such that the SIO A channel, SIO B channel, USART and CTC have priority in that order. For example, if the CTC 44 and the SIO B channel request an interrupt, the SIO B channel is serviced first by the controller driver routine 117 and then the interrupt request by the CTC 44 is serviced by the clock driver routine 119. The driver routines 115-119 are thus prioritized by the interrupt circuitry.

Referring again to FIG. 6, when interrupts are not being serviced, a task can be executed and it is the function of a scheduler routine 125 to determine which task has the highest priority. The scheduler 125 is entered after a start-up and initialization routine 126 is executed and from that point on it is entered in response to a software initiated interrupt. Referring again to FIG. 3, this interrupt is generated by the output port 69 and is applied to the INT terminal on the microprocessor 25 through OR gate 61 and NAND gate 62. This interrupt has the lowest priority, and unlike the other interrupts which result from events that occur outside the controller interface 10, this software interrupt occurs when an "interrupt instruction" is executed by the microprocessor to output a "one" to the least significant bit of the output port 69. It is thus possible for any program in the system to call the scheduler 125 by executing this interrupt instruction. It should be noted, however, that this is an asynchronous software initiated interrupt, since it will be deferred until other interrupt routines are inactive.

Figure 7:
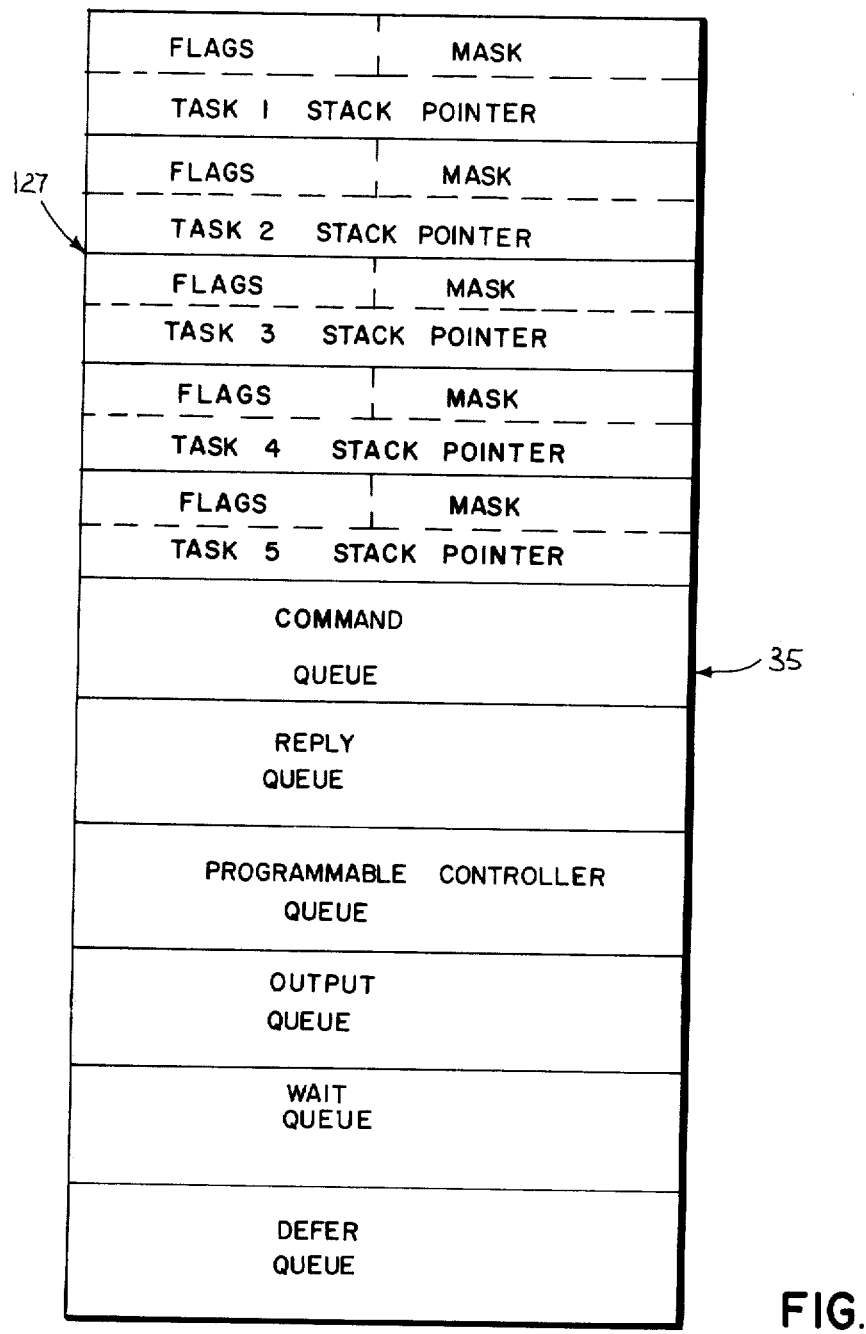
FIG. 7 is a map of a portion of the random access memory in the interface module of FIG. 3.

Referring particularly to FIGS. 6 and 7, the scheduler 125 determines which task has the highest priority by referring to a task control block priority table 127. The table 127 is stored in the random access memory 35 and for each of the five tasks 120-124 in the system, it stores an eight-bit flag word, an eight-bit mask and a stack pointer. The order in which these are arranged in the table 127 determines the priority of the task and the scheduler 125 operates to examine each task control block in order to determine the highest priority task which is ready to run. Bits 1-7 of the flag word in each task control block are used as event flags and bit 0 is the run flag. The scheduler 125 performs a logical AND of the flag word and mask, and if the result is non-zero, the task is ready to be executed.

The scheduler 125 initiates the execution of a task by employing the stack pointer to restore the "context" of the task in the microprocessor 25. The context of a task is the microprocessor state represented by the contents of the microprocessor registers AF, BC, DE, HL, IX, SP and PC. When a task is suspended or interrupted, its context is saved by pushing the contents of these registers on the stack and storing the stack pointer in the task's control block. The scheduler 125 restarts the task by "popping" its context from the stack and executing the next task instruction which is indicated by the program counter PC.

When the task has been run to its completion (i.e. typically until an I/O operation is initiated), the task calls a subroutine (WAITFR) which modifies the run bit and mask bits in the task control block and initiates a software interrupt by executing the "interrupt instruction". The context of the task is pushed onto the stack and the scheduler 125 is re-entered and executed to determine the next task to be run. Typically, before a task puts itself to sleep in this manner, it will set up data in a queue or buffer and then set an event flag in one of the other tasks in the system. Thus, when the scheduler 125 sequences through the task control block priority table 127, it detects the event flag which has been set by the previously executed task and activates the new task to operate on the data in the queue or buffer. A listing of the scheduler routine 125 is provided in Appendix A.

Referring to FIGS. 3 and 6, an example of the manner in which the drivers and tasks operate in combination with the scheduler is provided by the clock driver routine 119 and the timer task 124. The clock driver routine 119 is entered each time the 25 millisecond clock in the CTC 44 times out. This event generates a hardware interrupt which vectors the system to the clock driver routine 119. The driver routine 119 sets the event flag in the task control block for the timer routine 124 to indicate that one 25 millisecond "tick" of the clock has occurred, and then it generates a software interrupt by executing the interrupt instruction. As a result, the scheduler 125 is entered and it examines the task control block priority table 127 to determine if any tasks are ready to run. The event flag for the timer routine 124 is set, and assuming that no higher priority tasks are ready to run, the scheduler 125 will branch to the timer routine 124. The timer routine 124 stores counts which are each decremented by one after each 25 millisecond tick occurs. For example, one counter is preset to two and after two ticks, or 50 milliseconds, it is decremented to zero. When this occurs the timer routine 124 sets the event flag in the task control block for the controller scan and message initiate routine 123. After decrementing all of its counters, the timer routine generates the software interrupt and the scheduler 125 is entered. The scheduler detects that the event flag has been set for the routine 123, and in this manner, the routine 123 is executed every 50 milliseconds to read any messages from the programmable controller which are ready to be sent to another station on the communications network.

To better understand the manner in which the software modules operate and interact to receive and transmit messages on the cable 1, a brief explanation will first be made of the programmable controller 9. For a more detailed explanation of this programmable controller, however, reference is made to U.S. Pat. No. 4,165,534 which issued to Ernst Dummermuth, et al, on Aug. 21, 1979 and is entitled "Digital Control System With Boolean Processor".

Figure 8:
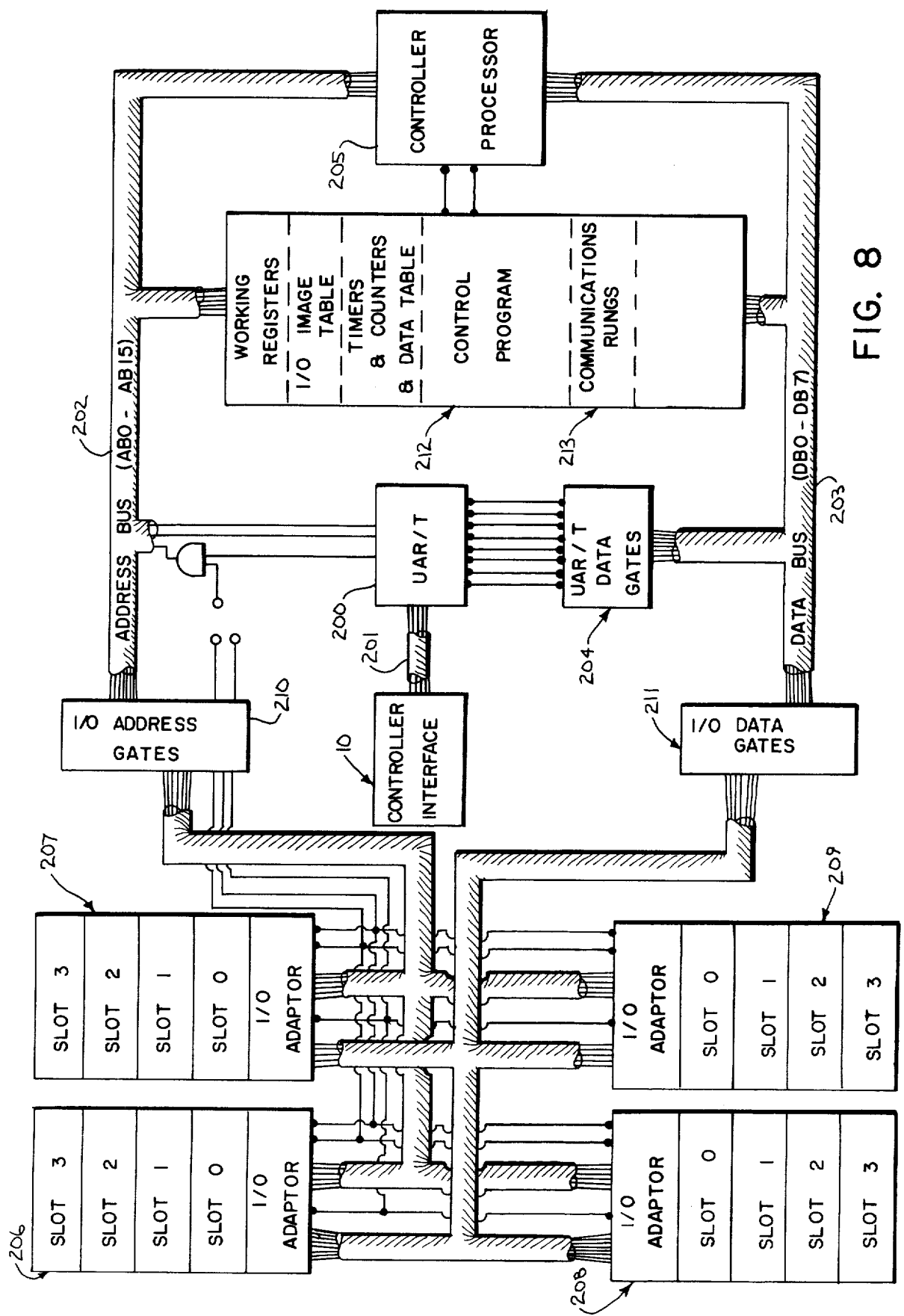
FIG. 8 is an electrical block diagram of a programmable controller which connects to the interface module of FIG. 3.

Referring particularly to FIG. 8, the programmable controller 9 includes a universal asynchronous receiver/transmitter, UAR/T 200 which connects to the SIO B channel of the programmable controller interface 10 through a cable 201. The UAR/T 200 connects to the controller address bus 202 and is coupled to an eight-bit data bus 203 by UAR/T data gates 204. The address bus 202 and the data bus 203 connect to a controller processor 205 which controls the flow of data on the data bus 203 by generating addresses on the address bus 202 that determine the source and destination of the data. One source of data or destination for data is the UAR/T 200. When an eight-bit byte of data is received by the UAR/T 200 from the controller interface 10, the UAR/T 200 interrupts the operation of the processor 205 and a UAR/T service routine is executed to input the byte of data through the data bus 203. On the other hand, the controller processor 205 may, in response to a command from the controller interface 10, write an eight-bit byte of data into the UAR/T 200 and initiate its serial transmission through the cable 201 to the controller interface 10.

The controller address bus 202 and data bus 203 also couple to I/O interface circuits 206-209 through I/O address gates 210 and I/Q data gates 211. The I/O interface circuits 206-209 connect to sensing devices such as switches and connect to operating devices such as motors and solenoids on a controlled machine. The controller processor 205 periodically executes an I/O scan routine which inputs data from the I/O circuits 206-209 and outputs data to them to control the operation of the machine. Typically this occurs once every twenty milliseconds or less.

The controller processor 205 is a programmed machine and the programs which control its operation, including the UAR/T service routine and I/O scan routine, are stored in a read-only memory which is not shown in the drawings. On the other hand, the control program which determines how the controlled machine is to be operated, as well as other data used to accomplish this operation, is stored in a random access memory 212 which connects to both the address bus 202 and the data bus 203. The controller processor 205 operates to sequentially read the control program instructions out of the memory 212 and to perform functions indicated by an operation code in each controller instruction. Such instructions include ones for examining the state of a selected sensing device connected to one of the I/O interface circuits 206-209 or ones for operating one of the operating devices on the controlled machine. There are numerous operation codes available for performing a variety of control functions and reference is made to the above-cited U.S. Pat. No. 4,165,534 for a more complete description of the control instruction set.

A general object of the present invention is to enable the programmable controller 9 to send messages containing commands or data to other stations on the communications network. Also, it is contemplated that other stations will send messages to the programmable controller 9. For example, the programmable controller 9 may be programmed to send a message to the computer control system 7 to indicate that a part has just passed a certain point on an assembly line. This message is to be sent every time a particular limit switch connected to the I/O interface circuits 206–209 closes, and therefore, an instruction is contained in the control program to determine when this event occurs. Consequently, the sending of a message by the programmable controller 9 occurs as a result of the control program execution.

Conversely, other controllers in the communications system may send messages to the programmable controller 9 which call for a particular operating device connected to the I/O interface circuits 206–209 to be energized. Such data is input through the UAR/T 200 to the controller processor 205 and it is then written into a designated location in the random access memory 212.

Figure 9:
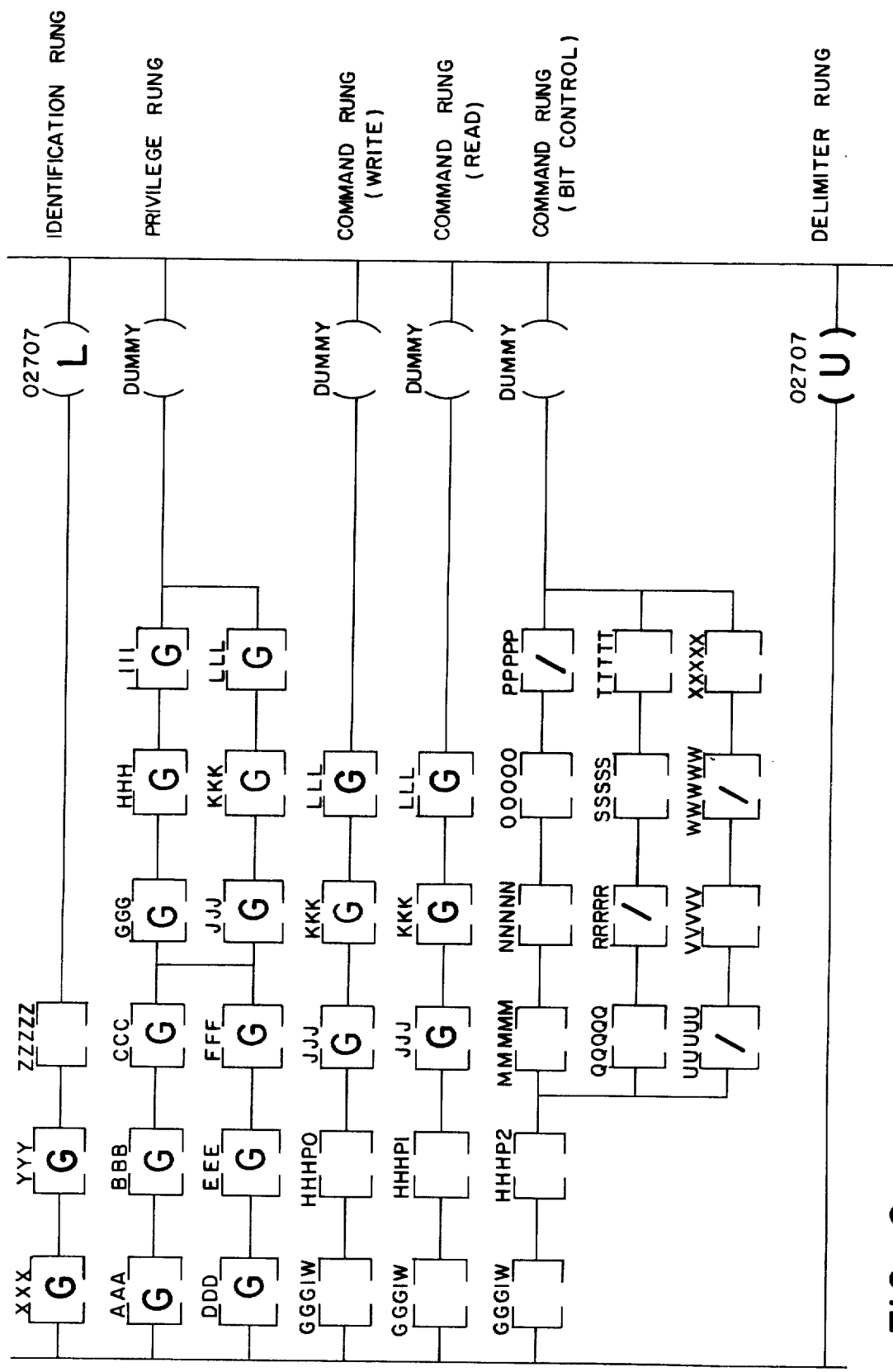
FIG. 9 is a rung diagram of the communications instructions stored in the programmable controller of FIG. 8.

Referring to FIGS. 8 and 9, to generate messages to other stations and to enable other stations to write data into the programmable controller's random access memory 212, the control program contains one or more "communications rungs" 213. The communications rungs 213 are comprised of controller instructions which are employed by the controller interface 10 to determine where in the controller memory 212 message data is stored, when such data is to be sent, and to which station the message data is to be sent. These communications rungs 213 also enable the controller interface 10 to determine if other stations can read data from or write data to the random access memory 212, and if so, which memory locations. Appendix H illustrates the format of the communications rungs 213 using programmable controller type instructions, and FIG. 9 illustrates the corresponding rung diagrams familiar to those skilled in the programmable controller art.

The controller instructions used to form the communications rungs 213 do not perform their usual control functions, but instead, they serve as codes which the programmable controller interface 10 can identify when it reads the communication rung data from the controller memory 212. Much of this data is stored in the controller interface random access memory 35 for use by the tasks 120–124. It should be apparent that although existing programmable controller operation codes are employed in the preferred embodiment described herein, new controller instructions could be defined which do not perform any control function, but instead, only serve to communicate with the programmable controller interface 10. Also, it should be apparent that Appendix H and FIG. 9 are only an example of the format and that many other privilege branches and command rungs may be added in any particular installation.

The programmable controller 9 initiates a command by setting the "start" bit for that command to a "one". The start bits are stored in the data table portion of the controller memory 212 and the programmable controller interface 10 operates to periodically read these start-done words and examine them to determine if any commands are to be executed. Of course, it is up to the user to write his control program such that the start bits are set at the proper time to carry out the desired functions.

When the controller interface 10 determines that a command rung start bit has been set, it reads out the command data for that rung from the communications rungs portion 213 of the controller memory 212. As will now be described in more detail, the controller interface 10 then forms a message and sends it to the destination station indicated by the active command rung, and when the reply has been received, it sets the appropriate "done" bit in the start-done word. The control program in the programmable controller contains instructions which detect this event and resets the start bit for the command rung and the controller interface then resets the done bit.

Referring particularly to FIG. 6, the periodic examination of the start-done words in the programmable controller memory 212 is performed by the controller scan and message execute task 123. This task 123 cycles once every 50 milliseconds, and during each such "scan", it examines one start-done word and initiates any messages which are indicated. To speed up this task, considerable data is stored in the controller interface memory 35 concerning the location and size of the communications rungs and the associated start-done words. This data is generated by a rung check routine (RUNGCK) which is executed both during power-up of the controller interface 10 and each time the programmable controller is switched into the RUN mode. A listing of the rung check routine is provided in Appendix B.

Figure 10:
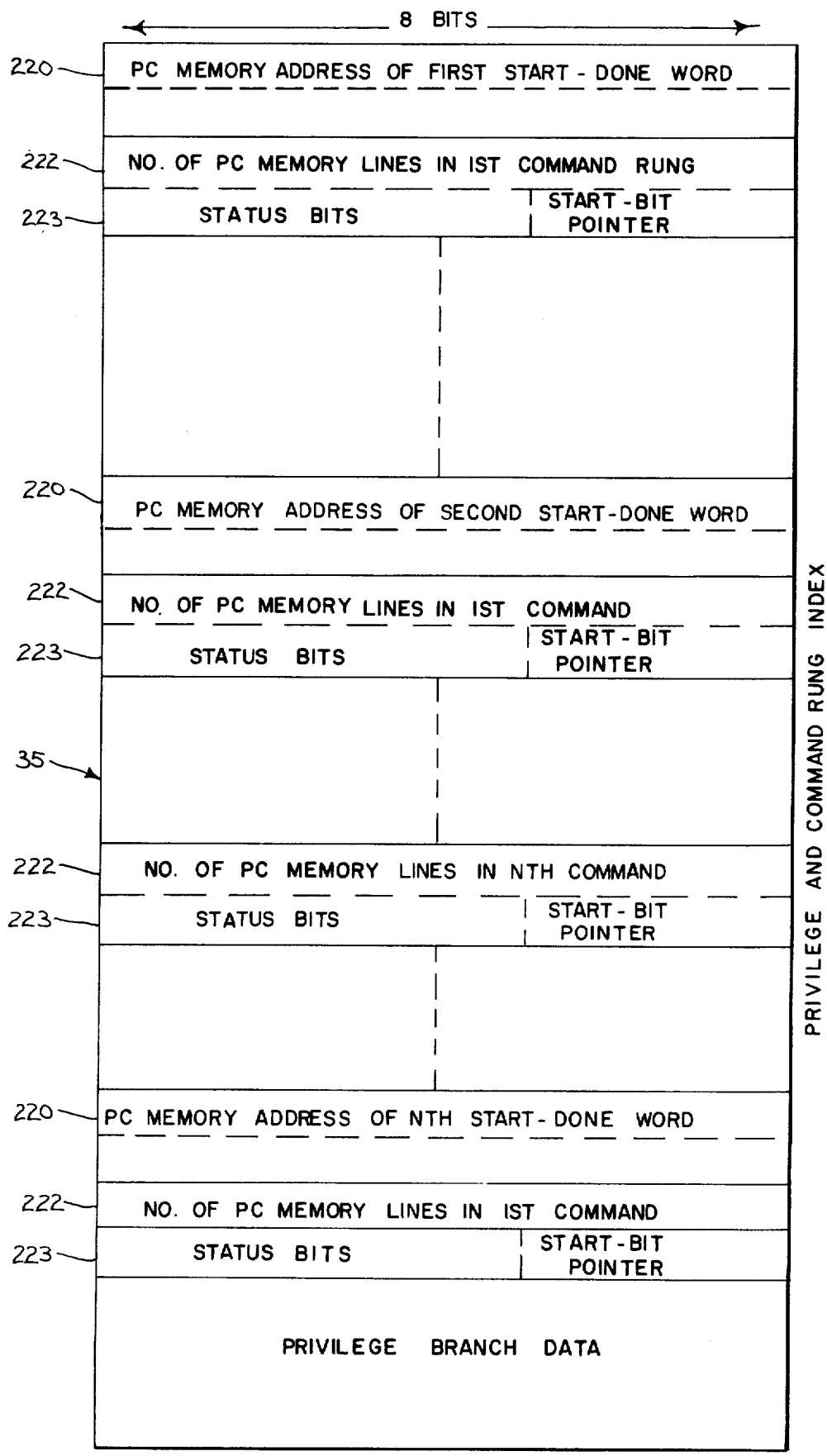
FIG. 10 is a map of a privilege and communications rung index portion of the interface module memory.

Referring particularly to FIG. 10, the communications rung data stored in the controller interface memory 10 is referred to herein as the command rung index. For each start-done word stored in the controller data table the command rung index stores its 16-bit memory address as indicated at 220. There is no limit to the number of start-done words which can be accommodated, although one or two is usually sufficient. Up to eight command rungs can be associated with each start-done word, and for each of these, a word 222 stores the number of lines the command rung occupies in the controller memory 212 and a word 223 stores a 3-bit pointer and up to five status bits. The rung size words 222 are employed by the scan task 123 to quickly index into the command rungs stored in the controller memory 212 to obtain needed data and the three-bit pointer indicates which one of the eight start bits in the start-done word is associated with that particular command rung. The status bits in the words 223 include a bit which indicates to the scan task 123 that the command rung is the last one associated with a particular start-done word, a bit which indicates that the command rung is the last one in the communications rungs 213, and a bit which indicates to the scan task 123 that the start bit for the command rung has previously been recognized and is being processed.

The rung check routine also extracts data from the privilege branches of the communications rungs 213 and stores it in the controller interface memory 35. This data includes a list of the station numbers which have privilege to write into the controller memory 212 along with data which indicates the memory address of the privilege branch associated with each listed station.

Figure 11:
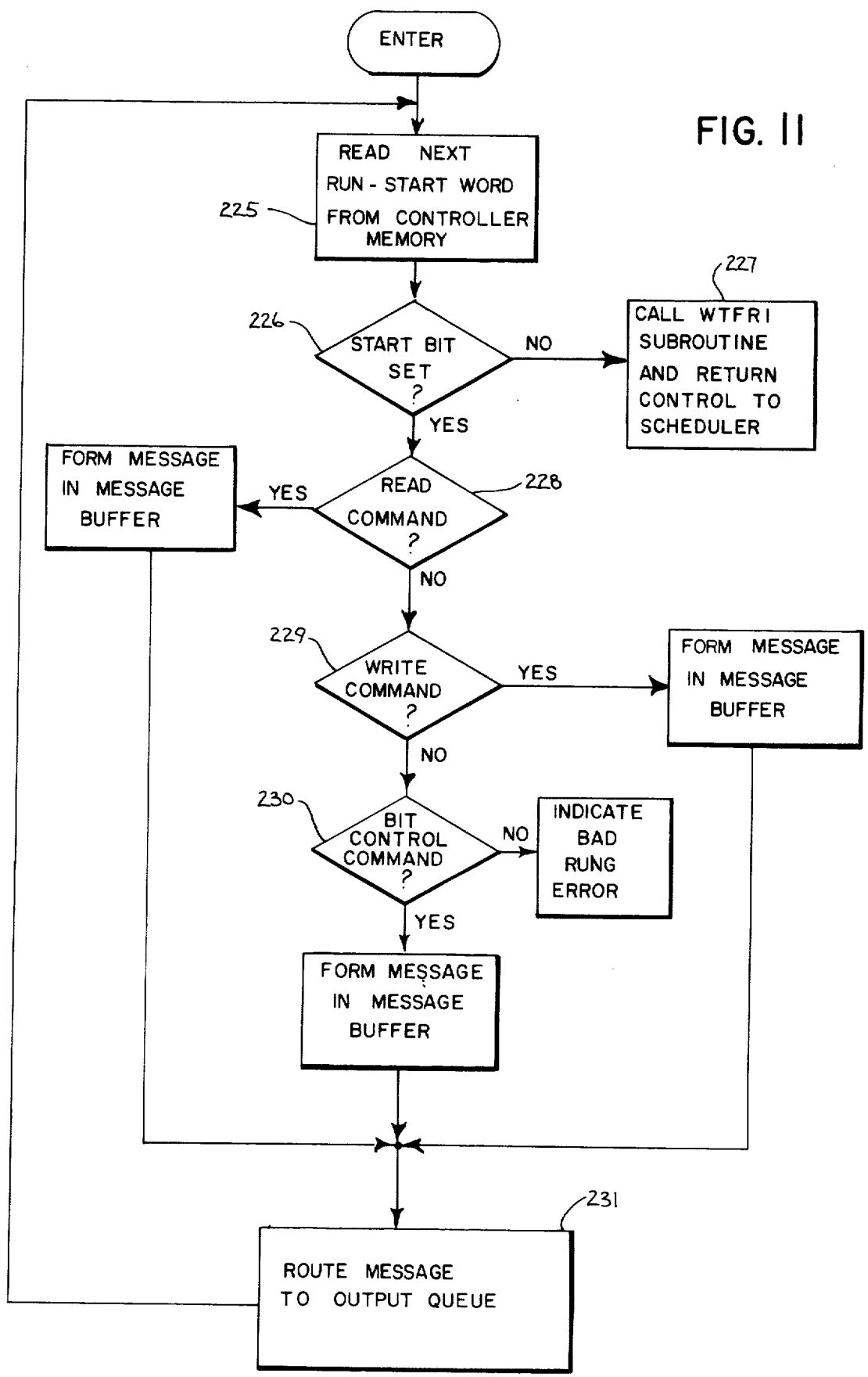
FIG. 11 is a flow chart of the controller scan and message execute routine which forms part of the system of FIG. 6.

As indicated above, the controller scan and message initiate task 123 is executed over every 50 milliseconds to determine whether the programmable controller 9 wishes to send a message to another station on the communications network. Referring to FIGS. 6 and 11, each time the task 123 cycles it executes a set of instructions indicated by process block 225 to read one of the start-done words from the programmable controller memory 212. It then examines the eight start bits to determine if any are set. As indicated by decision block 226, if none are set, a subroutine 227 is called up to return the system to the scheduler 125 by generating the software initiated interrupt.

On the other hand, if a start bit is set, a message is to be sent and the command instruction is read out of the controller memory 212 and examined to determine whether a read, write, or bit control message is to be sent. If data is to be read from a designated station as determined by decision block 228, the message is formed by reading the remaining data in the command rung out of the controller memory 212, attaching a header according to the communication network protocol, and storing it in a message buffer portion of the interface memory 35. Similarly, if a write command is detected at decision block 229 or a bit control command is detected at decision block 230, an appropriate message is formed and stored in a message buffer. As indicated by process block 231, a ROUTE subroutine is then called which is executed to transfer the message to an "output queue" in the memory 35. A listing of the scan and message initiate task 123 is provided in Appendix C.

As indicated above, the function of the scan and message initiate task 123 is to form read, write and bit control commands which are to be sent to other stations on the communications network. The format of the read command is as follows:

DEST SRCE CMD STS TRNS ADDRESS SIZE where:
DEST is the station number to which the message is being sent;
SRCE is the station number from which the message is sent;
CMD an eight bit byte in which bit 7, 0=message 1=status bit 6, 0=command 1=reply bit 5, 0=normal 1=priority bits 0–3, command type;
STS Not used in command message;
TRANS is an eight bit field that may be set to any value and which will be returned by the destination station in its reply;
ADDRESS is the 16-bit address in the destination station memory of the block of data to be read;
SIZE is the size in bytes of the block of data to be read.

The format of the write command is as follows:

DEST SRCE CMD STS TRNS ADDRESS DATA where:
DEST, SRCE, CMD and TRNS are the same as in the read command; and
ADDRESS is the 16-bit address in the destination station memory into which the block of data is to be written; and
DATA is the data to be written and it may be from 1 to 245 bytes in length.

The format of the bit control command is as follows:

DEST SRCE CMD STS TRNS 0–50 Bit Commands where:
each bit command contains a sixteen-bit address of a word in the programmable controller memory, a sixteen-bit mask of bits to be set, and a sixteen-bit mask of bits to be cleared.

The flow of command messages and other data between the communications network, the program panel and the programmable controller is shown schematically in FIG. 14. The various queues and buffers which are shown in this drawing and referred to in the following description are portions of the random access memory 35 which are allocated by a memory management routine. The memory management routine is actually a set of routines within the system executive which may be called to perform specific memory management functions. These include a GET routine which obtains and allocates memory space buffer or queue, a RELEASE routine which releases allocated memory space for general use, a LINK routine which links message data to a queue or buffer, and an UNLINK routine which takes a message from a queue or buffer.

Referring particularly to FIGS. 3 and 14, the flow of data between the program panel and the programmable controller is direct. The controller driver routine 117 operates the B channel of the SIO 41 to receive data from the programmable controller memory and couple it to the program panel handler 120. The program panel 15 contains a microprocessor which requests data via the cable 22. The program panel handler 120 receives these requests, checks them, and submits them to the PC queue. The controller driver routine 117 sends the requests to the programmable controller through the cable 23. In some cases the programmable controller responds with data which is received by the controller driver routine 117. The routine 117 sends the data to the program panel handler 120, which in turn, sends it to the program panel 15 over the serial cable 22.

As shown in FIG. 14, the controller driver routine 117 receives data for loading into the programmable controller from a number of sources. In addition to the program panel handler 120, these include the controller scan and message execute routine 123, the NETX routine 122 and the reply routine 121. Data from these sources is stored in a programmable controller (PC) queue portion of the memory and the controller driver routine 117 reads from this queue.

Figure 12:
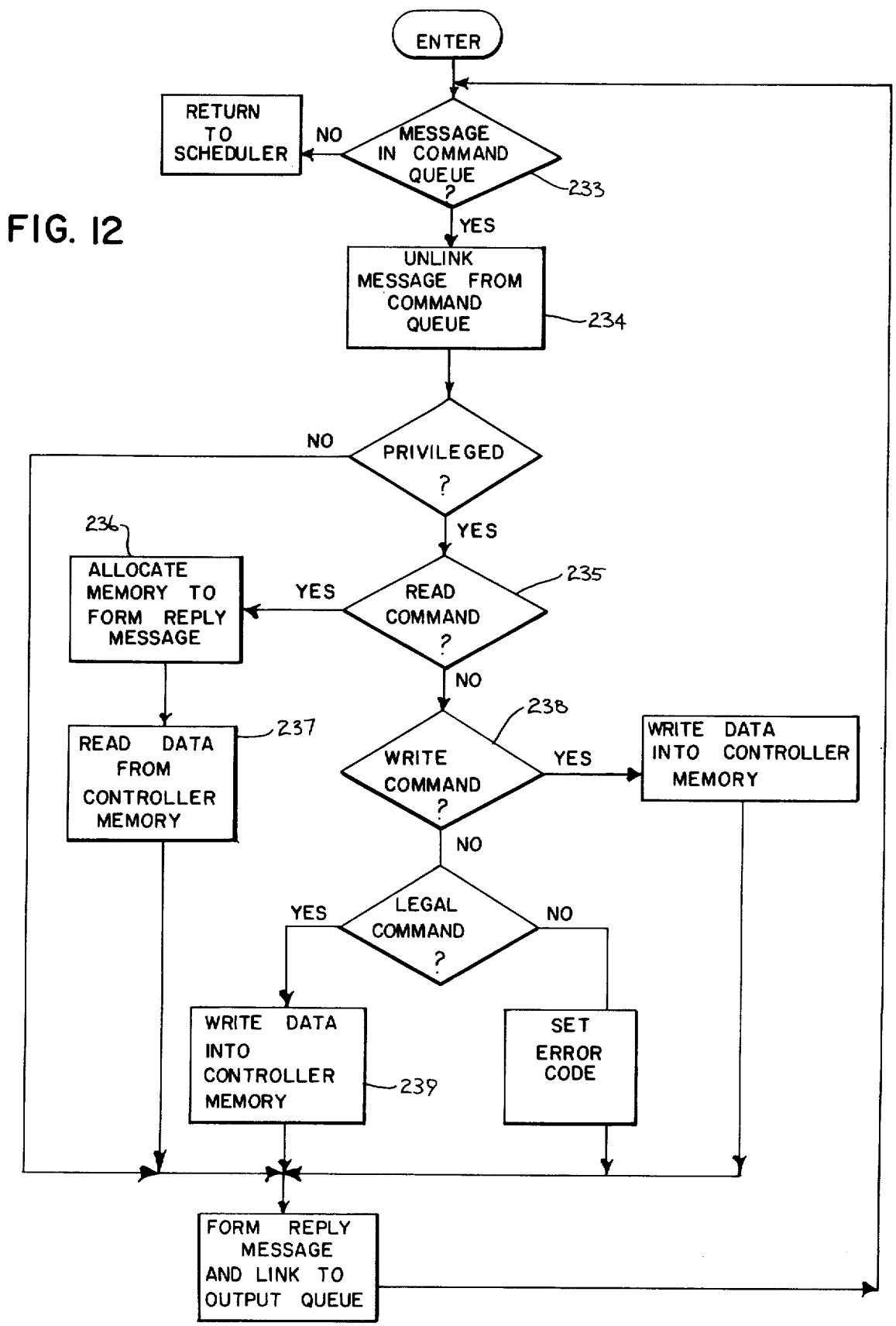
FIG. 12 is a flow chart of the NETX routine which forms a part of the system of FIG. 6, FIGS. 13A-D are flow charts of the protocal driver routine which forms part of the system of FIG. 6.

The NETX routine 122 is not only one source of data to the PC queue, but it also receives data from the controller driver routine 117. Referring to FIGS. 6, 12 and 14, it is the function of the NETX task 122 to execute command messages when they are received from another station and to generate a reply message back to the originating station. When the scheduler 125 activates the NETX task 122 it first resets the event flag in its task control block and then it checks to see if a command message is waiting for it in the command queue portion of the memory 35. If there is none, as determined by decision block 233, the system branches back to the scheduler 125. Otherwise, the message is unlinked as indicated by process block 234 and tests are made to determine if the sending station has privilege to read or write from the programmable memory. If not, as indicated by the decision block, a reply is generated which indicates no privilege to the sending station. Otherwise, tests are made on the CMD field of the message to determine if it is a read, write or bit control command. If it is a read command as determined at decision block 235, memory space (i.e. the reply buffer) is allocated at process block 236 for the data which is to be read from the programmable controller memory 212. As indicated by process block 237, the data at the controller memory location specified by the read command is then read from the controller memory 212 and used to form a reply message to the requesting station.

If the command message is a write command or a bit control command as indicated at decision block 238, the data in the command message is written into the specified location in the controller memory 212. Regardless of the command, a reply message is then formed as indicated at process block 239 and released to the output queue for transmission back to the originating station. If an illegal command is detected at the decision block, an error code is entered in the reply message before it is sent. The format of the reply messages are as follows and a listing of the NETX task is attached as Appendix D.

Read Command reply:

DEST SRCE CMD STS TRANS DATA where:
DEST is the station number of the originator of the command message;
SRCE is the station number of the station sending the reply;
STS is an eight bit status byte in which
0 = command execution confirmed
1 = illegal command
2 = PC manual intervention required
3 = reserved
4 = station memory full
5 = write protection violation
6 = reserved
7 = undeliverable message;
TRANS is an 8-bit field identical to that in the command message;
DATA is 1 to 253 bytes of data read from the controller memory.

Write command reply and bit control command reply:

DEST SRCE CMD STS TRANS

Where DEST, SRCE, STS and TRANS are the same as in the read command reply described above.

When a reply message is received at the station which generated the command message, the event flag in the task control block for the reply task 121 is set and the reply message is stored in a reply gueue. When the reply task 121 is activated by the scheduler 125, it unlinks the reply message from the reply queue and checks the STS field to determine if the command message was received properly. If it was, the done bit is set in the programmable controller memory 212 for the corresponding command rung and the system returns to the scheduler 125. If the reply is to a read command, however, it contains the requested data and the reply task 121 operates to write it into the designated location in the programmable controller memory 212. A listing of the reply task is attached as Appendix E.

Referring to FIGS. 3 and 6, messages placed on the output queue by the scan task 123 or the NETX task 122 are transmitted on the cable 1 through the A channel of the SIO 46 under direction of the protocol driver 116 and the data link driver 115. Similarly, messages received through the cable 1 and SIO 46 are processed by the drivers 115 and 116 and stored in either the command queue or the reply queue. As will become apparent from the description to follow, the data link driver 115 is in large part a set of subroutines which are called by the protocol driver 116 to perform specific functions. The subroutines will, therefore, be described in connection with the protocol driver 116.

The protocol driver 116 performs four basic functions. First, it obtains mastership of the communications network when there is a message in the station's output queue. Second, it transmits the message to another station on the network and accepts a status message, and third, it polls the other stations on the communications network to turn over mastership to one of them when there are no further messages in the output queue. And finally, when the station is not master the protocol driver 116 receives messages from other stations on the network and places them in the command queue or reply queue and it returns status messages to the sending stations. A listing of the protocol driver routine 116 which will now be described is provided in Appendix F and a listing of the associated data link drivers routine 115 is provided in Appendix G.

Figure 13A:
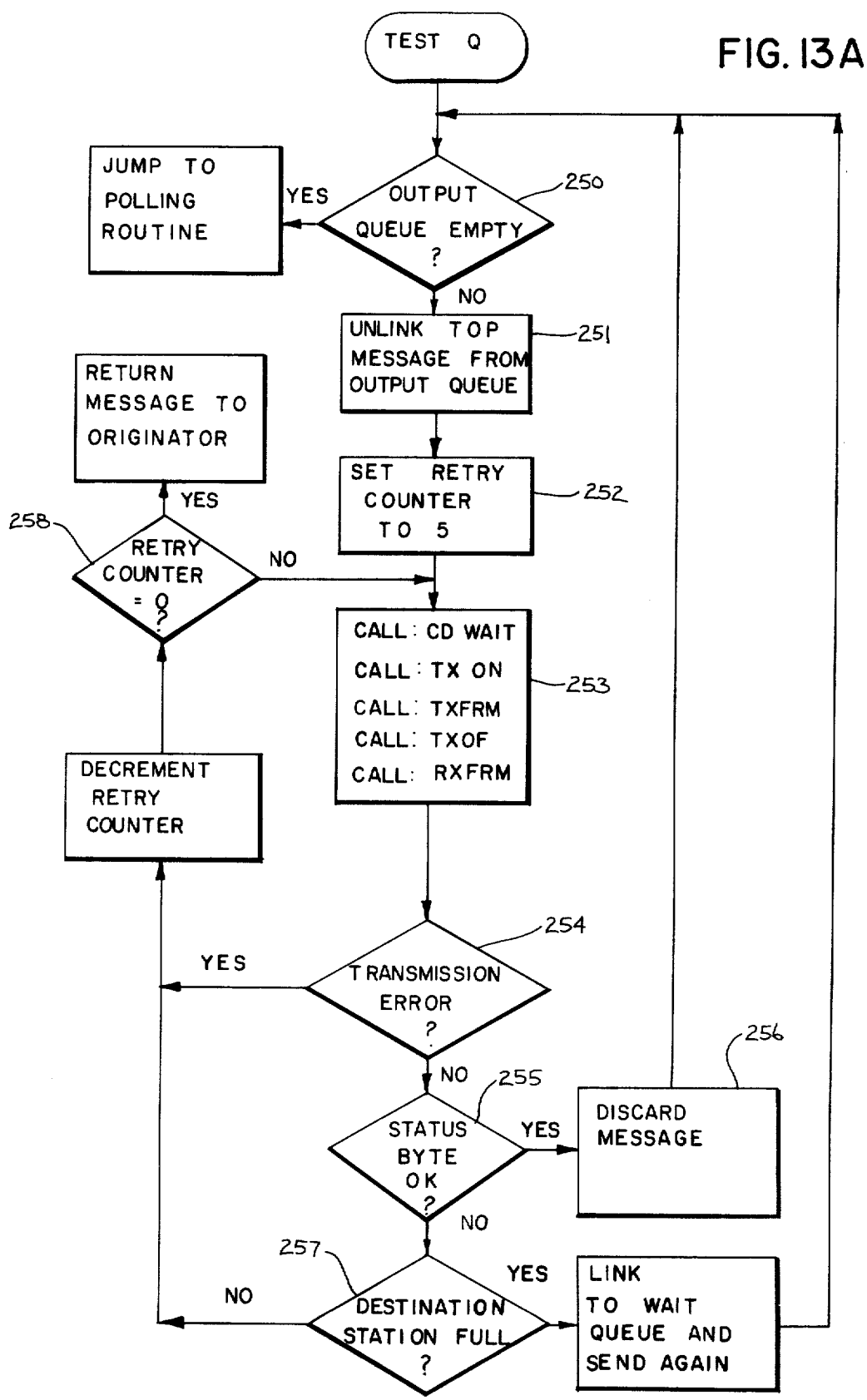

The function of sending messages on the communications network when the station is master is performed by a portion of the protocol driver labeled "TESTQ". Referring to the flowchart of this portion of the routine 116 shown in FIG. 13A, a loop is established in which the output queue is repeatedly checked as indicated by decision block 250. If there are no further messages to send, the system branches to the polling portion of the protocol driver routine 116, otherwise, a message is unlinked from the output queue as indicated by process block 251. A "retry" counter is then set to five as indicated by process block 252, and a series of subroutines in the data link driver 115 are then called to send the message and wait for a status message from the destination station. This series of subroutines is indicated by process block 253 and when the calls are complete, a check is made first, as indicated by decision block 254, to determine if the status message was timely and accurately received. If so, the contents of the status message is then examined as indicated at decision block 255 to determine if the message just sent was properly received by the destination station. If so, the message just sent is discarded and the system loops back to see if further messages are to be sent.

If a transmission error occurs during the transmission of either the message or its reply, as determined at decision blocks 254, 255 and 257, the system loops back to resend the message. If after six such transmissions, errors are still occurring, the system branches at decision block 258 and reports back to the task which originated the message that it cannot be delivered. Also, if the message cannot be delivered because the destination station does not have memory space available to receive it, the system branches at decision block 257 and the message is placed in the wait queue for retransmission at a later time.

After all of the messages on the station's output queue have been sent, the system branches to the polling portion of the protocol driver 116 which is labeled "SOPOL". Referring particularly to the flowchart in FIG. 13C, the purpose of SOPOL is to poll the other stations on the communications network for the purpose of relinquishing mastership to one of them. As indicated at process block 260, the system first calls a subroutine labeled "POLLIN" to form a global poll command message. This message is "addressed" to all stations on the network and contains parameters defining which stations may reply to the poll. Initially these parameters are set to enable any station to respond to a poll. Stations which come within these parameters are said to be "encompassed" by the poll command. It is sent, as indicated by process block 261, using the same set of link driver subroutines used to send a command or reply message. If any station on the network has a message in its output queue, that station (or stations) will reply by turning on its transmitter carrier for a short time interval. If none respond as determined at decision block 262, the output queue of the polling station is again checked to see if it has any messages to send. If not, as determined at decision block 263, the station repeats the polling procedure.

When a response to the global poll command is received, the system operates to turn over mastership to the responding station having the highest priority. First, as indicated by process block 264, a priority bit is set in the global poll command and it is sent, as indicated by process block 265. If one of the stations responding to the initial global command has a priority message, it will respond to the priority global poll command. If no priority messages are awaiting transmission in a station's output queue as determined at decision block 266, the priority bit is reset before the polling continues. In either case, a loop is then entered which progressively reduces the number of stations addressed by the poll command until a single station is addressed.

A binary search technique is used to find the single station having the highest priority which is responding to the poll command. As indicated by process block 267, the number of stations being polled is cut in half during each cycle through the loop so that only the lower half of the stations not eliminated by previous poll commands are addressed. The "halved" poll command is sent as indicated by process block 268 and if a response occurs, as indicated at decision block 269, the system loops back to process block 267 to again reduce by one-half the number of stations being polled.

On the other hand, if no response is received, the station desiring mastership must be in the other half and the system branches back through process block 271 to alter the poll command and to thereby address the other half. This process of polling and reducing the number of stations polled continues until eventually, as indicated by decision block 270, only a single station is polled and it responds. At this point, the polling station branches to wait for received messages (WTFRM) and the single polled station assumes mastership of the communications network (i.e. jumps to TESTQ). It should be noted that as between two or more stations requesting mastership, the search technique used herein will focus on the station with the lowest station number greater than the current master, and hence, a rotating priority scheme according to station number is established. Of course, any station having a priority message can respond to the priority poll command and obtain mastership over all stations having non-priority messages. The format of the poll command is shown and explained in Appendix H.

Figure 13B:
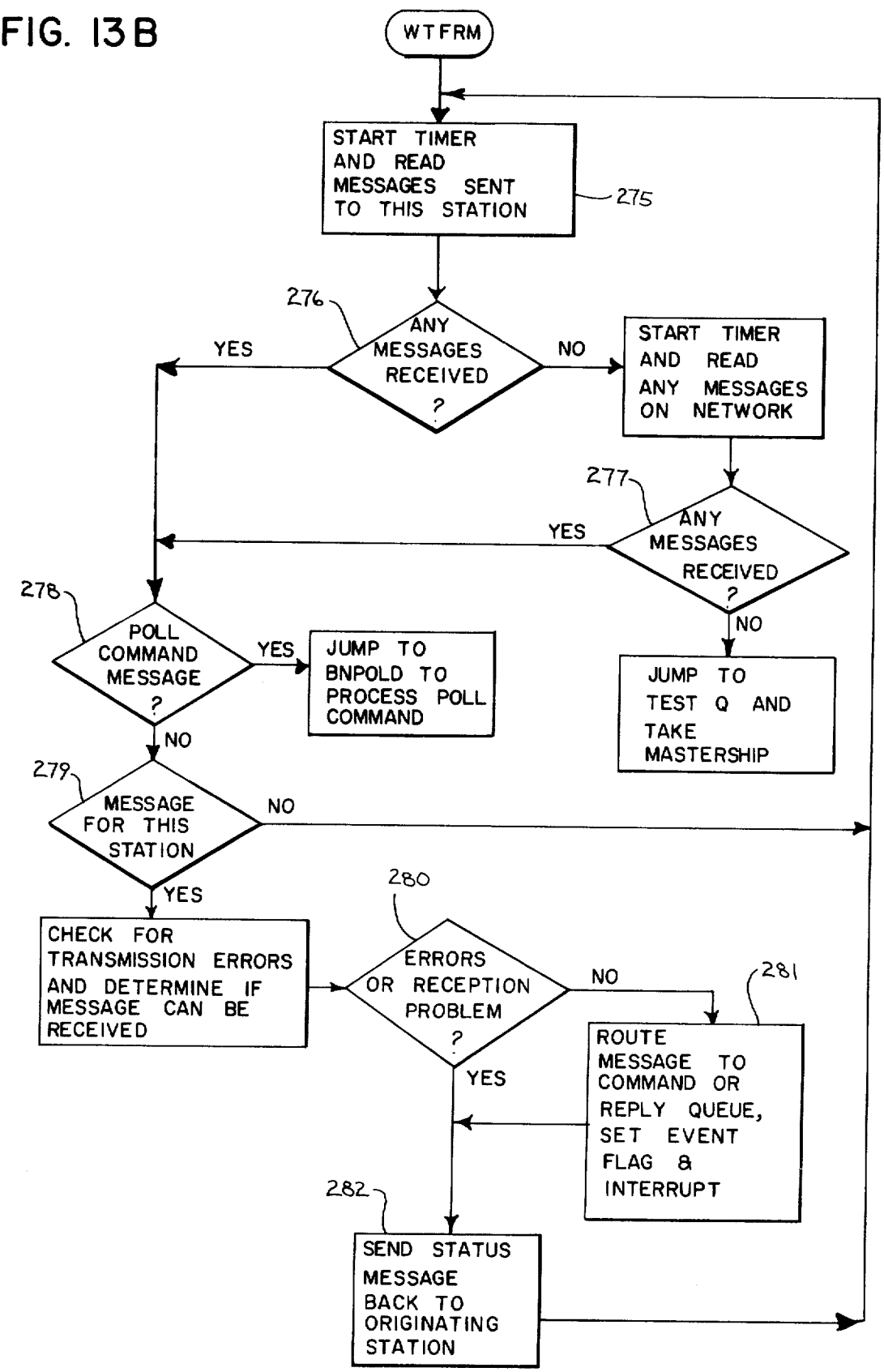
Figure 13C:
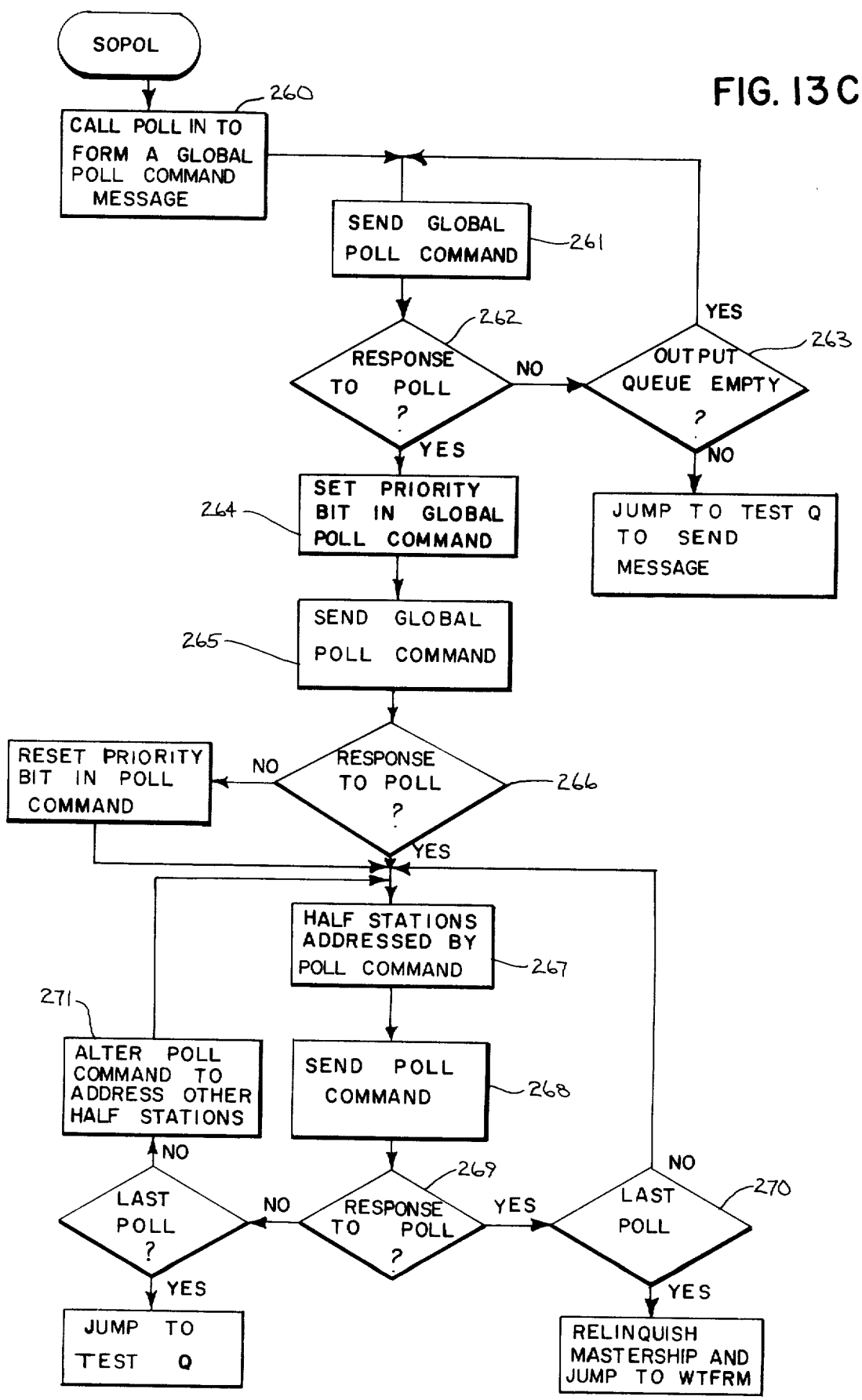

Referring particularly to FIG. 13B, when the programmable controller interface 10 is not master of the communication network, it waits for either a message directed to it or a poll command. During this state the protocol driver routine 116 is in a wait process (WTFRM) in which a timer is set and the station awaits a message directed to it as indicated by process block 275. If no messages are received before the timer times out, as determined at decision block 276, the timer is reset and the station looks for any messages on the network. If none are received, as determined at decision block 277, the system jumps to TESTQ and assumes mastership of the network. The timers in each station are set to different values and they will not, therefore, all attempt to assume mastership at the same time. Instead, the first to time out will assume mastership and send a message (either data or a poll command) which resets the timers in the other stations.

When a message is received by the station as determined at decision block 276 or decision block 277, its destination address field is examined to determine if it is a poll command. If it is (i.e. destination address is 255) as determined at decision block 278, the system branches to a routine (BNPOLD) which determines if a response is proper. If the message is not a poll command, the destination field of the message is examined to determine if it is directed to this station number. If not, as determined at decision block 279, the system branches back to WTFRM to await another message.

If a message for this station is received, checks are made to determine if the message was received without transmission errors and that there is memory space available to store the data in the message. If the message can be properly received as determined at decision block 280, the message is "handed over" to the command queue or reply queue as indicated at process block 281. Also, the proper event flag in the process control block is set and the software interrupt is initiated so that the scheduler 125 is entered. If the message was not received properly as determined at decision block 280, a non zero error code is generated and a status message containing the error code is sent back to the originating station. In any case, after sending the status message the system returns to wait for another message.

Figure 13D:
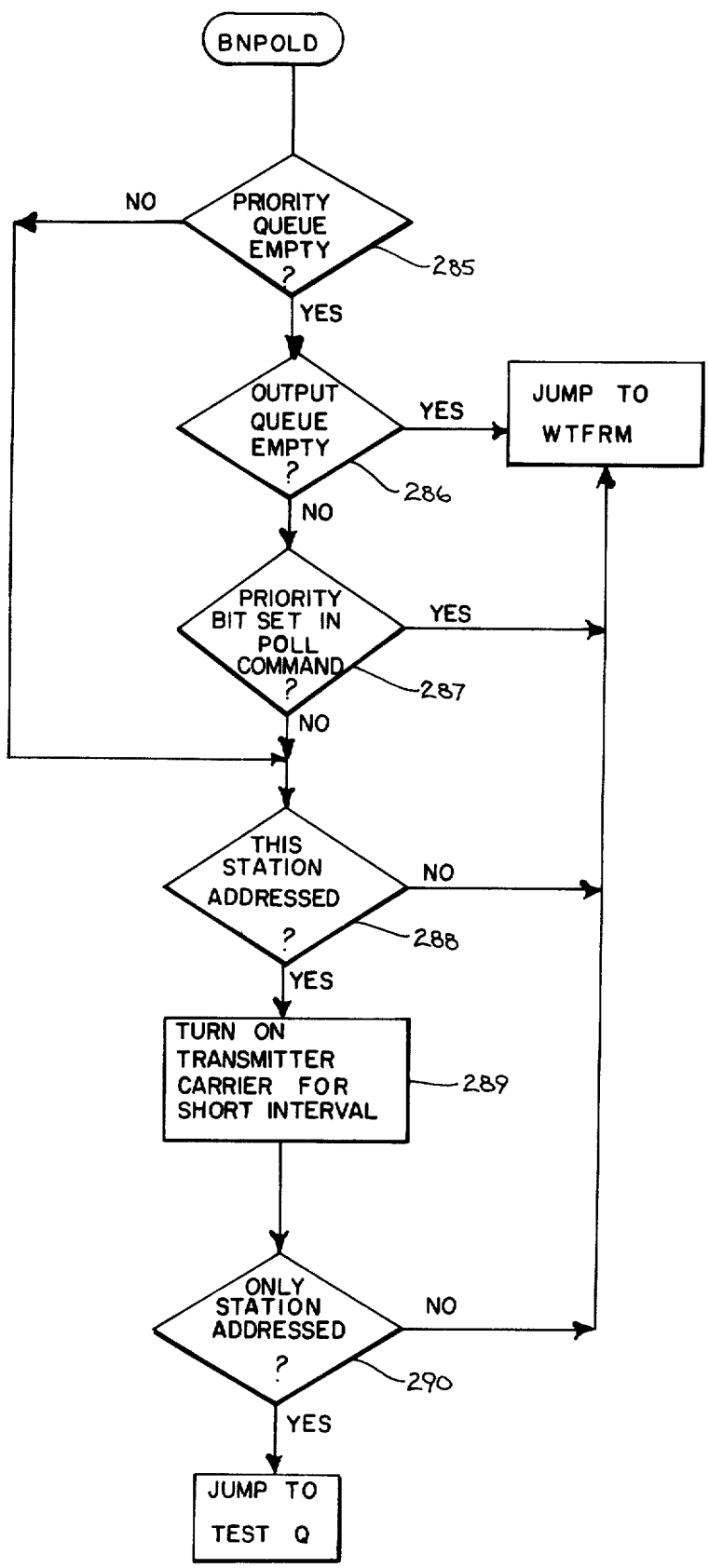

As indicated above, when a poll command is received by the programmable interface 10 it branches to a routine labeled "BNPOLD". Referring to the flow chart of this routine shown in FIG. 13D, a set of instructions indicated by decision block 285 are executed to determine if any priority messages are waiting to be transmitted by the station. If not, the output queue is then tested at decision block 286 to determine if any messages wait transmission, and if not, the system loops back to WTFRM to await receipt of the next message on the network.

If a message is in the station's output queue the poll command is examined at decision block 287 to determine if it is a priority poll. If so, and there are no messages in the station's priority output queue, the system loops back to await the next message. Otherwise, the poll command is examined at decision block 288 to determine if this station number is encompassed by the poll command address. If so, subroutines in the data link driver routine 115 are called up as indicated at process block 289 to respond positively to the poll command. This response is a properly timed burst of the station's transmitter. And finally, the poll command is re-examined to determine if it is only addressing this single station number. If it is, as determined at decision block 290, the system assumes mastership of the communication network by jumping to TESTQ. Otherwise, it loops to WTFRM to enable further poll command to be sent by the master station.

It should be apparent that there is a single master of the communications network at any point in time. However, mastership is transferred between stations according to a preselected priority scheme and any station on the communications network having a message to send will eventually become master. If a failure should occur in a station while it is master of the communication network, another station will take over after a preselected time interval has passed. Thus the network is not dependent on the operation of any single station. Mastership is transferred to another station after an orderly polling process has been conducted by the current master. Therefore, there is no contention for mastership which can result in unpredictable conditions.

It should be apparent that there is very little difference between the programmable controller interface 10 and the interface circuits employed to connect other equipment to the communications network. Referring to FIGS. 1, 3 and 6, the difference between the various interface circuits 8, 10, 13 and 14 occurs in the controller driver and receiver circuits 47 and the controller driver routine 117. The serial port provided by the USART 55 on the programmable controller interface 10 is not required on the others, and hence, this hardware and the associated software is eliminated. Almost all commercially available numerical control systems, process control systems and computer control systems provide an RS-232 standard serial port and, therefore, the remaining controller interface circuits 8, 13 and 14 may be virtually identical to one another. With respect to their functioning on the communications network, all of the controller interfaces 8, 10, 13 and 14 operate as described above.

Although the interface module described herein is a physically separate module, it should be apparent that the interface may be integrated into the apparatus with which it is associated. For example, the present invention may be implemented as an integral part of the microprocessor-based industrial terminal disclosed in co-pending U.S. patent application Ser. No. 75,176 which was filed on Sept. 12, 1979 and is entitled "Industrial Terminal."

APPENDIX A

```
IDEFLT   EQU    $
         PUSHA  SAVE              ALL REGISTERS
+
+
+
+
+
         IN     A,(.LOW.S8251)    IF USART CAUSED INTERRUPT GO
         AND    RXR51             EXECUTE PROGRAM PANEL DRIVER
         JP     Z,DISPAT
         JP     I8251
DISPTX   EQU    $
         OUT    (.LOW.SWIO),A     OTHERWISE RESET SOFTWARE
                                  INTERRUPT LATCH
         LD     ($-$),SP          SAVE SP IN CURRENT TASK
                                  CONTROL BLOCK
CFLAGX   EQU    $-2
         LD     HL,FLAGS-1        GET POINTER TO FLAG TABLES
DISLP    INC    L                 POINT TO NEXT FLAG
         LD     A,(HL)            GET FLAG
         INC    L                 POINT TO MASK
         AND    (HL)              TEST IF READY TO RUN
         JP     Z,DISLP-DISPTX+DISPAT    IF NOT READY LOOP
                                  UNTIL YES
         DEC    L                 GET FLAG ADDRESS
         SET    4,L               SP IS AT FLAG+16
         LD     (CFLAG),HL        SAVE NEW ACTIVE TASK POINTER
         LD     A,(HL)            GET NEW SP
         INC    L
         LD     H,(HL)
         LD     L,A
         LD     SP,HL
         POPA   RELOAD            TASK REGISTERS
         EI
         RET                      ;RESTART TASK
DISSIZ   EQU    S-DISPTX
         DSEG
DISPAT   DEFS   DISSIZ
CFLAG    EQU    DISPAT+(CFLAGX-DISPTX)
         ASEG
```

APPENDIX B

Rung Check Routine

| | | | |
|---|---|---|---|
| RUNGCK | EQU | $ | |
| | LD | HL,(PRVST) | IF THERE IS A RECIPE FILE |
| | LD | A,H | |
| | OR | L | |
| | LD | DE,FCOUNT | DELETE IT |
| | CALL | NZ,RELE | |
| | LD | HL,0 | |
| | LD | (SBFST),HL | ZERO START BIT FILE ADDRESS (AS A FLAG) |
| | LD | B,1 | ALLOCATE ONE BLOCK TO FILE |
| | CALL | GET | |
| | JP | Z,NOMEM | |
| | LD | (PRVST),HL | SAVE ADDR OF START OF FILE |
| | LD | (SBFAD),HL | SAVE FILE POINTER |
| | INC | HL | INITIALIZE PRIVILEGE FILE |
| | LD | (HL),0FFH | |
| | LD | HL,0FFFFH | RESET ADDRESS OF CONTROL WORD |
| | LD | (WRDAD),HL | |
| | LD | HL,00200H | CHECK TEST CODES |
| | LD | (PXPCB+AH),HL | |
| | CALL | XPCR | READ FROM 0002 |
| | LD | A,B | 0002 MUST BE 55 |
| | CP | 055H | |
| | JP | NZ,BADTST | |
| | ADD | C | 0003 MUST BE AA |
| | INC | A | |
| | JP | NZ,BADTST | |
| | LD | (IX+AL),0 | CALC SIZE OF DATA TABLE |
| | CALL | XPCR | (DONE BY PLC DRIVER) |
| | LD | HL,(PGADR) | GET ADDRESS OF CONTROL PROGRAM |
| | LD | (PXPCB+AH),HL | |
| SRCHG | LD | HL,0 | |
| | LD | (EWAD),HL | ZERO ERROR WORD ADDRESS |
| | LD | (ACWRD),HL | ACTIVATE WORD ADDRESS |
| | RST | TYPEI | GET AN OPCODE |
| | DEFB | ENDT | IF END OF MEM GO WAIT FOR PROGRAM |
| | JP | Z,PROGWT | |
| | CP | GETI | IF NOT OPCODE GET CONTINUE SEARCH |
| | JR | NZ,SRCHG | |
| | CALL | SHUFL | REFORMAT STATION ADDRESS AND COMPARE |
| | JR | NZ,SRCHG | |
| | CP | (IY+STNADR-Y) | SEARCH IF NO MATCH |
| | JR | NZ,SRCHG | |
| | RST | TYPEI | NEXT SHOULD BE ADDRESS OF STATUS WORD |
| | DEFB | GETT | |
| | JR | NZ,SRCHG | |
| | LD | (EWAD),DE | IF SO SAVE IT |
| | RST | TYPEI | NEXT SHOULD BE ADDRESS OF ACTIVATE BIT |
| | DEFB | XICT | |

|  |  |  |  |
|---|---|---|---|
|  | JR | NZ,SRCHG |  |
|  | LD | (ACWRD),DE | IF SO SAVE ADDRESS |
|  | LD | A,C | AND BIT NUMBER |
|  | LD | (ACBIT),A |  |
|  | RST | TYPEI | NEXT SHOULD BE OTL02707 |
|  | DEFB | OTLT |  |
|  | JR | NZ,SRCHG |  |
|  | RST | TYPEI | NEXT CAN BE: |
|  | DEFB | OTUT | OTU 02707 IF THERE IS NOTHING |
|  | JP | Z,SBSCIN |  |
|  | CP | XICT | XIC IF THERE ARE NO PRIVILEGES |
|  | JR | Z,SCUM |  |
|  | CP | BSTT | OR START OF PRIVILEGES |
|  | JR | NZ,BADRNX | IF (D) NONE OF THE ABOVE: ERROR. |
| SPRIV | RST | TYPEI | NEXT THREE MUST BE GETS |
|  | DEFB | GETT |  |
|  | JR | NZ,BADRNX |  |
|  | CALL | SHUFL | CONVERT TO A SENSIBLE FORMAT |
|  | JP | NZ,BADSTN |  |
|  | PUSH | AF |  |
|  | CALL | GSBQB | GET A BYTE FROM FILE |
|  | POP | AF |  |
|  | LD | (HL),A | SAVE STATION ADDRESS |
|  | RST | TYPEI |  |
|  | DEFB | GETT |  |
|  | JR | NZ,BADRNX |  |
|  | RST | TYPEI |  |
|  | DEFB | GETT |  |
|  | JR | NZ,BADRNX |  |
|  | RST | TYPEI | NEXT CAN BE: |
|  | DEFB | BSTT | BST; GO FOR ANOTHER PRIVILEGE |
|  | JR | Z,SPRIV |  |
|  | CP | BNDT | OR BND; ELSE ILLEGAL |
|  | JR | NZ,BADRNX |  |
|  | RST | TYPEI | NEXT MUST BE OUTPUT INSTR |
|  | DEFB | OUTT |  |
|  | JR | NZ,BADRNX |  |
|  | RST | TYPEI | NEXT MAY BE: |
|  | DEFB | BST1 | BST; GO GET MORE PRIVILEGES |
|  | JR | Z,SPRIV |  |
|  | CALL | GSBQB | GET AN END OF FILE BYTE |
|  | LD | (HL),OFFH |  |
|  | CP | OTUT | OTU; END OF RUNGS |
|  | JP | Z,SBSCIN |  |
|  | CP | XICT | ELSE MUST BE XIC; START OF COMMAND RUNGS |
| BADRNX | JP | NZ,BADRNG |  |
| SCOM | LD | HL,(SBFAD) |  |
|  | LD | (SBFST),HL | SAVE ADDRESS OF START OF COMMAND FILE |
|  | LD | HL,(PXPCB+AH) | SAVE ADDRESS OF START OF COMMAND RUNGS |
|  | CALL | DEC2HL |  |
|  | LD | (CUMST),HL |  |
| NXCOM | BIT | 0,D | START BIT MUST BE IN ODD BYTE |
|  | JP | Z,BADRNG |  |
|  | RES | 0,D |  |
|  | LD | HL,(WRDAD) | IF DIFFERENT WORD ADDRESS |
|  | AND | A |  |

```
                SBC     HL,DE
                JR      Z,SMWRD
                LD      HL,(SBFAD)          SET END OF BYTE BIT
                SET     NDBY,(HL)·
                CALL    GSBQB               AND SAVE ADDRESS OF NEW BYTE
                LD      (HL),E
                CALL    GSBQB
                LD      (HL),D
                LD      (WRDAD),DE          SAVE NEW WORD ADDRESS
       SMWRD    CALL    GSBQB               RESERVE SPACE FOR RUNG SIZE
                LD      (STRTBT),HL         SAVE ADDRESS TEMPORARILY
                LD      (IY+RUNGSZ-Y),0     CLEAR RUNG SIZE COUNTER
                CALL    GSBQB               SAVE BIT NUMBER
                LD      A,C
                LD      (HL),A
                RST     TYPEI
                DEFB    XICT                NEXT INSTR MUST BE COMMAND XIC
                JR      NZ,BADRNX
                LD      A,C                 CHECK FOR READ, WRITE, OR
                                            BIT COMMAND
                AND     B
                CP      Z                   IF READ OR WRITE GO CHECK
                                            THREE GETS
                JR      C,RWCOM
                JR      NZ,BADRN            IF NOT BIT ITS INVALID
       ;BIT RUNG MAY CONTAIN ANY COMBINATION OF XIC, SIO, BST, AND BND
       ;UNTIL AN OUTPUT IS ENCOUNTERED
       BITRNG   RST     TYPEI
                DEFB    XICT
                JR      Z,BITRNG
                CP      XIOT
                JR      Z,BITRNG
                CP      BSTT
                JR      Z,BITRNG
                CP      BNDT
                JR      Z,BITRNG
                CP      OUTT
                JR      NZ,BADRN
                JR      NXCMD               THEN GO GET NEXT COMMAND
       RWCOM    RST     TYPEI               NEXT THREE MUST BE GETS
                DEFB    GETT
                JR      NZ,BADRN
                RST     TYPEI
                DEFB    GETT
                JR      NZ,BADRN
                RST     TYPEI
                DEFB    GETT
                JR      NZ,BADRN
                RST     TYPEI               REST OF RUNG MAY BE MOST
                                            ANYTHING
                DEFB    OUTT
                JR      NZ,BADRN
       NXCMD    LD      A,(RUNGSZ)          SAVE RUNGSIZE IN FILE
                INC     A
                LD      HL,(STRTBT)         FILE ADDRESS WAS STASHED HERE
                LD      (HL),A
                RST     TYPEI               NEXT MAY BE;
                DEFB    OTUT                END OF FILES
                JR      Z,SNFB
                CP      XICT                OR ANOTHER COMMAND RUNG
                JP      Z,NXCOM
```

```
BADRN     JP      BADRNG
SNFB      LD      HL,(SBFAD)      SET END OF FILE BIT
          SET     NSF,(HL)
          SET     NDBY,(HL)       AND END OF CONTROL WORD BIT
          JP      SBSCIN          GO START SCANNING
BADTS     JP      BADTST
;SUBROUTINE TO GET A BYTE
GSBQB     PUSH    AF
          LD      HL,(SBFAD)      GET FILE POINTER
          INC     L               ADVANCE TO NEXT BYTE
          LD      A,L             IF NOT END OF BLOCK
          AND     00FH
          XOR     00FH
          JR      NZ,ZBT          GO XAP BYTE
          OR      (HL)            CHECK FOR ZERO POINTER
          CALL    NZ,GTADBA       IF NOT JUST GET NEXT BUFFER
          JR      NZ,ZBT          AND ZERO BYTE (THIS SHOULDNT
                                  HAPPEN)
          PUSH    DE
          PUSH    HL
          PUSH    BC
          LD      DE,FCOUNT       GET A BLOCK
          LD      B,1
          CALL    GET
          JP      Z,NSBMEM
          POP     BC
          PKPTR   GET             POINTER TO NEW BLOCK
+
+
+
+
          POP     DE              LINK NEW BLOCK TO OLD ONE
          LD      (DE),A
          POP     DE
ZBT       LD      (SBFAD),HL      SAVE NEW FILE ADDRESS
          LD      (HL),0          ZAP NEW BYTE
          POP     AF
          RET
SVSIZ     LD      HL,(STRTBT)     GET ADDR FROM KLUDGE STORE
          LD      A,(RUNGSZ)
          LD      (HL),A
          RET
          END
```

APPENDIX C

Controller Scan And Message Execute Task

```
SBSCIN   SET      POK,(IY+PXBITS-Y)   SET PROGRAM OK FLAG
         LD       (IY+SBINDX-Y),-1    RESET RUNG COUNTER
         LD       HL,(COMST)          INITIALIZE ADDRESS OF START
                                      OF COMMUNICATION
         LD       (SBADR),HL
         LD       HL,(SBFST)          GET ADDRESS OF START OF
                                      START BIT FILE
         LD       (SBFAD),HL
         LD       A,H
         OR       L
         JR       Z,PROGWT            IF NO START BITS WAIT
                                      FOR PROGRAM
SBYTE    EQU      $                   IF SCAN TIMER IS NOT UP
                                      YET WAIT FOR IT
         LD       A,(PXTMR)           IF TIMER IS RUNNING
         INC      A
         LD       A,2**FT             WAIT FOR COMPLETION OF
                                      INTERVAL
         CALL     NZ,WTFR1
         RES      FT,(IY+PFLAG-Y)     RESET TIMER BIT
         TEVENT   PTIME,1,PX          START SCAN TIMER (50 MS)
+
+
+
+
         CALL     STSCK               GET PLC STATUS
         JR       NZ,WSCN             IF ERROR TRY LATER
         AND      2**RUN              IF NOT RUN GO WAIT FOR
                                      RUN
         JR       Z,SCAN
         CALL     GETFIL              GET FILE POINTER
         LD       E,(HL)              GET BYTE ADDRESS FROM
                                      FILE
         CALL     GETFIL
         LD       D,(HL)
         EX       DE,HL
         LD       (WRDAD),HL          SAVE WORD ADDRESS
         LD       (PXPCB+AH),HL
         CALL     XPCR                READ START AND DONE
                                      BITS
         JP       NZ,PCBAD
         LD       (STRTBT),BC         SAVE START AND DONE BITS
         RES      WDN,(IY+PXBITS-Y)   RESET DONE BIT MODIFY
                                      FLAG
ICODE    EQU      $                   GET AND PROCESS NEXT
                                      RUNG POINTER
         BIT      POK,(IY+PXBITS-Y)   IF PROGRAM BAD GO
                                      CHECK RUNGS
         JP       Z,SCAN
         INC      (IY+SBINDX-Y)       INCREMENT START BIT INDEX
         CALL     GETFIL              GET SIZE OF RUNG
         LD       A,(HL)
         LD       (RUNGSZ),A
         CALL     GETFIL              GET START BIT FLAGS
         LD       C,(HL)
         CALL     GMASK               GENERATE BIT MASK FROM
                                      BIT NUMBER (BITS 0)
```

```
                LD      B,A
                LD      A,(STRTBT)          GET START BITS
                AND     B                   MASK BIT OF INTEREST
                JR      NZ,STRTON           JUMP IF START BIT ON
;START BIT OFF
                RES     RSTS,(HL)           RESET RUNG ACTIVE BIT
                LD      A,(DONEBT)          GET DONE BITS
                AND     B                   MASK THE ONE WE WANT
                JR      NZ,RSDONE           IF START OFF AND DONE
                                            ON GO RESET DONE BIT
                JR      ENDRNG              THEN GO FINISH UP RUNG
;DONE BIT ON, RESET IT
RSDONE          LD      A,B                 GET MASK
                CPL                         RESET DONE BIT
                AND     (IY+DONEBT-Y)
                LD      (DONEBT),A
                SET     WDN,(IY+PXBITS-Y)   SET DONE BIT MODIFIED BIT
                JR      ENDRNG
;START BIT ON
STRTON          LD      A,(DONEBT)          GET DONE BITS
                AND     B                   GET THE ONE WE WANT
                JR      Z,EXRUNG            IF START ON AND DONE OFF
                                            GO EXAMINE FURTHER
ENDRNG          LD      A,(RUNGSZ)          ADD SIZE TO GET ADDRESS
                                            OF NEXT RUNG
                LD      HL,(SBADR)
                ADD     A                   DOUBLE NUMBER OF WORDS
                                            TO BYTES
                LD      B,A
                LD      A,L                 ADD CARRY TO HIGH BYTE
                ADC     0
                LD      A,L
                LD      A,B                 ADD N BYTES TO LOW BYTE
                ADD     H
                LD      H,A
                LD      A,L                 ADD CARRY TO HIGH BYTE
                ADC     0
                LD      L,A
                LD      (SBADR),HL
                LD      HL,(SBFAD)          GET  ADDR OF CURRENT
                                            FILE BYTE
                BIT     NDBY,(HL)           IF NEXT START BIT IS IN
                                            SAME BYTE GO PROCE
                JR      Z,ICODE
                BIT     WDN,(IY+PXBITS-Y)   IF DONE BIT WAS MODIFIED
                                            WRITE IT BACK
                JR      Z,NOWRIT
                LD      HL,(WRDAD)          GET ADDRESS OF DONE BITS
                LD      (PXPCB+AH),HL
                LD      A,(DONEBT)          WRITE DONE BITS
                LD      (IX+DH),A
                CALL    XPCW
                JP      NZ,PCBAD
NOWRIT          LD      HL,(SBFAD)          GET ADDRESS OF START
                                            BIT DESCRIPTION AGAIN
                BIT     NSF,(HL)            IF END NOT END OF FILE
                                            GO DO MORE BYTES
                JP      Z,SBYTE
                JP      SBSCIN              ELSE INITIALIZE AND
                                            RESTART FILE
```

```
;SUBROUTINE TO GET AND INCREMENT A POINTER
 THROUGH THE START BIT FILE
GETFIL   LD       HL,(SBFAD)        GET FILE ADDRESS IN HL
         CALL     INCBLK            INCREMENT TO NEXT WORD
         LD       (SBFAD),HL        SAVE TIL NEXT TIME
         RET
;TIMEOUT ROUTINES
PTIME    SET      FT,(IY+PFLAG-Y)
         SWI
         RET
;ROUTINE TO INTERPRET A RUNG AND SEND COMMAND MESSAGES WHEN
 START BIT SET
EXRUNG   EQU      $
         BIT      RSTS,C            IF MESSAGE ALREADY SENT
                                    JUST RETURN
         JR       NZ,ENDRNG
         LD       HL,(SBADR)        GET ADDRESS OF RUNG
         LD       (PXPCB+AH),HL
         LD       H,C               SAVE CODE CONTAINING
                                    BIT NUMBER
         CALL     GTAD              READ FIRST INSTRUCTION
         JP       NZ,BADPC
         LD       A,H               VERIFY THAT RUNG STARTS
                                    WITH EXPECTED XIC
         OR       XIC
         LD       H,A               SAVE XIC INSTRUCTION
         CP       C
         JR       NZ,MEMCHG
         BIT      0,D               CHECK FOR ODD ADDRESS
         JR       Z,MEMCHG
         RES      0,D
         PUSH     HL
         LD       HL,(WRDAD)        CHECK FOR SAME ADDRESS
         AND      A
         SBC      HL,DE
         POP      HL
         JR       NZ,MEMCHG
         CALL     TYPE              READ AND CHECK COMMAND
                                    INSTRUCTION
         CP       XICT
         JR       NZ,MEMCHG
         RES      PXP,(IY+PXBITS-Y) COPY PRIORITY FLAG FROM
                                    OPCODE TO SAVE
         BIT      Z,C
         JR       Z,$+6
         SET      PXP,(IY+PXBITS-Y)
         CALL     SHUFL             GENERATE DESTINATION
                                    STATION ADDRESS AND SAVE
         JR       NZ,MEMCHG
         LD       (IY+DSTAD-Y),A
         LD       A,C               GO TO COMMAND PROCESSOR
         AND      B
         JR       Z,WRITE
         DEC      A
         JR       Z,READ
         DEC      A
         JP       Z,BIT
         JP       BADRNG
MEMCHG   LD       HL,2**MCH
         JP       SERB
```

```
READ        CALL    RWPCOM              GET PARAMETERS FROM PLC
            JP      NZ,SIZER
;A=SIZE OF DATA, C=STATION ADDRESS, DE=SRCE ADDR, (SP)=DEST ADDR
            CP      -RSIZE              IF DATA WONT FIT IN
                                        REMAINING MEMORY SET
                                        ERROR

JP      NC,SIZER
            PUSH    AF                  SAVE SIZE OF DATA
            LD      A,RSIZE+3           GET COMMAND FRAME SIZE
            CALL    FORMHD              FORM MESSAGE HEADER AND
                                        ALLOCATE MEMORY BUFFER FOR
                                        MESSAGE

DEFB    1
            POP     AF                  GET DATA SIZE
            POP     DE                  GET DESTINATION ADDRESS
            LD      (HL),E              SAVE IN MESSAGE
            INC     HL
            LD      (HL),D
            INC     HL
            LD      (HL),A
            JP      SEND                GO SEND MESSAGE
WRITE       CALL    RWPCOM              GET PARAMETERS
            JP      NZ,SIZER
            PUSH    AF                  SAVE SIZE
            ADD     RSIZE+2             ADD OVERHEAD
            JP      C,SIZER             IF WONT FIT SET ERROR FLAG
            LD      (PXPCB+AH),DE       SAVE ADDRESS OF DATA
            CALL    FORMHD              FORM MESSAGE HEADER AND
                                        ALLOCATE MEMORY BUFFER
                                        FOR MESSAGE

DEFB    0
            POP     AF                  GET SIZE AND DESTINATION
                                        BACK

POP     DE
            LD      (HL),E              SAVE DESTINATION ADDRESS
                                        IN MESSAGE

INC     HL
            LD      (HL),D
            INC     HL
            LD      B,A                 SETUP SIZE
            CALL    PLCRB               MOVE DATA FROM PLC TO
                                        MESSAGE BUFFER

JP      NZ,BADPC
            JP      SEND
;SUBROUTINE TO FETCH READ OR WRITE PARAMETERS
 FROM PC COMMUNICATIONS RUNGS
RWPCOM      PUSH    BC
            CALL    GTAD                GET REMOTE ADDRESS FROM PLC
            CALL    NTRNS               UNTRANSLATE ADDRESS
            POP     HL                  STICK REMOTE ADDRESS
                                        BEHIND RETURN ADDRESS

PUSH    DE
            PUSH    HL
            CALL    GTAD                GET LOCAL ADDRESS
            CALL    NTRNS
            EX      DE,HL
            CALL    GTAD                GET END ADDRESS
            CALL    NTRNS
            EX      DE,HL
```

```
        LD      A,H             CALCULATE BLOCK SIZE
                                (SUB ED FROM LH)
        SUB     D
        INC     A
        INC     A
        LD      H,A
        LD      A,L
        SBC     E
        PUSH    AF
        LD      A,D             TRANSLATE ADDRESS BACK
                                TO PC
        RRCA
        RL      D
        RLA
        RLA
        LD      D,A
        POP     AF
        LD      A,H             RETURN SIZE IN A
        POP     BC
        RET
;SUBROUTINE TO TRANSLATE AN INTERNAL PC ADDRESS TO A LOGICAL
;NETWORK INTELLIGIBLE ADDRESS

;IN:    TRANSLATED ADDRESS IN ED
;OUT:   UNTRANSLATED ADDRESS IN ED

NTRNS   EQU     $
        LD      A,D
        RRA
        RRA
        RR      D
        RR      D
        RLC     D
        RET

;SUBROUTINE TO GET MEMORY BUFFER FOR MESSAGE AND INITIALIZE IT

;IN:    A=BLOCK SIZE IN BYTES
;  CALL PARAMETER=COMMAND BYTE
FORMHD  LD      B,A             SAVE SIZE AND STATION
                                ADDRESS
        PUSH    BC
        CALL    NBLK            CALC NUMBER OF BLOCKS
        PUSH    DE              SAVE SRCE ADDRESS
        LD      DE,OCOUNT       GET MEMORY
        CALL    GET
        JP      Z,NOMEM
        LD      (CMDBUF),HL     SAVE ADDRESS OF COMMAND
                                BUFFER
        POP     DE              GET PARAMETERS BACK
        POP     BC
        INC     HL              ADDRESS WAIT COUNT
        INC     HL
        LD      (HL),B          SAVE FRAME SIZE
        INC     HL
        MV      (HL),(IY+DSTAD-Y) DEST ADDR
+
+
        INC     HL
        MV      (HL),(STNADR)   SRCE STATION ADDRESS
+
+
```

```
              INC      HL
              EX       (SP),HL           GET RETURN ADDRESS
              LD       A,(HL)            GET COMMAND CODE
              INC      HL
              EX       (SP),HL
              LD       (HL),A            COPY COMMAND CODE
              BIT      PXP,(IY+PXBITS-Y) COPY PRIORITY BIT
              JR       Z,$+4
              SET      PRIFLG,(HL)
              INC      HL
              LD       (HL),0            ZERO STATUS
              INC      HL
              MV       (HL),(SBINDX)     COPY RUNG NUMBER
+
+
              INC      HL
              RET
;BIT COMMAND
BIT           LD       A,40*6            GET ENOUGH ROOM FOR 40
                                         BIT COMMANDS
              CALL     FORMHD
              DEFB     2
              LD       (IY+RG-Y),0       INIT NUMBER OF BIT
                                         COMMANDS
NXBIT         CALL     TYPE              GET BIT OPCODE
              JP       NZ,BADPC
              CP       BSTT              IGNORE BRANCHING
                                         INSTRUCTIONS
              JR       Z,NXBIT
              CP       BNDT
              JR       Z,NXBIT
              CP       XICT              IF NOT XIC
              JR       Z,BTIN
              CP       XIOT              OR XIO
              JP       NZ,ENDR           GO FINISH UP RUNG
BTIN          CALL     NTRNS             UNTRANSLATE ADDRESS
              LD       HL,(CMDBUF)       GET ADDRESS OF START OF
                                         DATA FIELD
              SET      2,L
              MV       (IY+RF-Y),(IY+RG-Y) GET NUMBER OF BIT COMMANDS
                                         IN DATA FILE
+
+
XCMD          INC      (IY+RF-Y)         WIGGLE COMMAND COUNTER
              DEC      (IY+RF-Y)
              JR       Z,NWCMD           JUMP IF ADDRESS NOT
                                         ALREADY IN BUFFER
              DEC      (IY+RF-Y)         ELSE DEC COUNTER
              LD       A,E               TRY NEXT IF WORD ADDRESS
                                         DOESNT MATCH
              CP       (HL)
              JR       NZ,NFAD
              CALL     INCBLK
              LD       A,D
              SUB      (HL)
              AND      0FEH
              JR       NZ,NFAD1
GSPC          EQU      $                 SET BIT IN COMMAND
              LD       A,C               GET INSTRUCTION
```

```
              AND       0F8H              IF XIC SET BIT, XIO RESET
                                          BIT
              CP        XIC
              JR        Z,SET
RESET         CALL      INCBLK            MOVE POINTER TO RESET
                                          MASK
              CALL      INCBLK
SET           BIT       0,D               IF LOW BYTE MOVE POINTER
                                          ONCE MORE
              CALL      Z,INCBLK
              CALL      GMASK             GET BIT MASK
              OR        (HL)              SET BIT
              LD        (HL),A
              JR        NXBIT             GO PROCESS NEXT BIT
NFAD          CALL      INCBLK            SKIP BIT COMMAND
NFAD1         CALL      INCBLK
              CALL      INCBLK
              CALL      INCBLK
              CALL      INCBLK
              CALL      INCBLK
              JR        XCMD              GO TRY NEXT COMMAND
NWCMD         EQU       $                 GET SPACE FOR ANOTHER BIT
                                          COMMAND
              INC       (IY+RG-Y)         INCREMENT NUMBER OF BIT
                                          COMMANDS
              LD        A,(IY+RT-Y)       IF MORE THAN 40 TIME TO
                                          DIE
              CP        41
              JP        NC,SIZER
              CALL      INCBLK            GET A BYTE
              LD        (HL),E            SAVE BIT ADDRESS
              CALL      INCBLK
              LD        (HL),D
              CALL      INCBLK            GET AND ZERO 4 MORE
                                          BYTES
              PUSH      HL                SAVE ADDRESS OF MASKS
              LD        (HL),0
              CALL      INCBLK
              LD        (HL),0
              CALL      INCBLK
              LD        (HL),0
              CALL      INCBLK
              LD        (HL),0
              POP       HL                GET ADDRESS OF FIRST
                                          MASK
              JR        GSPC
;END OF BIT RUNG PROCESSING
ENDR          LD        A,(IY+RG-Y)       GET COMMAND COUNTER
              RLCA                        MULT BY 6
              ADD       (IY+RG-Y)
              RLCA
              LD        HL,(CMDBUF)       GET ADDRESS OF BUFFER
              INC       L
              INC       L
              ADD       RSIZE
              LD        (HL),A            SAVE SIZE OF FRAME
;END OF COMMAND RUNG PROCESSING
SEND          LD        HL,(SBFAD)        GET START BIT FILE POINTER
              SET       RSTS,(HL)         SET MESSAGE ENROUTE
                                          STATUS BIT
```

```
                ON      B
+
                LD      HL,(CMDBUF)     SEND MESSAGE BUFFER
                                        TO OUT QUEUE
                LD      DE,OUTQ
                CALL    LINK
                JP      ENDRNG
BADSTN          LD      HL,2**WAE
                JR      SERB
BADTST          EQU     $
;SET A BIT (HARDWARE INTERVENTION)
                LD      SP,PSTK
                JP      PROGWT
NOMEM           EQU     $
NSBMEM          LD      HL,2**NME
                JR      SERB
BADRNG          EQU     $
                LD      HL,2**BRE
                JR      SERB
SIZER           EQU     $
                LD      HL,2**BSE
                JR      SERB
BADPC           EQU     $
PCBAD           LD      HL,PCE          COMMUNICATIONS ERROR WITH PC
SERB            LD      SP,PSTK         RELOAD STACK POINTER
                CALL    SETTER
                JP      SCAN
                END
```

APPENDIX D

| | | | |
|---|---|---|---|
| NETX | LD | SP,NSTK | |
| | LD | HL,NFLAG | RESET TASK CONTROL BLOCK FLAGS |
| | RES | FQ,(HL) | |
| | RES | FT,(HL) | |
| | LD | HL,NPFLAG | GET ADDRESS OF PRIORITY BITS |
| | LD | A,(CMDQ) | SET NETX PRIORITY BIT IF SOMETHING ON COMMAND QUEUE |
| | AND | A | |
| | RES | NPR,(HL) | |
| | JR | Z,NONP | |
| | SET | NPR,(HL) | |
| NONP | LD | DE,CMDQ | GET A MESSAGE FROM COMMAND QUEUE AND UNLINK IT |
| | CALL | UNLINK | |
| | JR | Z,WNETX | IF EMPTY GO WAIT FOR MESSAGE |
| | LD | (CMDFRM),HL | ELSE SAVE MEMORY ADDRESS OF MESSAGE |
| | PUSH | HL | |
| | POP | IX | |
| | LD | HL,ICOUNT | INDICATE OWNERSHIP OF MESSAGE |
| | LD | (OWN),HL | |
| | LD | HL,JTB | GET ADDRESS OF COMMAND JUMP TABLE |
| | LD | A,(IX+CMD) | GET CMD/STS BYTE FROM MESSAGE |
| | BIT | CMRP,A | |
| | JR | NZ,IGM | |
| | AND | 00FH | TEST FOR VALID COMMAND |
| | CP | (JTB1-JTB)/2 | |
| | JR | NC,ILLCMD | |
| | JP | TJMP | JUMP TO EXECUTE INDICATED |
| JTB | EQU | $ | |
| | DEFW | WRITE | COMMAND |
| | DEFW | READ | |
| | DEFW | BIT | |
| JTB1 | EQU | $ | |
| LOOP | EQU | $ | |
| | CALL | XFR | TRANSFER MESSAGE TO OUTBOUND (IF NOT ALREADY) |
| | CALL | SWITCH | EXCHANGE STATION NOS IN DEST AND SRCE FIELDS |
| | SET | CMRP,(IX+CMD) | SET REPLY BIT IN MESSAGE STS FIELD |
| | ON | B | |
| + | OUT | (.LOW.LED30),A | |
| | LD | HL,(CMDFRM) | LINK REPLY MESSAGE TO OUTPUT |

```
                LD          DE,OUTQ
                CALL        LINK               QUEUE AND LOOP BACK TO PROCESS
                JP          NETX               FURTHER COMMAND MESSAGES
;GENERATE VARIOUS ERROR CODES

ILLCMD          LD          A,1*16             ILLEGAL COMMAND FORMAT OR BYTE
                                               COUNT
                JR          SRP
NVERF           LD          A,2*16             PC MEMORY TRANSFER NONVERIFY
                JR          SRP
HRDWR           LD          A,3*16             PC UNPLUGGED OR OTHER MANUAL
                                               INTERVENTION
                JR          SRP
MISC            LD          A,4*16             REPEATED BREAK, READ ERRORS,
                                               OR TIMEOUTS
                JR          SRP
SNDOK           XOR         A

SRP             LD          IX,(CMDFRM)
                LD          (IX+STS),A         SAVE STATUS
                LD          (IX+SIZ),RSIZE     SIZE=REPLY SIZE

LD          DE,(OWN)           GIVE EXTRA BLOCKS BACK TO
                                               OWNER OF FRAME
                LD          HL,(CMDFRM)
                CALL        CHOP

;READ COMMAND
READ            EQU         $

LD          A,(IX+DAT+2)       GET NUMBER OF BYTES TO READ
                ADD         RSIZE              CALC SIZE OF REPLY MESSAGE
                JR          C,ILLCMD           IF GREATER THAN 256 IT'S TOO
                                               BIG
                CP          -DST-1             IF WONT FIT IN 17 BLOCKS
                                               ITS TOO BIG
                JR          NC,ILLCMD
                LD          (IX+DAT+3),A       SAVE SIZE OF REPLY

CALL        GETRD              ALLOCATE MEMORY SPACE TO FORM
                                               REPLY
                JP          Z,NETX             MESSAGE, AND IF NOT AVAILABLE,
                                               PUT READ COMMAND ON DEFER
                                               QUEUE
                MV          (IX+SIZ),(IX+DAT+3)   SET NEW SIZE

CALL        GTPTS              GET POINTER TO PCB AND DATA
                                               IN BUFFER
                CALL        GTAD               GET CONTROLLER MEMORY ADDRESS
                                               FROM COMMAND MESSAGE
                LD          B,(HL)             GET NUMBER OF BYTES TO READ
                                               FROM COMMAND
                DEC         L                  DATA WILL OVERLAY DATA
                                               FIELD OF COMMAND
                DEC         L

CALL        PLCRB              READ BLOCK OF DATA FROM PC
                CALL        NSTCR              CHECK STATUS

JR          LOOP
```

```
;WRITE COMMAND
       EQU     $
WRITE  EQU     $
       LD      A,(IX+SIZ)     CALC SIZE OF DATA BLOCK
       SUB     RSIZE+2        ACCOUNTING FOR TWO ADDRESS
                              BYTES
       LD      B,A
       CALL    GTPTS          GET POINTERS FOR BLOCK IO TO PC
       CALL    GTAD           GET ADDRESS FROM WRITE COMMAND
       CALL    PLCWB          WRITE BLOCK TO PC
       CALL    NSTCK          CHECK STATUS
       JP      SNDOK          RETURN OK REPLY MESSAGE

;BIT CONTROL COMMAND
PBIT   EQU     $
BIT    EQU     $
       LD      A,(IX+SIZ)     CALC NUMBER OF BYTES IN
                              DATA BLOCK

SUB     RSIZE

LD      L,A            SETUP FOR DIVIDE BY 6
       LD      H,0
       LD      A,6
       CALL    DIV
       LD      A,H            IF SIZE NOT MULTIPLE OF
                              6 INVALID
       AND     A
       JP      NZ,ILLCMD
       LD      B,L            ELSE B=NUMBER OF BIT COMMANDS
       CALL    GTPTS
BNWD   CALL    GTAD           GET ADDRESS FROM BIT COMMAND
       RES     CWR,(IX+CN)    READ FROM THIS ADDRESS
       CALL    PCIOH
       CALL    NSTCK          CHECK STATUS

LD      D,(HL)         GET SET MASK FROM BUFFER
       CALL    INCBLK
       LD      C,(HL)
       CALL    INCBLK

LD      A,(HL)         GET PART OF RESET MASK
       CPL
       LD      E,A
       CALL    INCBLK

LD      A,(NTPCB+DH)   CALC HIGH BYTE
       OR      D              SET BITS
       AND     E              RESET BITS
       LD      (NTPCB+DH),A

LD      A,(HL)         GET LAST PART OF RESET MASK
       CPL
       LD      E,A
       CALL    INCBLK

LD      A,(NTPCB+DL)   CALC LOW BYTE
       OR      C              SET BITS
       AND     E              RESET BITS
       LD      C,A            SAVE
```

```
             SET       CWR,(IX+CN)        WRITE FIRST BYTE
             CALL      PCIOH
             CALL      NSTCK
             CALL      INCAHL             INCREMENT PC ADDRESS

LD        (IX+DH),C          WRITE SECOND BYTE
             CALL      PCIOH
             CALL      NSTCK
             CALL      INCAHL

DJNZ      BNWD               REPEAT UNTIL DONE
             JP        SNDOK              THEN SEND REPLY MESSAGE

;SUBROUTINE TO GET ADDITIONAL STORAGE NEEDED TO EXECUTE A READ
;IN:    A=DESIRED SIZE OF FRAME

;OUT:      IF NZ:  OPERATION SUCCESSFUL
;          IF Z:   NOT ENOUGH ROOM AVAILABLE, MESSAGE PLACED
                   ON DEFER QUEUE

GETRD        CALL      NBLK               CALC NUMBER OF BLOCKS NEEDED
             DEC       B                  CALC NUMBER OF ADDITIONAL
                                          BLOCKS NEEDED
             JR        Z,NOXTR            IF 1 WE ALREADY HAVE 1
                                          (COMMAND BLOCK)

LD        DE,OCOUNT          GET EXTRA BLOCKS
             CALL      GET
             JR        NZ,GOTM            IF OK CONTINUE
             LD        HL,(CMDFRM)        ELSE PUT COMMAND MESSAGE ON
                                          DEFER QUEUE
             LD        DE,DEFRQ
             CALL      LINK
             XOR       A                  RETURN ZERO NO STORAGE
             RET

GOTM         PKPTR     GET                POINTER TO NEW STORAGE
+
+
+
+
             LD        HL,(CMDFRM)        GET ADDRESS OF END OF BLOCK
             LD        DE,000FH
             ADD       HL,DE

LD        (HL),A             LINK NEW BLOCKS TO END OF
                                          COMMAND BLOCK

NOXTR        DI                           MOVE HEADER BLOCK FROM INBOUND
                                          TO OUTBOUND
             DEC       (IY+OCOUNT-Y)
             INC       (IY+ICOUNT-Y)
             EI

LD        HL,OCOUNT          INDICATE OWNERSHIP OF FRAME
             LD        (OWM),HL

OR        OFFH               RETURN OK STATUS
             RET
```

```
;SUBROUTINE TO SETUP ADDRESS POINTERS
;EFFECT:   IX=ADDRESS OF PCB
;          CONTINUE ADDRESS IS SET IN PCB
;          VERIFY BIT IS SET IN PCB
;          HL=ADDRESS OF START OF DATA FIELD IN FRAME

GPTPS     EQU       $
          LD        IX,NTPCB          GET ADDRESS OF PCB
          SET       CVF,(IX+CN)       SET VERIFY BIT
          LD        HL,NETPCT         GET ADDRESS OF CONTINUE
                                      ROUTINE
          LD        (NTPCB+CTAD),HL
          LD        HL,(CMDFRM)       GET ADDRESS OF DATA IN
                                      FRAME
          SET       3,L
          RET

;SUBROUTINE TO LOAD AN ADDRESS FROM THE COMMAND MESSAGE BUFFER
 TO THE PCB

GTAD      EQU       $
          MV        (IX+AH),(HL)
+
+
          CALL      INCBLK

LD        A,(HL)            GET LOW BYTE OF ADDRESS

RRCA                        TRANSLATE ADDRESS TO PC FORMAT
          RL        (HL)
          RLA
          RLA
          RR        (HL)

LD        (IX+AL),A         SAVE IN PCB

JP        INCBLK

;SUBROUTINE TO CHECK STATUS RETURNED FROM PCIOH, PLCRB, OR
 PLCWB

;IN:   A=STATUS

NSTCK     AND       A                 IF ZERO CONTINUE
          RET       Z

POP       HL                ELSE THROW AWAY RETURN ADDRESS

BIT       1,A               READ NON VERIFIED
          JP        NZ,NVERF

BIT       5,A               PLC UNPLUGGED
          JP        NZ,HRDWR

JP        MISC              READ FAILURE

;SUBROUTINE TO CONTINUE NETX
NETPCT    SET       FD,(IY+NFLAG-Y)   SET DEVICE EVENT FLAG
          SWI       HIT               SCHEDULE
+
          RET
```

```
;NETX TIMER EVENT SUBROUTINE
NWAKE   SET     FT,(IY+NFLAG-Y)     SET NETX TIMER EVENT FLAG
        RET

;SUBROUTINE TO TRANSFER MESSAGE FROM CURRENT ALLOCATION TO OUTBOUND
XFR     EQU     $
        LD      IX(CMDFRM)

PUSH    AF

LD      A,(IX+SIZ)          GET SIZE OF FRAME
        CALL    NBLK

LD      HL,(OWN)            GET ADDRESS OF CURRENT OWNER
        DI
        ADD     (HL)                RELEASE BLOCKS
        LD      (HL),A

LD      HL,OCOUNT           GET ADDRESS OF OCOUNT

LD      A,(HL)              TAKE BLOCKS FROM OUTBOUND
        SUB     B
        LD      (HL),A

EI

LD      (OWN),HL            INDICATE CURRENT OWNERSHIP
                                    OF MESSAGE
        POP     AF
        RET
        END
```

APPENDIX E

Reply Task

| | | | |
|---|---|---|---|
| WREPLY | LD | A,2**FQ | WAIT FOR QUEUE ENTRY |
| | CALL | WTFR1 | |
| REPLY | RES | FQ,(IY+RFLAG-Y) | RESET EVENT FLAG |
| | LD | DE,REPLYQ | IF NOTHING ON REPLY QUEUE GO WAIT FOR SOMETHING |
| | CALL | UNLINK | |
| | JR | Z,WREPLY | |
| | LD | (RPFRAD),HL | SAVE REPLY MESSAGE ADDRESS |
| | LD | IX,RPPCB | |
| | SET | B,L | |
| | DEC | D | |
| | LD | B,(HL) | GET TRANSPARENT BYTE (RUNG INDEX) |
| | INC | B | |
| | LD | HL,(SBFST) | GET ADDRESS OF START OF START BIT FILE |
| | LD | A,H | |
| | OR | L | |
| | JP | NZ,BADREP | IF NO START BITS IGNORE MESSAGE |
| | LD | DE,(COMST) | GET ADDRESS OF START OF RUNGS |
| NBYTE | CALL | INCBLK | INCREMENT FILE POINTER |
| + | MV | (ADDONE),(HL) | SAVE ADDRESS OF CONTROL WORD |
| + | | | |
| | CALL | INCBLK | |
| + | MV | (ADDONE+1),(HL) | |
| + | | | |
| NRUNG | CALL | INCBLK | BUMP POINTER |
| | DEC | B | LOOP UNTIL INDEX=0 |
| | JR | Z,FNDRNG | |
| | LD | A,(HL) | ADD SIZE OF SKIPPED RUNG |
| | ADD | A | DOUBLE RUNG SIZE (BYTES= 2*WORDS) |
| | JR | NC,$+3 | |
| | INC | E | |
| | ADD | D | |
| | LD | D,A | |
| | JR | NC,$+3 | |
| | INC | E | |
| | CALL | INCBLK | SKIP TO NEXT BYTE IN FILE |

```
                BIT         NSF,(HL)              IF END OF FILE THE INDEX
                                                  IS INVALID
                JP          Z,BADREP

BIT         NDBY,(HL)             IF END OF BYTE GO FETCH
                                                  ANOTHER
                JR          NZ,NBYTE
                JR          NRUNG                 ELSE GET NEXT RUNG
                                                  DESCRIPTOR

FNDRNG          CALL        INCBLK
                LD          A,(HL)                GET AND SAVE DONE BIT
                                                  NUMBER
                LD          (DONNM),A

BIT         RSTS,A                TEST RUNG STATUS BIT
                JP          Z,BADREP              IF RUNG WAS INACTIVE IGNORE
                                                  MESSAGE

EX          DE,HL                 SAVE RUNG ADDRESS
                LD          (RPPCB+AH),HL

CALL        GTAD                  GET START BIT OPCODE
                JP          NZ,PCBAD

LD          A,(DONNM)             COMPARE AGAINST FILE
                AND         07
                OR          XIC
                CP          C
                JP          NZ,BADRNG

LD          HL,(ADDONE)           MAKE SURE START BIT
                                                  ADDRESS IS SAME
                INC         H
                AND         A
                SBC         HL,DE
                JP          NZ,BADRNG

CALL        TYPE                  CHECK COMMAND CODE
                JP          MZ,PCBAD
                CP          XICT
                JP          NZ,BADMEM

LD          HL,(RPFRAD)           GET MESSAGE ADDRESS
                INC         L
                INC         L
                LD          A,(HL)                SAVE SIZE OF MESSAGE
                SUB         RSIZE
                JP          C,BADRSZ
                LD          B,A
                INC         L
                INC         L
                CALL        SHUFL                 GET STATION ADDRESS FROM
                                                  RUNG
                CP          (HL)                  COMPARE WITH MESSAGE SOURCE
                JP          NZ,BADREP             IF NOT SAME DONT ACCEPT

INC         L
                LD          A,C                   MASK COMMAND CODE FROM RUNG
```

```
            AND     B
            XOR     (HL)            COMPARE TO COMMAND IN
                                    MESSAGE
            AND     00FH
            JP      NZ,BADREP

LD      A,(HL)
            CP      041H            IF NOT READ ACCEPT REPLY
            JR      NZ,SETDNE
            INC     L               IF STATUS NOT OK DONT READ
            LD      A,(HL)
            AND     A
            JR      NZ,SETDNE

INC     L               GET ADDRESS OF DATA
            INC     L
            PUSH    HL

CALL    RWPCOM          GET ADDRESSES AND SIZE FROM
                                    RUNG
            POP     HL              (GET RID OF REMOTE ADDR
                                    RETURNED ON STACK)
            JP      NZ,BADRSZ

CP      B               IF NOT SAME AS FRAME SET
                                    ERROR
            JP      NZ,BADRSZ

POP     HL              GET DATA ADDRESS
            LD      (RPPCB+AH),DE   SAVE DESTINATION ADDRESS
            CALL    PLCWB           WRITE BLOCK
            JR      NZ,PCBAD

SETDNE      LD      HL,(ADDONE)     GET ADDRESS OF DONE BIT
            LD      (RPPCB+AH),HL
            CALL    PCINC2          INC TO ADDRESS OF REMOTE
                                    ERROR BIT
            CALL    XPCR            READ IT
            JR      NZ,PCBAD
            PUSH    BC              SAVE IT

LD      HL,(RPFRAD)     GET STATUS
            SET     Z,L
            INC     L
            INC     L
            LD      H,(HL)

LD      C,(IY+DONNM-Y)  GET BIT MASK
            CALL    GMASK
            LD      L,A

POP     BC              GET ERROR BIT DATA
            LD      A,H             CHECK REMOTE STATUS

AND     0F0H
            JR      ZRGOOD          JUMP IF OK

LD      A,L             ELSE SET ERROR BIT
            OR      C
            LD      C,A
            JR      RBAD
```

```
RGOOD    LD      A,L                     RESET ERROR BIT
         CPL
         AND     C
         LD      C,A

RBAD     LD      A,H                     TEST LOCAL STATUS
         AND     00FH
         JR      Z,LGOOD                 JUMP IF OK
         LD      A,L                     ELSE SET ERROR BIT
         OR      B
         LD      B,A
         JR      LBAD

LGOOD    LD      A,L                     RESET ERROR BIT
         CPL
         AND     B
         LD      B,A

LBAD     PUSH    BC                      SAVE DATA
         LD      (IX+DH),B               WRITE LOCAL BYTE
         CALL    XPCW
         CALL    PCINC                   INCR PC MEMORY ADDRESS

POP     BC                      WRITE REMOTE BYTE
         LD      (IX+DH),C
         CALL    XPCW
         JR      NZ,PCBAD

LD      DE,(ADDONE)             GET DONE BIT WORD
         LD      (RPPCB+AH),DE
         CALL    XPCR
         JR      NZ,PCBAD

LD      A,B                     SET DONE BIT
         OR      L

LD      (RPPCB+DH),A            WRITE IT BACK
         CALL    XPCW
         JR      NZ,PCBAD

CHUKBF   LD      SP,RSTK                 RESET STACK POINTER
         LD      HL,(RPFRAD)
         LD      DE,ICOUNT               RELEASE BUFFER TO IDLE
         CALL    RELE
         JP      REPLY                   GO TRY NOTHER ONE

PCBAD    OUT     (.LOW.PCLED1),A         TURN ON PC ERROR LED
         TEVENT  PCLOFF,40,PL            TURN IT OFF IN ONE SECOND
         LD      HL,PCE                  COMMUNICATIONS ERROR WITH
                                         PC
         JR      SERBIT

BADRNG   LD      HL,BRE                  RUNG DOES NOT MATCH START
                                         BIT FILE
         SET     BADR,(IY+PXBITS-Y)      SET BAD RUNG BIT
         JR      SERBIT

BADMEM   EQU     S
BADREP   LD      HL,BME                  NO START BIT, RUNG INACTIVE,
                                         WRONG ADDRESS
         JR      SERBIT
```

```
BADRSZ    LD      HL,BSE           SIZE IN MESSAGE OR RUNG
                                   INVALID OR MISMATCH
          JR      SERBIT

SERBIT    CALL    SETTER           WRITE ERROR CODE TO PC
          JR      CHUKBF

END
```

APPENDIX F

Protocol Driver Routine

| | | | |
|---|---|---|---|
| TESTQ | EQU | $ | |
| + | ON | 5 | |
| + | OFF | 4 | |
| | CALL | UPOLL | CHECK PROGRAM PANEL |
| | LD | HL, PTCLF | GET ADDRESS OF PROTOCOL FLAGS |
| | LD | A,(OUTQ) | IF PRIORITY OUTPUT QUEQUE NOT EMPTY JUMP TO SPX |
| | AND | A | |
| | JR | NZ, SPX | |
| | BIT | PX,(HL) | IF PRIORITY MESSAGE |
| | RES | PX,(HL) | TRANSMIT FLAG SET BUT |
| | JP | NZ, S1PPOL | PRIORITY OUTPUT QUEQUE EMPTY JUMP TO S1PPOL TO DO A POLL OF PRIORITY STATIONS |
| | OR | (IY+OUTQ-Y+3) | ELSE TEST ORDINARY QUEQUE |
| | JP | Z,SOPOL | IF EMPTY START ORDINARY POLLING |
| | JR | LVPX | |
| SPX | SET | PX,(HL) | SET PRIORITY MESSAGE TRANSMIT FLAG |
| LVPX | LD | DE,OUTQ | GET A MESSAGE FROM OUTPUT QUEQUE |
| | CALL | UNLINK | |
| | LD | (TXFRAD),HL | SAVE MESSAGE MEMORY ADDRESS FOR LATER |
| | INC | L | |
| | INC | L | |
| + | MV | (FRSZ),(HL) | SAVE ORIGINAL MESSAGE SIZE |
| + | | | |
| | INC | L | |
| + | MV | (TXDST),(HL) | SAVE MESSAGE DESTINATION STATION NO. |
| + | | | |
| | LD | (IY+LKRTY-Y),6 | INITIALIZE RETRY COUNTER |
| RETXD | DEC | (IY+LKRTY-Y) | DECREMENT RETRY COUNT |
| | JR | Z,CHUKBF | IF DONE RETURN TO SENDER |
| | CALL | CDWAIT | WAIT FOR CARRIER OFF |
| | CALL | TXON | ENABLE TRANSMITTER |
| | LD | HL,(TXFRAD) | GET FRAME ADDRESS |
| | CALL | TXFRM | SEND FRAME |
| | CALL | TXOF | TURN TRANSMITTER OFF |

```
              LD      HL,(TXFRAD)         GET ADDRESS OF MESSAGE
              INC     L
              INC     L
              MV      (HL),(FRSZ)         RESTORE ORIGINAL MESSAGE
                                          SIZE
+
+
              LD      (IY+SCTBUF-Y+15),0  MAKE SURE SCTBUF IS
                                          PROPERLY TERMINATED

TEVENT  STSRTO,3,LK         ALLOW 63 MS AVG. FOR STATUS
                                          REPLY FROM DESTINATION
                                          STATION
+
+
+
+

LD      HL,SCTBUF           GET MEMORY ADDR OF SCRATCH
                                          BUFFER FOR STATUS REPL
              CALL    RXFRM               GO WAIT FOR REPLY MESSAGE

XRSTS         JR      Z,TSTS              IF NO HARDWARE TRANSMISSION
                                          ERRORS GO TEST SOFTWARE STS

LD      HL,(TXFRAD)         ELSE REQUEST DESTINATION TO
                                          RETRANSMIT REPLY MESSAGE
              INC     L
              INC     L
              LD      (HL),2

JR      RETXD

TSTS          LD      HL,SCTBUF+DST       GET POINTER INTO BUFFER

LD      A,(HL)              IF POLL COMMAND SOMEBODY WOKE
              INC     A                   UP AND IS TRYING TO GRAB
              JP      Z,WTFRM1            CONTROL, SO WE BETTER BACK
                                          DOWN BUT WE WILL BE THE FIRST
                                          TO WAKE UP

INC     L
              LD      A,(TXDST)           IF SOURCE STATION NO. IS NOT
              XOR     (HL)                SAME AS DEST. STATION NO. IN
              JP      NZ,WTFRM1           TRANSMITTED MESSAGE ASSUME
                                          SOMEBODY WOKE UP

INC     L                   ELSE
              LD      A,(HL)              GET STATUS BYTE

BIT     CMST,A              IF NOT STATUS REPLY MESSAGE
                                          GO WAIT AROUND
              JP      Z,WTFRM

BIT     STFUL,A             IF BUFFER AT DEST STATION
                                          FULL PUT MESSAGE ON WAIT
                                          QUEQUE
              JR      NZ,WAITBF
              AND     03FH                IF REST OF STATUS NOT ZERO
              JR      NZ,RETXD            RETRY TRANSMITTING MESSAGE
```

```
                JR       RELOQ              ELSE RELEASE BUFFER SPACE
                                            ALLOCATED TO TRANSMITTED
                                            MESSAGE

WAITBF          LD       HL,(TXFRAD)        DECREMENT RETRY COUNTER
                INC      L
                DEC      (HL)

LD       B,1
; JR Z,RETBF IF DONE RETURN TO SENDER

INC      L                  ELSE
                LD       DE,WAITQ           PUT BUFFER ON WAIT QUEQUE
                LD       HL,(TXFRAD)
                CALL     LINK1

JP       TESTQ              JUMP AND SEE IF ANY FURTHER
                                            MESSAGES AWAIT TRANSMISSION

CHUKBF          LD       B,2                REASON=UNDELIVERABLE MESSAGE

RETBF           LD       HL,(TXFRAD)        RETURN MESSAGE TO SENDER
                                            (LOCAL)

INC      L
                INC      L

LD       A,(FRSZ)           RESTORE ORIGINAL MESSAGE SIZE
                LD       C,A
                LD       (HL),A
                INC      L

LD       E,(HL)             EXCHANGE STATION NOS. IN DEST
                                            AND SRCE FIELDS OF MESSAGE
                INC      L
                LD       A,(HL)
                DEC      L
                LD       (HL),A

INC      L
                LD       (HL),E
                INC      L

SET      CMRP,(HL)          SET REPLY BIT IN COMMAND BYTE
                INC      L

LD       (HL),B             SAVE STATUS

LD       A,C                GET SIZE OF RETURNED MESSAGE
                CALL     NBLK

LD       HL,OCOUNT          MOVE FROME OUTBOUND TO
                DI                          INBOUND
                ADD      (HL)               GIVE MEMORY BLOCKS TO
                                            OUTBOUND
                LD       (HL),A
                DEC      HL
                LD       A,(HL)             TAKE THEM FROM INBOUND
                SUB      B
```

```
                LD          (HL),A
                EI

LD          HL,(TXFRAD)
                LD          DE,REPLYQ
                CALL        LINK                SEND MESSAGE TO REPLY QUEQUE

SET         FQ,(IY+RFLAG-Y)     EVENT REPLY TASK
                SWI
+
                JP          TESTQ               JUMP AND SEE IF ANY FURTHER
                                                MESSAGES AWAIT TRANSMISSION

;ROUTINE TO RELEASE OUTPUT MESSAGE TO IDLE QUEQUE
RELOQ           LD          HL,(TXFRAD)         GET ADDR OF BUFFER
                LD          DE,OCOUNT           GET ADDR OF ALLOCATION
                                                COUNTER
                CALL        RELE                RELEASE BUFFER TO IDLE QUEQUE
                JP          TESTQ               TRY NEXT MESSAGE

STSRTO          EQU         $                   STATUS WAIT TIMEOUT ROUTINE
                DI
                MARK        C
+
+

LD          A,(LKTMR)           IF INTERRUPTED IN WINDOW
                                                IGNORE TIMEOUT
                AND         A
                RET         NZ

OUTS        A,1,0               DISABLE SIO INTERRUPTS
+
+
+

+
+
+
                EI

INC         A                   GET TIMEOUT STATUS
                JP          XRSTS               GO TO STATUS ANALYSIS
;DO ONE PRIORITY POLL WHENEVER THE PRIORITY OUTPUT QUEQUE BECOMES
  EMPTY

S1PPOL          ON          5
+
                ON          4
+
                CALL        POLLIN              INITIALIZE SCTBUF FOR
                                                POLLING
                SET         PP,(IY+PTCLF-Y)     SET PRIORITY POLL BIT
                CALL        POLL
                JR          NZ,BSRCH            IF PRIORITY STATION RESPONDS
                                                GO TO BINARY SEARCH POLL
                JP          TESTQ               ELSE CONTINUE WITH OUTPUTTING
                                                MESSAGES FROM OUTPUT QUEQUE
```

```
                +
                +
                +
                +
                        SET     NHNT,(IY+PTCLF-Y)   READ ALL MESSAGES
                        JR      WTFRMX

WTFR1   DI                                  WAIT FOR ANY MESSAGE DURING
                                                    FIRST 2 SECOND TIME INTERVAL
                        SETUP   CSIOA,RDMAIL
                +
                +
                        DEFB    0
                        DEFB    3
                        DEFB    RXENS+RCRCEN+LN8SR
        RDMAIL          EQU     $
                        EI

TEVENT  WTFR2,2,PT          WAIT ANOTHER 2 SECOND TIME
                                                    INTERVAL
                +
                +
                +
                +
                        RET

WTFR2           LD      HL,WTFR3            WAIT FOR ANOTHER TIME
                        LD      (PTTLC),HL          INTERVAL WHICH IS SET EQUAL
                        MV      (PTTMR),(STNADR)    TO THIS STATION NUMBER
                +
                +
                        RET

WTFR3           DI                          LAST TIMEOUT
                        MARK    C
                +
                +

LD      A,(PTTMR)           IF INTERRUPTED IGNORE
                        AND     A
                        RET     NZ

OUTS    A,1,0               DISABLE SIO INTERRUPTS
                +
                +
                +
                +
                +
                +
                        EI
                        JP      TESTQ               JUMP TO TESTQ TO ASSUME
                                                    CONTROL OF NETWORK
        ;
        WTFRMX          CALL    UPOLL

CALL    GETRXB              GET RECEIVE BUFFER
                        LD      (RXFRAD),HL         SAVE ADDRESS OF BUFFER

BIT     STFL,(IY+PTCLF-Y)   TEST STATUS SEND FLAG
                        RES     STFL,(IY+PTCLF-Y)
                        JR      Z,STSNT             JUMP IF NO STATUS BYTE TO
                                                    SEND TO ORIGINATING STATION

LD      HL,SCTBUF+SIZ       GET ADDRESS OF SCRATCH
                                                    BUFFER
```

```
              LD        (HL),SSIZE          SIZE OF STATUS FRAME
              INC       L

MV        (HL),(LSTSRC)       SAVE STATION NUMBER OF WHO
+                                           TO SEND IT TO
+

INC       L
              MV        (HL),(STNADR)       AND OUR RETURN STATION NUMBER
+
+

INC       L

MV        (HL),(LSTSTS)       AND THE CURRENT STATUS TO
+                                           FORM REPLY MESSAGE
+

CALL      CDWAIT
              CALL      TXON                TURN ON TRANSMITTER
              LD        HL,SCTBUF           GET ADDRESS OF STATUS REPLY
                                            MESSAGE
              CALL      TXFRM               TRANSMIT IT
              CALL      TXOF                DISABLE TRANSMITTER

STSNT         LD        HL,(RXFRAD)
              OFF       5
+
              OFF       4
+
              CALL      RXFRM               WAIT FOR A MESSAGE
              LD        HL,(FRAD)

LD        C,A                 SAVE STATUS BYTE
              AND       B4+B5+B6            IF SOMETHING HAPPENED
                                            IGNORE MESSAGE
              JP        NZ,WTFRM

INC       L
              INC       L

LD        B,(HL)              GET MESSAGE SIZE
              INC       L
              LD        A,0FFH              IF MESSAGE DESTINATION FIELD
              CP        (HL)                IS FF THIS MESSAGE IS A
              JP        Z,BNPOLD            GLOBAL POLL COMMAND

LD        A,(STNADR)          IF NOT OWN STATION NUMBER
                                            IGNORE MESSAGE
              CP        (HL)
              JP        NZ,WTFRM

BIT       1,C                 IF BUFFER OVERFLOW IT CANT
                                            BE A RETRANSMIT
              JR        NZ,NOTQST

LD        A,B                 ELSE IF MESSAGE SIZE=2 IT
                                            IS A RETRANSMITTED MESSAGE
              CP        2
              JR        Z,QST

NOTQST        OFF       5
+
              ON        4
+
```

```
            INC     L
            MV      (LSTSRC),(HL)         ELSE WE HAVE A NEW MESSAGE;
                                          SAVE RETURN STATION NUMBER
+
+

BIT     BUFL,(IY+PTCLF-Y)     IF NO BUFFER RETURN STATUS
            JR      Z,FULSTS              MESSAGE INDICATING FULL
                                          BUFFER

BIT     1,C                   IF BUFFER OVERFLOW RETURN
            JR      NZ,BADSTS             STATUS MESSAGE INDICATING
                                          FAULT

LD      A,B                   IF MESSAGE SIZE 4 THATS
                                          BAD TOO
            CP      RSIZE
            JR      C,BADSTS

LD      HL,(RXFRAD)           GET ADDRESS OF BUFFER FOR
                                          MESSAGE

LD      DE,ICOUNT             GET RID OF EXTRA MEMORY
            CALL    CHOP

CALL    ROUTE                 SEND MESSAGE TO COMMAND
            CALL    LINK                  QUEUE

LD      H,B                   GET FLAG ADDRESS
            LD      L,C
            SET     FQ,(HL)               SET NETX EVENT FLAG
            SWI                           GENERATE SOFTWARE INTERRUPT
                                          SO THAT SYSTEM WILL RETURN
                                          TO SCHEDULER
+
            RES     BUFL,(IY+PTCLF=Y)

XOR     A                     GET GOOD STATUS
SVSTS       OR      2**CMST               SET STATUS MESSAGE BIT
            LD(     LSTSTS),A             SAVE STATUS

SETSTS      SET     STFL,(IY+PTCLF-Y)     SET VALID STATUS FLAG
            JP      WTFRM                 WAIT FOR NEXT MESSAGE

BADSTS      LD      A,2**STBAD

JR      SVSTS

FULSTS      LD      A,2**STFUL
            JR      SVSTS

QST         LD      A,(LSTSRC)            IF THE QUESTION DIDNT COME
            CP      (HL)                  FROM SENDER OF LAST MESSAGE
            MV      (LSTSRC),(HL)
+
+
            JR      Z,SETSTS              ELSE JUST SET STATUS FLAG

LD      A,STWHO               RETURN 'WE DONT KNOW YOU'
                                          STATUS
            JR      SVSTS

GETRXB      LD      HL,(RXFRAD)           GET OLD RXBUF ADDRESS
            BIT     BUFL,(IY+PTCLF-Y)     IF BUFFER FLAG SET
            SET     BUFL,(IY+PTCLF-Y)     LEAVE IT SET
            RET     NZ
```

```
            LD      DE,ICOUNT           ELSE GET NEW BUFFER
            LD      B,17                OF SIZE 17
            CALL    GET                 GET BUFFER
            RET     NZ                  RETURN IF GOT SPACE

RES     BUFL'(IY+PTCLF-Y)   RESET BUFFER FLAG
            LD      HL,SCTBUF           AND USE SCRATCH BUFFER
            RET

SOPOL       ON      5
+
            ON      4
+
            OFF     2
+

CALL    POLLIN              FORM GLOBAL POLL COMMAND
                                        MESSAGE
            RES     PP,(IY+PTCLF-Y)     SET PRIORITY BIT OFF

OPOL        CALL    POLL                SEND GLOBAL POLL COMMAND
                                        MESSAGE
            JR      NZ,CKPPOL           IF RESPONSE CHECK IT FOR
                                        PRIORITY

LD      A,(OUTQ)            IF OUTPUT QUEQUE NOT EMPTY
                                        GO SERVICE IT
            OR      (IY+OUTQ-Y+3)
            JP      NZ,TESTQ

JR      OPOL                ELSE CONTINUE POLLING TILL
                                        SOMETHING HAPPENS
;CHECK PRIORITY OF A RESPONDANT TO A FIRST POLL
;BOTH HIGH AND LOW PRIORITY STATIONS RESPOND TO A LOW PRIORITY POLL;
;ONLY A HIGH PRIORITY STATION RESPONDS TO A HIGH PRIORITY POLL

CKPPOL      SET     PP,(IY+PTCLF-Y)     SET PRIORITY HIGH BIT
CALL        POLL
            JR      NZ,BSRCH            IF HIGH PRI GO DO BINARY
                                        SEARCH POLL

RES     PP,(IY+PTCLF-Y)     ELSE SET PRIORITY LOW FIRST

;DO A BINARY SEARCH POLL TO DETERMINE WHICH STATION WANTS MASTERSHIP

;IF M .NOT.=1
; AND REPLY=1 THEN M=(M+1)/2
; AND REPLY=0 THEN FS=FS+(M+1)/2; M=M/2

;IF M=1
; AND REPLY=1 THEN GO TO WTFRM
; AND REPLY=0 THEN FS"STNADR+1; M=OFFH

BSRCH       LD      HL,SCTBUF+IM        GET ADDRESS OF INTERNAL SIZE

LD      A,(HL)              CAL EXTERNAL SIZE=(INTERNAL
                                        +1)/2
            DEC     L
            ADD     1
            RRA
            LD      (HL),A

CALL    POLL                SEND POLL COMMAND MESSAGE
            JR      Z,NORSP             JUMP IF NO RESPONSE TO
                                        POLL COMMAND
```

```
RESPON    LD      HL,SCTBUF+XM         GET ADDR OF M
          DEC     (HL)                 IF M=1 A SINGLE STATION HAS
          JR      Z,WTFRM              RESPONDED TO POLL TRANSFER
          INC     (HL)                 MASTERSHIP TO THAT STATION
                                       AND WAIT FOR MESSAGES

INC     L
          LD      A,(HL)               ELSE IM=(IM+1)/2
          ADD     1
          RRA
          LD      (HL),A

JR      BSRCH                CONTINUE BINARY SEARCH POLL

;NOBODY ANSWERED

NORSP     LD      HL,SCTBUF+FS         CALC FS=FS+XM (=(IM+1)/2)
          LD      A,(HL0
          ADD     (IY+SCTBUF-Y+XM)
          LD      (HL),A

INC     L                    GET ADDRESS OF IM
          INC     L

LD      A,(HL)               GET M
          CP      1                    IF =1 RESTART POLLING
          JP      Z,TESTQ
          SRL     (HL)                 ELSE CALC M/2

JR      BSRCH                CONTINUE BINARY SEARCH POLL

;SUBROUTINE TO FORM GLOBAL POLL COMMAND MESSAGE
POLLIN    EQU     $
          LD      HL,SCTBUF+SIZ
          LD      (HL),PSIZE           SIZE OF POLL
          INC     L

LD      (HL),OFFH            SET GLOBAL ADDRESS (i.e.
                                       ALL STATIONS)
          INC     L
          INC     L

LD      A,(STNADR)           FS=PS+1
          INC     A
          LD      (HL),A

INC     L
          LD      (HL),OFFH            GET SIZE OF ADDRESS SPACE

INC     L
          LD      (HL),OFFH            SET INTERNAL SIZE VARIABLE

RET

;SEND THE POLL COMMAND MESSAGE CURRENTLY IN SCTBUF

POLL      CALL    UPOLL                CHECK UP ON PROGRAM PANEL

POP     HL
          LD      (PRAD),HL

LD      HL,SCTBUF            GET ADDRESS OF POLL
                                       COMMAND MESSAGE

LD      A,(PTCLF)            GET PROTOCOL FLAG
          AND     1                    ISOLATE PRIORITY POLL BIT
          LD      (SCTBUF+PRIFLG),A    SAVE IN POLL COMMAND
```

```
              CALL      CDWAIT
              CALL      TXON              TURN ON TRANSMITTER
              LD        HL,SCTBUF
              CALL      TXFRM             SEND POLL COMMAND MESSAGE
              CALL      TXOF              TURN OFF TRANSMITTER

;POLL RESPONSE ROUTINE
;B=MESSAGE SIZE
;C=STATUS
;HL=DESTINATION STATION NUMBER

BNPOLD        LD        A,B               IF SIZE NOT RIGHT IGNORE
                                          MESSAGE
              CP        PSIZE
              JP        NZ,WTFRM          WAIT FOR MESSAGE

INC       L

LD        A,(OUTQ)          IF SOMETHING ON PRIORITY
                                          QUEQUE DONT TEST
              AND       A                 PRIORITY BIT IN POLL
                                          COMMAND MESSAGE
              JR        NZ,MBRSP

OR        (IY+OUTQ-Y+3)     TEST NONPRIORITY Q
              JP        Z,WTFRM           IF NOTHING TO TRANSMIT WAIT
                                          FOR NEXT MESSAGE

BIT       PP,(HL)           TEST PRIORITY BIT IN POLL
                                          COMMAND MESSAGE
              JP        NZ,WTFRM          IF SET GO WAIT FOR NEXT
                                          POLL

MBRSP         LD        A,(STNADR)        IF NOT IN POLLED GROUP
                                          DONT RESPOND

INC       L
              SUB       (HL)
              INC       L
              SUB       (HL)
              JP        NC,WTFRM          WAIT FOR NEXT MESSAGE

CALL      UNRESP            TURN ON TRANSMITTER FOR
                                          SHORT PERIOD
              LD        A,1
              CALL      HSLOT             WAIT HALF A POLL PERIOD
              CALL      TEST              TEST FOR A RESPONSE
              JR        NZ,RESPN          IF RESPONSE RETURN NOT ZERO
              LD        A,1
              CALL      HSLOT             WAIT SECOND HALF POLL PERIOD

XOR       A                 ELSE RETURN ZERO
PRET          JI        (PRAD)
+
+

RESPN         LD        A,1
              CALL      HSLOT
              OR        OFFH
              JR        PRET

END
```

APPENDIX G

Data Link Driver Routine

```
HSLOT       EQU         $
            LD          HL,SCTBUF+IM+3
            LD          (HL),A
            INC         L
            LD          A,(STNADR)
            LD          (HL),A
            DEC         L
            DEC         L
            DEC         L

TXFRM       LD          BC,00CF0H           INITIALIZE ALTERNATE REGISTER
                                            SET FOR FAST
            LD          D,00FH
            LD          (FRAD),HL           SAVE ADDRESS OF FRAME
            INC         L
            INC         L
            LD          E,(HL)              GET SIZE OF FRAME
            INC         L
            EXX

POP         HL
            LD          (SACONT),HL         SAVE CONTINUE ADDRESS

CALL        OPOLL
            DI

SETUP       CSIOA,TXSET
+
+
            DEFB        1+RSTATI
            DEFB        TXINEN+EXINEN
            DEFB        TCRCRS
TXSET       EQU         $

LD          (IY+LMODE-Y),1

EXX
            OUTI                            KICK THE SIO
            EXX

SETUP       CSIOA,URRS
+
+
            DEFB        UREMRS
            DEFB        RSTATI
URRS        EQU         $

RET

RXFRM       LD          BC,00CF0H           SETUP ALTERNATE REGISTER SET
            LD          DE,00F00H

LD          (FRAD),HL           SAVE ADDRESS OF FRAME BUFFER
            INC         L
            INC         L
```

```
            INC     L
            EXX

POP     HL
            LD      (SACONT),HL     SAVE CONTINUE ADDRESS
            BIT     NHNT,(IY+PTCLF-Y)  IF NOHUNT FLAG IS 1
                                       RESET HUNT MODE BIT
            JR      Z,HUNTA
            RES     NHNT,(IY+PTCLF-Y)

DI
            SETUP   CSIOA,RXSET
+
+
            DEFB    0
            DEFB    3+ERRRS
            DEFB    RXENS+SHUNT+RCRCEN+LN8SR
            DEFB    1+RCRCRS
            DEFB    RXAPEN
RXSET       EQU     $

JR      FLSH

HUNTA       DI

SETUP   CSIOA,SETHNT
+
+
            DEFB    0
            DEFB    3+ERRRS
            DEFB    RXENS+RCRCEN+ADSRCH+LN8SR+SHUNT
            DEFB    1+RCRCRS
            DEFB    RXAPEN
SETHNT      EQU     $

FLSH        IN      A,(.LOW.DSIOA)  FLUSH RECEIVER
            IN      A,(.LOW.DSIOA)
            IN      A,(.LOW.DSIOA)
            IN      A,(.LOW.DSIOA)

LD      A,RCRCRS+ERRRS
            OUT     (.LOW.CSIOA),A
            RET

;TRANSMIT BUFFER EMPTY INTERRUPT

SATXIN      EXX                     SWAP REGISTERS
            EX      AF,AF1

DEC     E               DONE WHEN COUNT REACHES ZERO
            JR      Z,XNDFRM

OUTI            OUTPUT CHAR
            JR      NZ,XIRET        IF END OF BLOCK DO CHAINING

LD      B,D             GET NEW BLOCK SIZE COUNT (15)

LD      L,(HL)          GET POINTER FROM END OF BUFFER

LD      A,L             GET POINTER H
```

```
                OR          C                       (DSIOA MUST BE F0; RAM ORG=
                                                    F000)

LD          H,A

LD          A,L                     GET POINTER L
                AND         C
                LD          L,A

XIRET           EXX                                 RETURN
                EX          AF,AF1
                EI
                RETI
XNDFRM          XOR         A
                OUT         (.LOW.CSIOA),A
                LD          A,TXINRS                DISABLE TRANSMITTER INTERRUPT
                OUT         (.LOW.CSIOA),A

JR          XIRET

;SPECIAL RECEIVE CONDITIONS INTERRUPT
;OCCURS FOR:
; RX OVERRUN         R1 BIT 5
; CRC ERROR          R1 BIT 6
; END OF FRAME       R1 BIT 7

SAREIN          PUSHA
+
+
+
+
+
                LD          (LKSPSV),SP
                LD          SP,LKSTK
                MARK        LK
+
+
                IN          A,(.LOW.DSIOA)          GET RID OF LAST BYTE OF CRC

SETUP       CSIOA,REDISI            DISABLE INTERRUPTS AND SELECT
                                                    R1
+
+
                DEFB        0
                DEFB        1
                DEFB        0
                DEFB        1
REDISI          EQU         $

LD          (IY+LKTMR-Y),0FFH       STOP TIMEOUT

IN          A,(.LOW.CSIOA)          GET STATUS
                XOR         B7                      IF NOT END OF FRAME
                AND         B7+B6+B5                OR IF ERROR
                JR          NZ,RXDNI                JUST RETURN

LD          (IY+PTTMR-Y),0FFH       RESET VALID FRAME TIMEOUT

EXX
                LD          A,L                     ELSE CHECK BUFFER ADDRESS
                AND         C                       MASK WITH F0
```

```
               XOR       H               XOR WITH HIGH BYTE
               XOR       C               COMPLEMENT HIGH DIGIT
                                         (GET RID OF F)
               JR        Z,RXOVER        IF ZERO THE BUFFER OVERFLOWED
                                         INTO BUFFER

LD        HL,(FRAD)       GET ADDRESS OF SIZE
               INC       L
               INC       L
               DEC       E               IGNORE CRC BYTE
               LD        (HL),E          SAVE SIZE IN FRAME

RXDNIZ         XOR       A               RETURN ZERO STATUS

RXDNI          EI
               PUSH      AF
               CALL      UPOLL

POP       AF
               LD        IX,(FRAD)       GET ADDRESS OF FRAME
               JI        (SACONT)
+
+

RXOVER         LD        A,B1
               JR        RXDNI

;RECEIVED CHAR INTERRUPT
SARXIN         EXX                       SWAP REGISTERS
               EX        AF,AF1

INI       DO I/O

JR        NZ,RIRET        IF NOT END OF BLOCK GO
                                         RETURN
               LD        B,D             ELSE GET NEW BLOCK COUNT
               LD        L,(HL)          GET POINTER TO NEXT BLOCK

LD        A,L             GET POINTER H
               OR        C
               LD        H,A

LD        A,L             GET POINTER L
               AND       C
               LD        L,A

RIRET          INC       E               COUNT FRAME SIZE
               EXX
               EX        AF,AF1
               EI
               RETI

;EXTERNAL AND STATUS INTERRUPT
;INCLUDES THESE CONDITIONS IN REGISTER 0
;BIT 7 ABORT RECEIVED
;BIT 6 TRANSMITTER UNDERRUN
;BIT 4 SYNCH DETECT
;BIT 3 CARRIER DETECT
```

| | | | |
|---|---|---|---|
| SASTIN | PUSH | HL | PUSH JUST A FEW UNTIL ITS A REAL INTERRUPT |
| | PUSH | AF | |
| | XOR | A | GET AND RESET STATUS |
| | OUT | (.LOW.CSIOA),A | |
| | IN | A,(.LOW.CSIOA) | |
| | LD | H,A | |
| | LD | A,RSTATI | |
| | OUT | (.LOW.CSIOA),A | |
| | LD | A,H | |
| | LD | L,(IY+LMODE-Y) | BRANCH ON LINK MODE (XMIT=1, RCVE=2, SYNC=3) |
| | DEC | L | |
| | JR | Z,TMO | |
| | DEC | L | |
| | JR | Z,SMO | |
| | DEC | L | |
| | JR | NZ,STOUT | IF NOT VALID MODE RETURN |
| CMO | XOR | 0FFH | MADE CDECT L OFF LOOK LIKE SYNC H OFF |
| | RLCA | | |
| SMO | AND | 2**4 | SYNC MODE: ONLY HUNT OFF INTERRUPT RECOGNITION |
| | JR | NZ,STOUT | |
| | OR | 2**4 | |
| | JR | STIN | |
| TMO | AND | 2**6 | TRANSMIT MODE: UNDERRUN ONLY |
| | JR | Z,STOUT | |

;TRANSMIT UNDERRUN DETECT ROUTINE
;OCCURS WHEN NO DATA HAS BEEN SUPPLIED TO TRANSMITTER AND IT RUNS OUT OF DATA
;TO SEND. IT AUTOMATICALLY STARTS SENDING THE CRC (THAT IS WHAT ITS DOING)

| | | | |
|---|---|---|---|
| | EXX | | TEST BYTE COUNTER |
| | DEC | E | |
| | INC | E | |
| | EXX | | |
| | JR | NZ,TXFAIL | IF UNDERRUN END MESSAGE NOW |
| | XOR | A | ELSE CHANGE VECTORS |
| | OUT | (.LOW.CSIOB),A | |
| | LD | A,2 | |
| | OUT | (.LOW.CSIOB),A | |
| | LD | A,(.LOW.SSIOV) | |
| | OUT | (.LOW.CSIOB),A | |
| | JR | STOUT | |
| TXFAIL | LD | H,A | ABORT MESSAGE AND TURN OFF INTERRUPTS |
| | LD | A,SNDABT+1 | |

```
                OUT     (.LOW.CSIOA),A
                XOR     A
                OUT     (.LOW.CSIOA),A
                LD      A,H
STIN            PUSH    BC                  PUSH REST OF REGISTERS
                PUSH    DE
                PUSH    IX

LD      (LKSPSV),SP
                LD      SP,LKSTK
                MARK    LK
+
+
                LD      (IY+LKTMR-Y),0FFH   RESET TIMEOUT

BIT     4,A                 TEST FOR SYNC ON
                JP      NZ,SYNCI

AND     A
                JP      RXDNI               RETURN NONZERO IF UNDERRUN
STOUT           POP     AF
                POP     HL
                EI
                RETI
;SPECIAL TRANSMITTER INTERRUPT USED ONLY AFTER CRC
SATXIX          PUSHA
+
+
+
+
+
                LD      (LKSPSV),SP
                LD      SP,LKSTK
                MARK    LK
+
+
                SETUP   CSIOA,TXADN
+
+
                DEFB    0
                DEFB    1
                DEFB    0
TXADN           EQU     $

SETUP   CSIOB,VCSET         RESTORE NORMAL VECTOR
+
+
                DEFB    0
                DEFB    2
                DEFB    .LOW.NSIOV
VCSET           EQU     $

JP      RXDNIZ
```

```
LKRET       LD          SP,(LKSPSV)
            POPA
+
+
+
+
+
            EI
            RETI

;WAIT FOR SYNCH DETECT ROUTINE
;WAIT FOR CARRIER DETECT OFF ROUTINE

SYNCW       TEVENT      SYNTMO,2,LK
+
+
+
+
            POP         DE
            LD          (SACONT),DE

RET

;SYNCH TIMEOUT
SYNTMO      EQU         $
            DI
            MARK        C
+
+
            LD          A,(LKTMR)           IF ALREADY INTERRUPTED
                                            IGNORE TIMEOUT
            AND         A
            RET         NZ

;SYNCH INTERRUPT
SYNCI       SETUP       CSIOA,SYNOF
+
+
            DEFB        0
            DEFB        1
            DEFB        0
SYNOF       EQU         $

JP          RXDN1

;SUBROUTINE TO WAIT FOR CARRIER DETECT OFF

CDWAIT      EQU         $
            POP         HL
            LD          (SACONT),HL

LD          (IY+LMODE-Y),3
            DI
            SETUP       CSIOA,CDE           ENABLE CARRIER DETECT
+
+
            DEFB        0
            DEFB        1
            DEFB        EXINEN
            DEFB        RSTATI
CDE         EQU         $
```

```
                CALL      TEST                    IF CARRIER ALREADY OFF
                                                  JUMP

JR        Z,SYNCI

RET                               ;ELSE WAIT FOR INTERRUPT

;SUBROUTINE TO ENABLE TRANSMITTER
TXON            DI

SETUP     CSIOA,TON               GET TRANSMITTER READY
+
+
                DEFB      0
                DEFB      5
                DEFB      LN8ST+TXENS+SDLCFC+TCRCEN+RTSS
                DEFB      3
                DEFB      LN8SR+RXENS
TON             EQU       $

EI
                RET

;SUBROUTINE TO DISABLE TRANSMITTER
TXOF            POP       HL                      SAVE RETURN ADDRESS
                LD        (RXCNT),HL

DI
                LD        (IY+LMODE-Y),2

SETUP     CSIOA,SNCS              ENABLE FLAG SEARCH
+
+
                DEFB      ERRRS
                DEFB      3
                DEFB      LN8SR+SHUNT+RXENS
                DEFB      RSTATI
                DEFB      1
                DEFB      EXINEN
SNCS            EQU       $

CALL      SYNCW                   WAIT FOR A FLAG CHAR

SETUP     CSIOA,TOF               TURN TRANSMITTER OFF
+
+
                DEFB      0
                DEFB      RSTATI+5
                DEFB      LN8ST+DTRS+SDLCFC+TCRCEN
TOF             EQU       $

CALL      UPOLL
                JI        (RXCNT)                 RETURN
+
+

UNRESP          DI
                SETUP     CSIOA,UNR               TURN ON TRANSMITTER
+
+
```

```
            DEFB    0
            DEFB    5
            DEFB    LN8ST+TXENS+DTRS+SDLCFC+TCRCEN
            DEFB    3
            DEFB    LN8SR+RXENS
UNR         EQU     $

EI
            RET

TEST        DI                              SUBROUTINE TO TEST CARRIER
                                            DETECT FOR POLL

SETUP   CSIOA,TDCD              UPDATE STATUS LATCH
+
+
            DEFB    0
            DEFB    RSTATI
TDCD        EQU     $

IN      A,(.LOW.CSIOA)          TEST CARRIER STATUS
            XOR     0FFH
            AND     DCDS
            EI
            RET

LKINIT      SETUP   CSIOA,LKI1
+
+
            DEFB    0
            DEFB    4
            DEFB    SDLC
            DEFB    5
            DEFB    LN8ST+SDLCFC
            DEFB    3
            DEFB    LN8SR
            DEFB    7+RSTATI
            DEFB    07EH
            DEFB    6
LKI1        EQU     $

LD      A,(STNADR)
            OUT     (.LOW.CSIOA),A

SETUP   CSIOB,LK12
+
+
            DEFB    0
            DEFB    2
            DEFB    .LOW.NSIOV
            DEFB    1
            DEFB    STSVCT
LK12        EQU     $

RET
            END
```

APPENDIX H 1.0 COMMUNICATION RUNGS FORMAT.

1.1 HEADER RUNG.

```
    XXX    YYY   ZZZZZ                                    02707
---[G]---[G]---[ ]-------------------------------------(L)---
```

```
        GET     XXX
        GET     YYY
        XIC     ZZZZZ
        OTL     02707
```

XXX     IS THE STATION ADDRESS OF THE INTERFACE THAT WILL PROCESS THIS COMMUNICATION RUNGS AREA.
    YYY     IS THE ADDRESS OF A LOCATION WHERE STATION XXX MAY STORE ERROR CODES.
    ZZZZZ   IS THE ADDRESS OF A BIT THAT WILL ENABLE OR DISABLE THE SENDING AND RECIEVING OF MESSAGES BY STATION XXX.

1.2 MEMORY PROTECTION RUNGS.

THIS SECTION CONTAINS ANY NUMBER OF RUNGS. EACH RUNG MAY CONTAIN ONE OR MORE BRANCHES. EACH BRANCH DEFINES A STATION NUMBER AND AN AREA OF MEMORY WHICH THAT STATION MAY ACCESS. EACH BRANCH MUST START WITH A BST AND CONTAIN THREE GET INSTRUCTIONS WITH THE FOLLOWING MEANING:

```
    AAA    BBB   CCC
+--[G]---[G]---[G]--+
```

```
        BST
        GET     AAA
        GET     BBB
        GET     CCC
```

AAA     IS THE ADDRESS OF A STATION.
    BBB     IS THE ADDRESS OF THE FIRST WORD IN AN AREA THAT MAY BE ACCESSED BY STATION AAA.
    CCC     IS THE ADDRESS OF THE LAST WORD IN THIS AREA.

BND AND DUMMY OUTPUT INSTRUCTIONS MAY BE USED TO FIT THE RUNG INTO A DISPLAY AREA. AN EXAMPLE IS GIVEN BELOW:

```
|   AAA    BBB    CCC         GGG    HHH   III              DUMMY
|---[G]---[G]---[G]--+---[G]---[G]---[G]--+-------( )---
|                    |                    |
|   DDD    EEE    FFF |   JJJ    KKK   LLL |
|---[G]---[G]---[G]--+---[G]---[G]---[G]--+
```

```
BST
GET     AAA
GET     BBB
GET     CCC
BST
GET     DDD
GET     EEE
GET     FFF
BND
BST
GET     GGG
GET     HHH
GET     III
BST
GET     JJJ
GET     KKK
GET     LLL
BND
OTE     DUMMY
```

1.3 COMMAND RUNGS.

THIS SECTION OF THE PLC-2 PROGRAM CONTAINS ANY NUMBER OF COMMAND RUNGS. EACH COMMAND RUNG CONTROLS ONE MESSAGE WHICH MAY BE SENT TO ANY STATION. EACH COMMAND RUNG BEGINS WITH TWO XIC INSTRUCTIONS AND ENDS WITH A DUMMY OUTPUT. THE BODY OF THE COMMAND RUNG CONSISTS OF THREE GET INSTRUCTIONS FOR READ AND WRITE COMMANDS AND ANY NUMBER OF XIC, XIO, BST AND BND INSTRUCTIONS FOR BIT COMMANDS.

1.3.1 READ AND WRITE COMMANDS -

```
 GGG1W HHHPI  JJJ    KKK    LLL                  DUMMY
---[ ]---[ ]---[G]---[G]---[G]----------------( )---

XIC     GGG1W
        XIC     HHHPI
        GET     JJJ
        GET     KKK
        GET     LLL
        OTE     DUMMY
```

GGG FOLLOWING IS THE ADDRESS OF THE FIRST WORD OF A TWO WORD PAIR. THIS ELEMENT IMPLIES THE ADDRESS ASSIGNMENTS:

| FUNCTION | WORD | BIT |
|---|---|---|
| START BIT | GGG | 1W |
| DONE BIT | GGG | 0W |
| REMOTE ERROR BIT | GGG+1 | 1W |
| LOCAL ERROR BIT | GGG+1 | 0W |

HHH IS THE DESTINATION STATION NUMBER.
P IS THE MESSAGE PRIORITY.
I INDICATES THE FUNCTION TO BE PERFORMED:

0    WRITE TO DESTINATION
    1    READ FROM DESTINATION.

JJJ IS THE MEMORY ADDRESS IN THE DESTINATION CONTROLLER WHERE DATA STARTS.

KKK IS THE ADDRESS IN THE ORIGINATING CONTROLLER WHERE DATA STARTS.

LLL IS THE ADDRESS IN THE ORIGINATING CONTROLLER WHERE DATA ENDS.

1.3.2 BIT COMMAND -

```
 GGG1W   HHHP2    |----------------------------|   DUMMY
--[ ]----[ ]-----|  ANY LEGAL COMBINATION     |---( )--
                 |  OF XIC, XIO, BST, BND     |
                 |----------------------------|

XIC     GGG1W
        XIC     HHHP2

-EXAMPLE-

BST
        XIC     AAAAA
        XIO     BBBBB
        BND

-ETC-

OTE     DUMMY
```

GGG, W AND HHH ARE AS PRVIOUSLY DEFINED. EACH XIC IN THE BODY OF THE BIT CONTROL RUNG SPECIFIES A BIT TO BE SET IN THE DATA TABLE OF THE DESTINATION CONTROLLER. EACH XIO SPECIFIES A BIT TO BE RESET IN THE DESTINATION CONTROLLER.

1.4 DELIMITER RUNG.

THIS RUNG MARKS THE END OF A COMMUNICATION RUNGS AREA.

```
                                                02707
--------------------------------------------(U)----

OTU     02707
```

2.0 NETWORK PROTOCOL FORMATS.

2.1 COMMANDS.

```
            READ    DST SRC CMD STS TNS ADDR SIZE
            WRITE   DST SRC CMD STS TNS ADDR DATA
            BIT     DST SRC CMD STS TNS ADDR MASKS
  DIAGNOSTICS:
            LOOP    DST SRC CMD STS TNS 0 ADDR DATA
            READ    DST SRC CMD STS TNS 1 ADDR ADDR SIZE
            INPUT   DST SRC CMD STS TNS 2 ADDR PORT
```

2.2 REPLIES.

```
        READ, DIAGNOSTIC READ, INPUT, AND LOOP:
                        SRC DST CMD STS TNS DATA
        WRITE AND BIT:
                        SRC DST CMD STS TNS

DST     IS THE STATION NUMBER OF THE CONTROLLER
                INTERFACE INITIATING A COMMAND.
        SRC     IS THE ADDRESS OF THE CONTROLLER INTERFACE
                RESPONDING TO A COMMAND.
        CMD     AN EIGHT BIT VALUE WITH:
                        BIT 7      0
                        BIT 6      0 = COMMAND
                                   1 = REPLY
                        BIT 5      0 = NORMAL
                                   1 = PRIORITY
                        BIT 4      0
                        BITS 3-0:
                              0-   WRITE
                              1-   READ
                              2-   BIT CONTROL
                              3-   PRIVILEGED WRITE
                              4-   PRIVILEGED READ
                              5-   PRIVILEGED BIT CONTROL
                              6-   DIAGNOSTICS
```

| | |
|---|---|
| STS | ZERO FOR ALL COMMAND MESSAGES<br>BITS 3-0 = LOCAL ERROR:<br>    0- NO ERROR<br>    2- UNDELIVERABLE MESSAGE<br>BITS 7-4 = REMOTE ERROR (IF LOCAL ERROR = 0)<br>    0- NO ERROR<br>    1- ILLEGAL COMMAND OR SIZE<br>    2- PLC MEMORY NONVERIFY<br>    3- PLC DISCONNECTED<br>    4- PLC COMMUNICATION ERRORS<br>    5- PRIVILEGE VIOLATION<br>    6- PLC IN PROGRAM MODE. |
| TNS | IS AN EIGHT BIT VALUE WHICH IS COPIED FROM THE COMMAND MESSAGE INTO THE REPLY. THIS CAN BE SET TO ANY VALUE AND IS INTENDED TO BE USED AS A TAG FIELD TO ASSOCIATE REPLIES WITH OUTSTANDING COMMANDS. |
| ADDR | IS A 16 BIT ADDRESS. |
| DATA | IS A FIELD OF DATA BYTES. |
| PORT | IS AN EIGHT BIT I/O PORT NUMBER. |
| MASKS | IS FROM 1 TO 35 MASKS OF THE FORM:<br>    ADDR  SET  RESET. |
| SET | IS A 16 BIT MASK OF BITS TO SET. |
| RESET | IS A 16 BIT MASK OF BITS TO RESET. |

3.0 MULTIPOINT DATA LINK FORMATS.

```
MESSAGE:    FLAG  DST  STS  DATA  CRC  FLAG
STATUS:     FLAG  SRC  DST  STS   CRC  FLAG
POLL:       FLAG  255  P    FS    M    CRC   FLAG
RESPONSE:
```

A POLL RESPONSE IS A CARRIER TRANSMITTED DURING AN INTERVAL FOLLOWING A POLL COMMAND. EACH POLL OR RESPONSE TAKES ABOUT 3 MILLISECONDS, AND THE INTERVAL BETWEEN MESSAGES IS ABOUT .5 MILLISECONDS.

| | |
|---|---|
| FLAG | IS A HARDWARE GENERATED FRAMING CHARACTER. |
| DST | IS THE NUMBER OF THE MASTER STATION. |
| SRC | IS THE NUMBER OF THE SLAVE STATION. |
| DATA | IS UP TO 252 BYTES OF DATA. |
| CRC | IS A HARDWARE GENERATED CHECKING POLYNOMIAL. |
| STS | IS AN EIGHT BIT VALUE WITH:<br>    BIT 7    1<br>    BIT 6    1 = SLAVE STATION BUFFERS FULL<br>    BITS 5-0  ERROR CODE<br>        0- NO ERROR<br>       16- BAD FRAME FORMAT |
| 255 | IS THE GLOBAL NETWORK ADDRESS |
| P | IS THE PRIORITY LEVEL (0 OR 1) |
| FS | IS THE FIRST ADDRESS OF A GROUP POLL |
| M | IS THE SIZE OF A GROUP POLL |

We claim:

1. A communications network which comprises:

a cable;

a plurality of interface modules connected to the cable, each interface module being operative to couple data messages between the cable and an associated electrical device and each interface module including:

(a) means responsive to a poll command message on the cable for obtaining mastership of the communications network;

(b) means coupled to said last named means for sending a data message on said cable to another interface module on the communications network;

(c) means coupled to said last named means for relinquishing mastership of the communications network by sending a poll command message on said cable which enables another interface module that has the highest priority according to a preselected priority scheme to assume mastership of the communications network; and (d) means coupled to said last named means for receiving data messages on the cable sent by another interface module which has mastership of the communications network.

2. The communications network as recited in claim 1 in which said means in each interface module for obtaining mastership of the communications network also responds to a poll command by sending a reply signal on the cable.

3. The communications network as recited in claim 2 in which said means in each interface module for relinquishing mastership of the communications network is responsive to a reply signal on the cable after it sends a poll command message to enable said means for receiving data messages.

4. The communications network as recited in claim 2 in which said means in each interface module for relinquishing mastership of the communications network sends a series of poll command messages, and it is responsive to a reply signal on the cable after it sends the last poll command message in said series to enable said means for receiving data messages.

5. The communications network as recited in claim 1 in which each interface module has a unique station number and the means in each interface module for obtaining mastership of the communications network is responsive to poll command messages encompassing its station number, and the means in each interface module for relinquishing mastership of the communications network sends a series of poll command messages in which successive poll command messages encompass fewer station numbers and the last poll command message encompasses a single station number.

6. The communications network as recited in claim 5 in which said means in each interface module for obtaining mastership of the communications network also responds to a poll command which encompasses its station number by sending a reply signal on the cable.

7. A communications network which comprises:

a cable having a plurality of drop lines electrically connected to it at points along its length;

a plurality of interface modules, each connected to one of said drop lines and to an associated controller, and each including:

(a) means coupled to said cable for sending messages through said cable to other interface modules on the communications network;

(b) means coupled to said cable for receiving messages generated on the cable by other interface modules on the communications network;

(c) output message storage means coupled to said associated controller for storing messages to be sent when the interface module is master of the communications network;

(d) means coupled to said receiving means for detecting the receipt of a poll command message by said receiving means;

(e) means coupled to said output message storage means and said detecting means for generating a poll response signal on the cable if a message is stored in said output message storage means when a poll command message is detected by said detecting means;

(f) means coupled to said receiving means for detecting the receipt of a poll command message by said receiving means which indicates that the interface module is the only interface module being polled;

(g) means coupled to this last named means and being responsive thereto for obtaining mastership of the communications network and enabling said sending means to send messages stored in said output message storage means;

(h) means coupled to said sending means for generating a poll command message and coupling it to said sending means for transmission to other interface modules on the communications network; and (i) first means coupled to said output message storage means and said means for generating a poll command message for enabling said poll command message generating means when no further messages are stored in said output message storage means.

8. The communications network as recited in claim 7 in which each interface module further includes:

(j) means coupled to said receiving means for detecting the receipt of a poll response signal generated by another interface module on the communications network; and (k) second means coupled to said last named means for enabling said poll command message generating means when a poll response signal is detected by said last named means.

9. An interface module for connecting a programmable controller to a communications network cable, the combination comprising:

means coupled to said cable for sending and receiving messages on the communications network cable;

means coupled to the programmable controller for determining if it contains a message to be sent on the communications network;

means coupled to the last named means for reading message data out of the programmable controller;

output message storage means coupled to the last named means and the means for sending and receiving messages, and being operable to store message data read from the programmable controller; and means coupled to said cable and to said means for sending and receiving messages for obtaining mastership of the communications network and enabling the means for sending and receiving messages to send message data stored in said output message storage means on the communications network cable.

10. The interface module as recited in claim 9 in which the message data is stored in a memory which forms part of the programmable controller and the interface module includes means coupled to the programmable controller memory for locating said message data and storing its memory address, and said means for reading message data from the programmable controller employs said stored memory address.

11. The interface module as recited in claim 9 which includes command rung index storage means for storing the address of message data which is stored in a memory which forms part of the programmable controller and for storing the address of start bit data in the programmable controller memory, and the interface module includes means coupled to the programmable controller for determining the address of start bit data and the address of message data and storing it in said command rung index storage means.

12. The interface module as recited in claim 11 in which said means for determining if a message is to be sent examines start bit data stored in the programmable controller memory using the address thereof stored in said command rung index storage means.

13. The interface module as recited in claim 12 in which said means for reading message data out of the programmable controller is enabled when an examined start bit is set and it locates the message data in the programmable controller memory using an address stored in said command rung index storage means.

14. The interface module as recited in claim 9 in which said means for obtaining mastership of the communications network is responsive to a poll command message received by said means for sending and receiving messages, which poll command indicates that another interface module on the communications network is relinquishing mastership.

15. The interface module as recited in claim 9 which includes means coupled to said sending and receiving means and coupled to said programmable controller for writing message data into said programmable controller which is received from said communications network cable.

16. A communications network which comprises:
a cable;
a plurality of interface modules connected to the cable, each interface module being operative to couple data messages between the cable and an associated electrical device and priority data messages between the cable and an associated electrical device, each interface module including:

(a) first means coupled to said cable for receiving data messages, priority data messages, poll commands and priority poll commands sent by other interface modules;

(b) second means coupled to the associated electrical device for receiving data messages and priority date messages therefrom;

(c) third means coupled to the first means and the second means and being operable in response to priority poll commands to obtain mastership of the communications network, said third means including means for generating responses to received priority poll commands when priority data messages have been received from the associated electrical device;

(d) fourth means coupled to said first means and said second means and being responsive to a poll command message on the cable for obtaining mastership of the communications network when a data message has been received from the associated electrical device;

(e) fifth means coupled to said third and fourth means for sending priority data messages and data messages on said cable when mastership is obtained; and (f) sixth means coupled to the last named means for relinquishing mastership of the communications network, said sixth means including means for sending a priority poll command on said cable which enables another interface module having a priority data message to assume mastership of the communications network, and means for sending a poll command on said cable when no response to the priority poll command is received.

* * * * *